(12) United States Patent
Takeoka et al.

(10) Patent No.: US 12,480,943 B2
(45) Date of Patent: Nov. 25, 2025

(54) TEMPERATURE-RESPONSIVE FLUORESCENT PARTICLES FOR DETECTION OF BIOMOLECULES

(71) Applicant: NANOTHETA INC., Tokyo (JP)

(72) Inventors: Shinji Takeoka, Tokyo (JP); Keitaro Sou, Tokyo (JP); Runkai Hu, Tokyo (JP); Chi-Lik Ken Lee, Singapore (SG); Li Yan Chan, Singapore (SG)

(73) Assignee: NANOTHETA INC., Tokyo (JP)

( * ) Notice: Subject to any disclaimer, the term of this patent is extended or adjusted under 35 U.S.C. 154(b) by 1050 days.

(21) Appl. No.: 17/610,565

(22) PCT Filed: May 29, 2020

(86) PCT No.: PCT/JP2020/021358
§ 371 (c)(1),
(2) Date: Nov. 11, 2021

(87) PCT Pub. No.: WO2020/241830
PCT Pub. Date: Dec. 3, 2020

(65) Prior Publication Data
US 2022/0221450 A1 Jul. 14, 2022

(30) Foreign Application Priority Data
May 29, 2019 (JP) ................. 2019-100299

(51) Int. Cl.
*G01N 33/543* (2006.01)
*C09B 57/00* (2006.01)
(Continued)

(52) U.S. Cl.
CPC ....... *G01N 33/5432* (2013.01); *C09B 57/007* (2013.01); *G01N 21/64* (2013.01); *G01K 11/00* (2013.01)

(58) Field of Classification Search
CPC .......... C09B 57/007; A61B 5/01; A61B 5/015; G01N 33/5432
See application file for complete search history.

(56) References Cited

U.S. PATENT DOCUMENTS

| | | |
|---|---|---|
| 2015/0152322 A1 | 6/2015 | Nakayama et al. |
| 2015/0359912 A1 | 12/2015 | Zheng et al. |

FOREIGN PATENT DOCUMENTS

| | | |
|---|---|---|
| EP | 2 871 216 A1 | 5/2015 |
| JP | S63-191065 A | 8/1988 |
| WO | WO-2014/117253 A1 | 8/2014 |

OTHER PUBLICATIONS

Sou, K. et al. "Highly cooperative fluorescence switching of self-assembled squaraine dye at tunable threshold temperatures using thermosensitive nanovesicles for optical sensing and imaging," Scientific Reports vol. 9, Article No. 17991 (2019) 12 pages, Published: Nov. 29, 2019 (Year: 2019).*

(Continued)

*Primary Examiner* — Jennifer Wecker
*Assistant Examiner* — Michelle Adams
(74) *Attorney, Agent, or Firm* — Faegre Drinker Biddle & Reath LLP

(57) ABSTRACT

Provided is a temperature-responsive fluorescent particle comprising at least one type of fluorescent molecule in a molecular assembly comprising and constituted by at least one type of amphiphilic molecule, wherein the fluorescent molecule emits fluorescence when the molecular assembly is in the liquid phase and it is quenched when the molecular assembly is in the solid phase, due to a temperature-responsive solid-liquid phase transition, so that fluorescence emission and quenching of the fluorescent molecule are reversibly switched in a temperature responsive manner. Also provided is a temperature-responsive fluorescent probe comprising the temperature-responsive fluorescent particle (Continued)

the surface of which is modified with a biomolecule recognition element, and methods for detecting and quantitatively determining a biomolecule with the temperature-responsive fluorescent probe.

16 Claims, 28 Drawing Sheets

(51) Int. Cl.
  *G01N 21/64* (2006.01)
  *G01K 11/00* (2006.01)

(56) References Cited

OTHER PUBLICATIONS

Zhang, D. et al. "Nano-Confined Squaraine Dye Assemblies: New Photoacoustic and Near-Infrared Fluorescence Dual-Modular Imaging Probes in Vivo," Bioconjugate Chem. 2014, 25, 2021-2029 and Supporting Information. (Year: 2014).*
Dong, S. et al. "Far-Red Fluorescent Liposomes for Folate Receptor-targeted Bioimaging," ACS Appl. Nano Mater. 2018, 1, 1009-1013 and Supporting Information. Published: Feb. 27, 2018 (Year: 2018).*
Supporting Information for Zhegalova, N.G. et al. "Design of Fluorescent Nanocapsules as Ratiometric Nanothermometers," Chem. Eur. J. 2014, 20, 10292-10297 (Year: 2014).*
N. G. Zhegalova et al., "Design of Fluorescent Nanocapsules as Ratiometric Nanothermometers," Chemistry—A European Journal, 2014, vol. 20, No. 33, pp. 10292-10297.
K. Yasuhara, et al., "Fluorescent sensor responsive to local viscosity and its application to the imaging of liquid-ordered domain in liquid membranes," Colloids and Surfaces B:Biointerfaces, vol. 67, No. 1, 2008, pp. 145-149.
S. K. Shaw et al., "Non-Covalent Assembly Method that Simultaneously Endows a Liposome Surface with Targeting Ligands, Protective PEG Chains, and Deep-Red Fluorescence Reporter Groups," Chemistry—A European Journal, 2017, vol. 23, No. 51, pp. 12646-12654.
H. Raghuraman et al., "Monitoring the looping up of acyl chain labeled NBD lipids in membranes as a function phase state," Biochimica et Biophysica Acta, Apr. 2007, vol. 1768 No. 5, pp. 1258-1267.
V. M. Ioffe et al., "Tracing Lysozyme-Lipid Interactions with Long-Wavelength Squaraine Dyes," Journal of Fluorescence, 2007, vol. 17, No. 1, pp. 65-72.
H. A. Franchino, et al., "Combined use of steady-state fluorescence emission and anisotropy of merocyanine 540 to distinguish crystalline, gel, ripple, and liquid crystalline phases in dipalmitoylphosphatidylcholine bilayers," PMC Biophysics, 2010, vol. 3, No. 14, pp. 1-16.
Extended European Search Report issued on Mar. 1, 2023 in European Patent Application No. 20813827.1.
Al-Ahmady, Z. et al., "Chemical Components for the Design of Temperature-Responsive Vesicles as Cancer Therapeutics," Chem. Rev., (2016), vol. 116, pp. 3883-3918.
Arai, S. et al., "Thermosensitive nanoplatforms for photothermal release of cargo from liposomes under intracellular temperature monitoring," RSC Adv., (2015), vol. 5, pp. 93530-93538.
Arai, S. et al., "A Molecular Fluorescent Probe for Targeted Visualization of Temperature at the Endoplasmic Reticulum," Scientific Reports, (2014), vol. 4, 6701 (1-6).
Hurt, C. A., et al., "Performance of six influenza rapid tests in detecting human influenza in clinical specimens," J. Clin. Virol., 2007, 39, pp. 132-135.
Hwang, J., et al., "Quantitation of low abundant socluble biomarkers using high sensitivity Single Molecule Counting technology," Methods, 2019, 158, pp. 69-76.
Ioffe, V. M. et al., "A New Fluorescent Squaraine Probe for the Measurement of Membrane Polarity," Journal of Fluorescence, vol. 16, No. 1, 2006, pp. 47-52.
Kim, S.H., et al., "Large-scale femtoliter droplet array for digital counting of single biomolecules," Lab Chip, 2012, 12, pp. 4986-4991.
Liu, X. et al., "Development of asymmetrical near infrared squaraines with large Stokes shift," RSC Adv., (2015), vol. 5, pp. 106868-106876.
Rissin, D.M., et al., "Single-Molecule enzyme-linked immunosorbent assay detects serum proteins at subfemtomolar concentrations," Nat Biotechnol. Jun. 2010: 28(6): pp. 595-599.
Sou, K. et al., "Temperature Tracking in a Three-Dimensional Matrix Using Thermosensitive Liposome Platform," ACS Sensors, 2 016, vol. 1, pp. 650-655.
International Search Report mailed Aug. 11, 2020 for PCT/JP2020/021358.
Written Opinion of the International Searching Authority mailed Aug. 11, 2020 for PCT/JP2020/021358 (including partial machine English translation).

* cited by examiner

[Figure 1A]
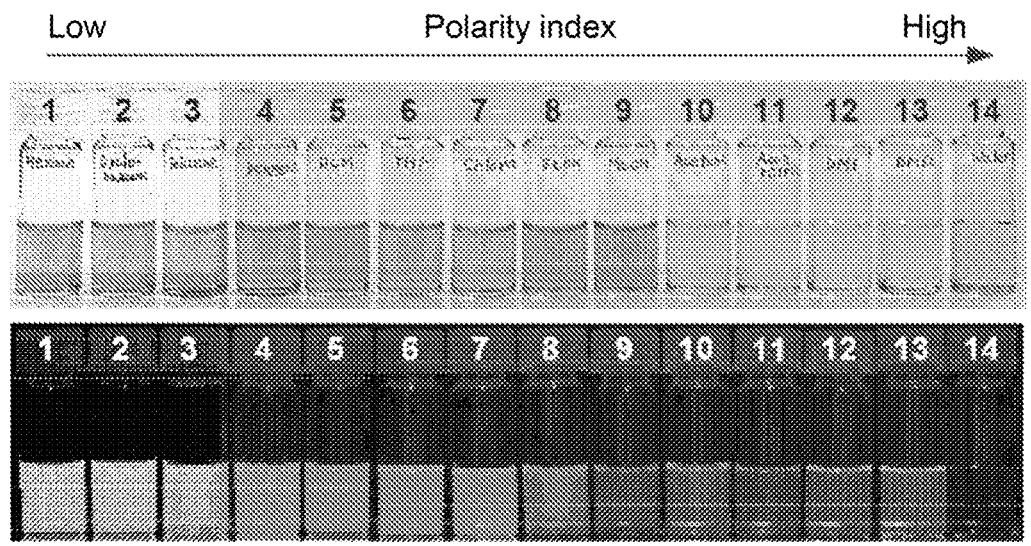
[Figure 1B]
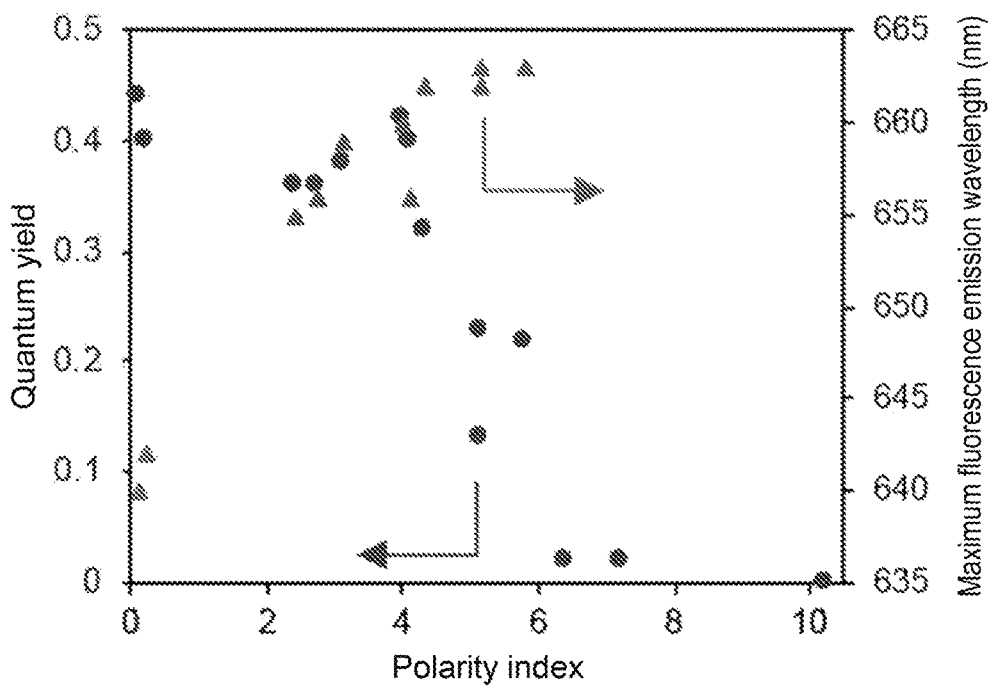

[Figure 2A]
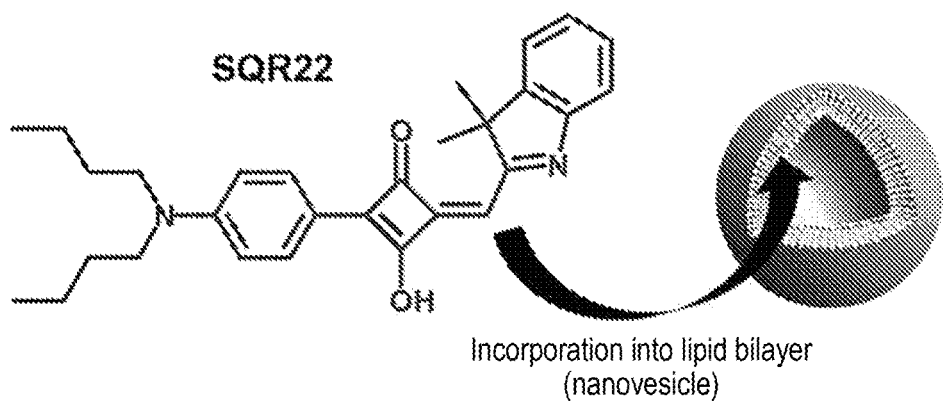
[Figure 2B]
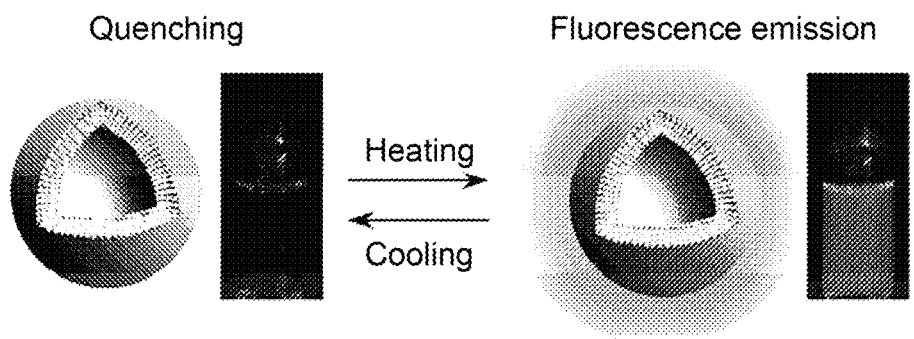

[Figure 2C]
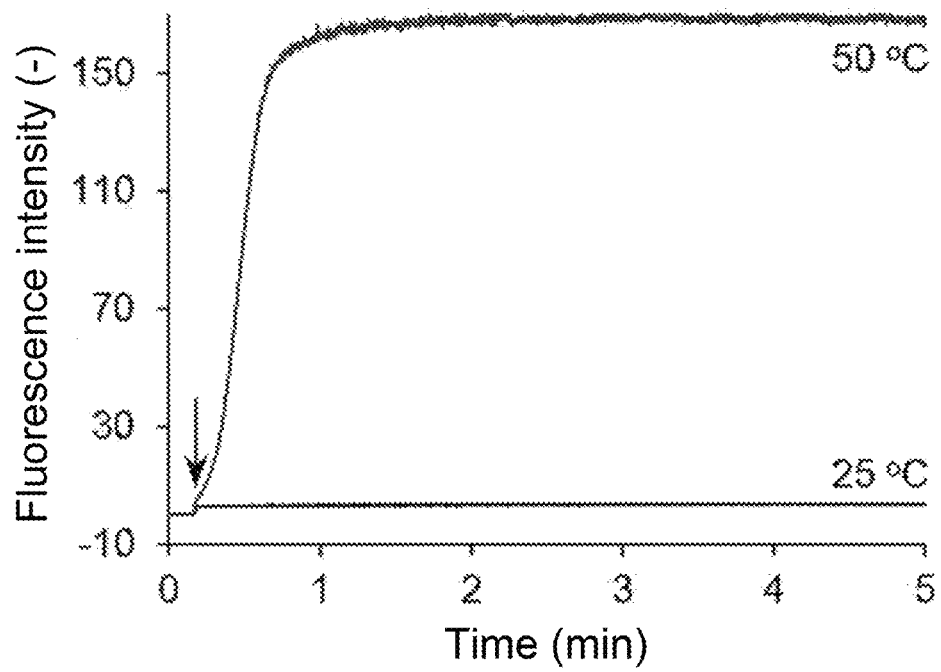
[Figure 2D]
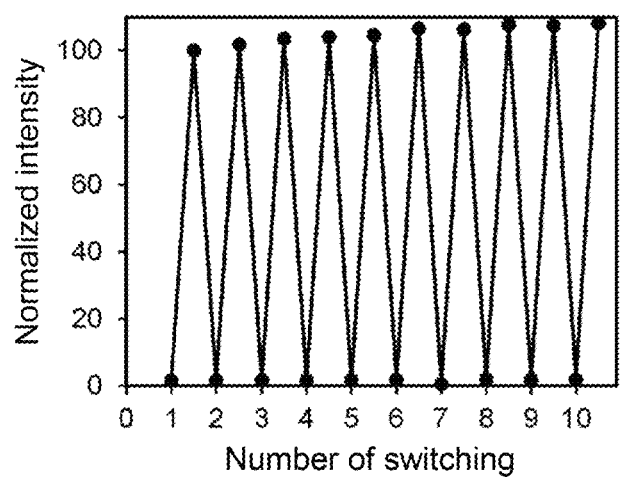

[Figure 3A]
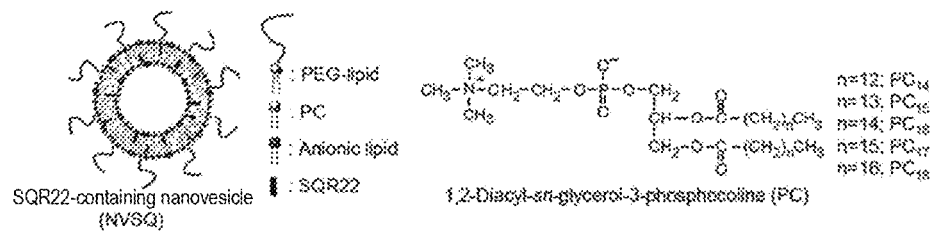
[Figure 3B]
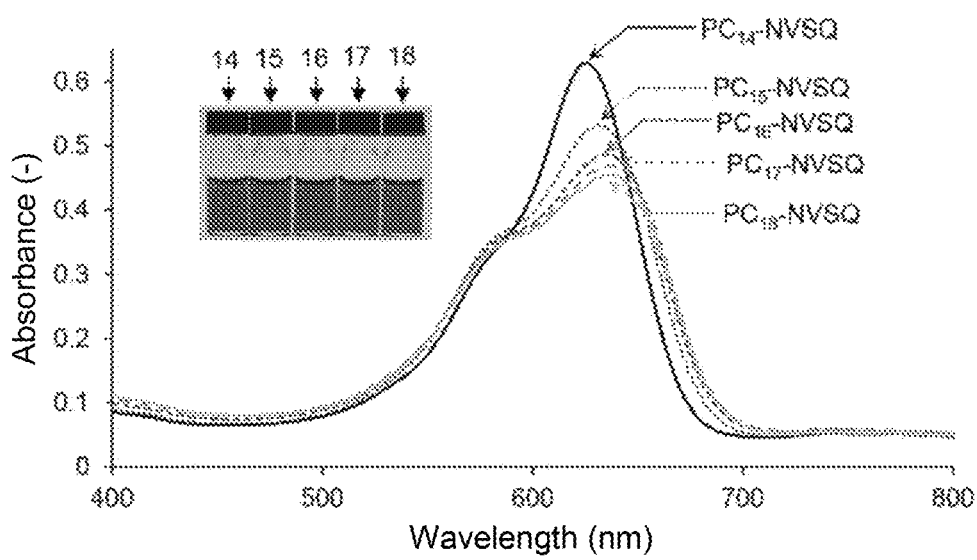
[Figure 4A]
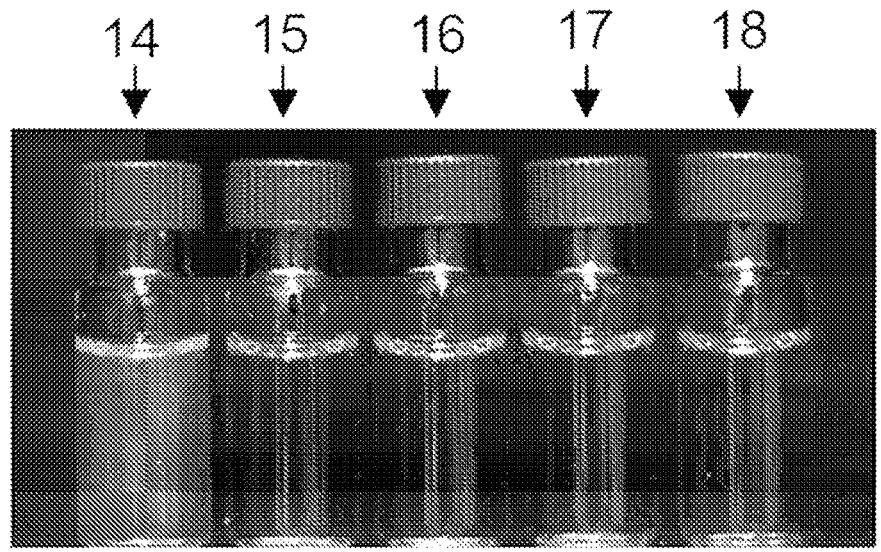

[Figure 4B]
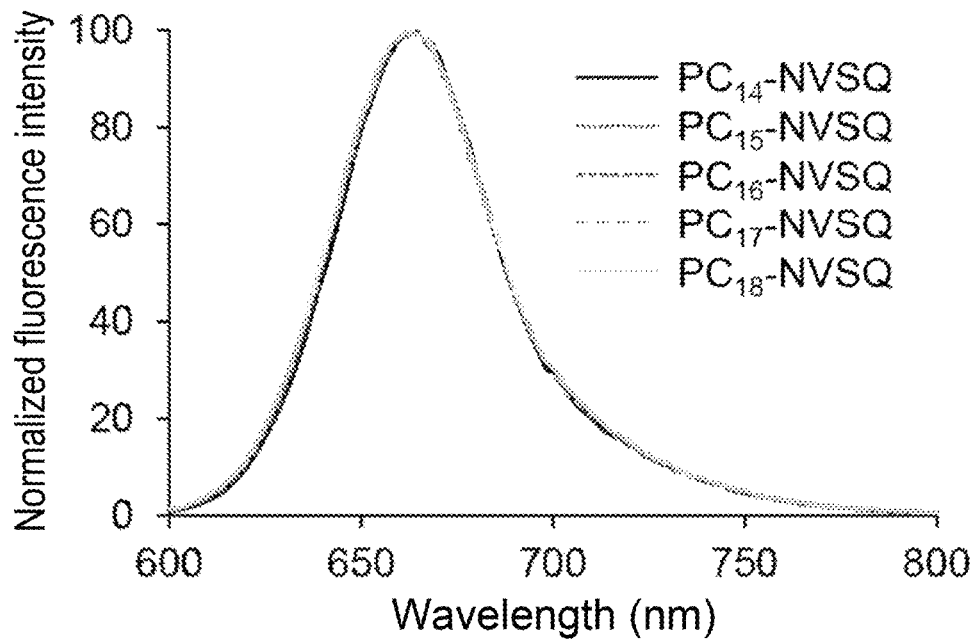
[Figure 4C]
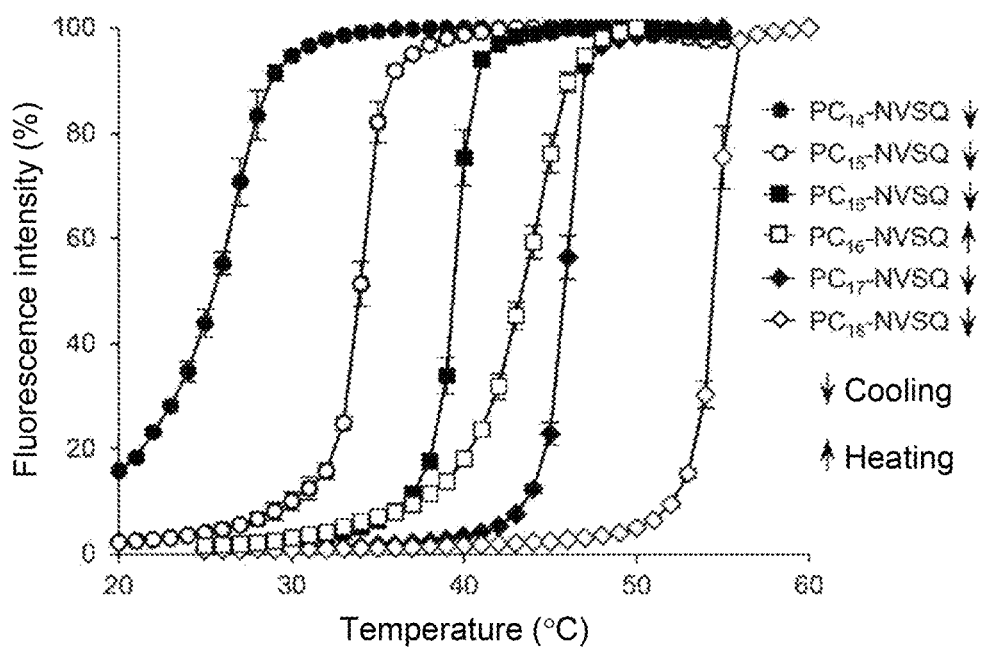

[Figure 5A]
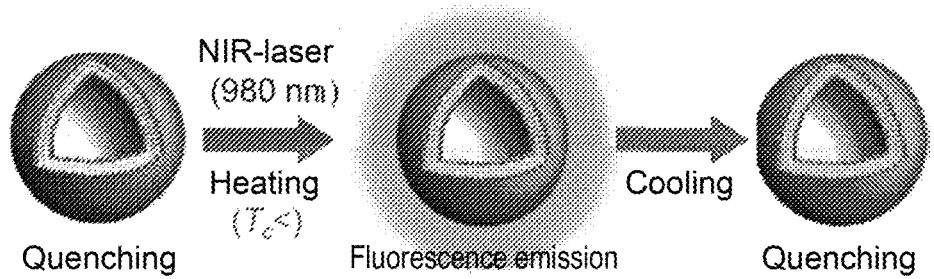
[Figure 5B]
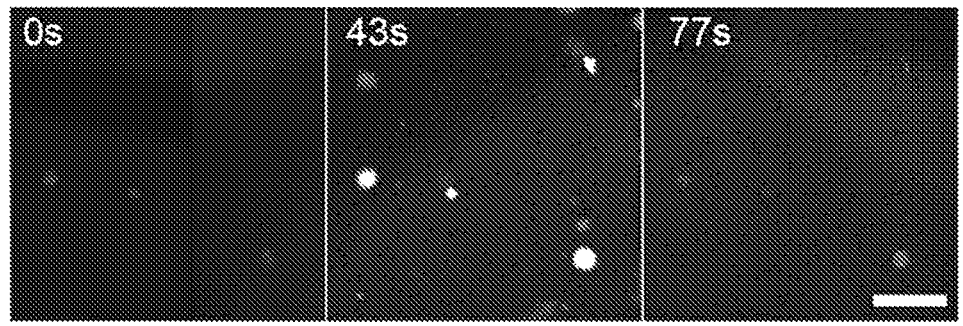
[Figure 5C]
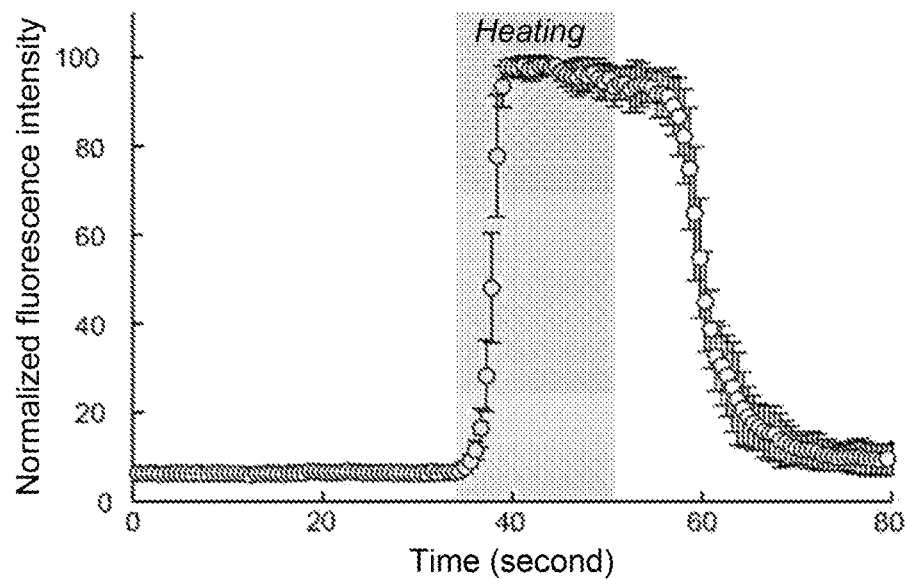

[Figure 5D]
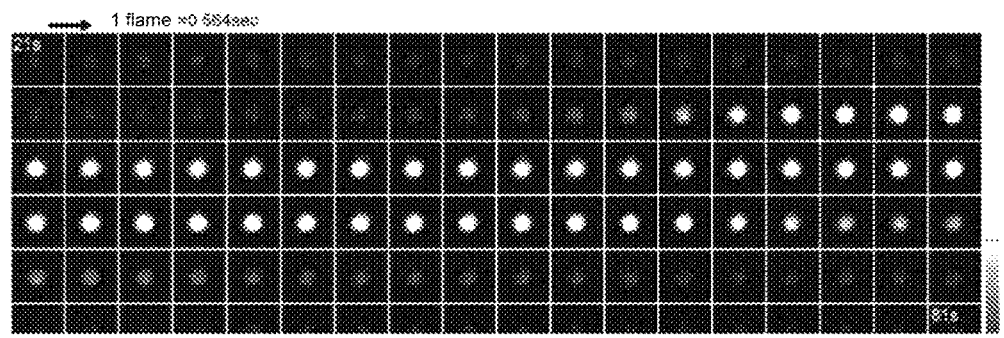
[Figure 6A]
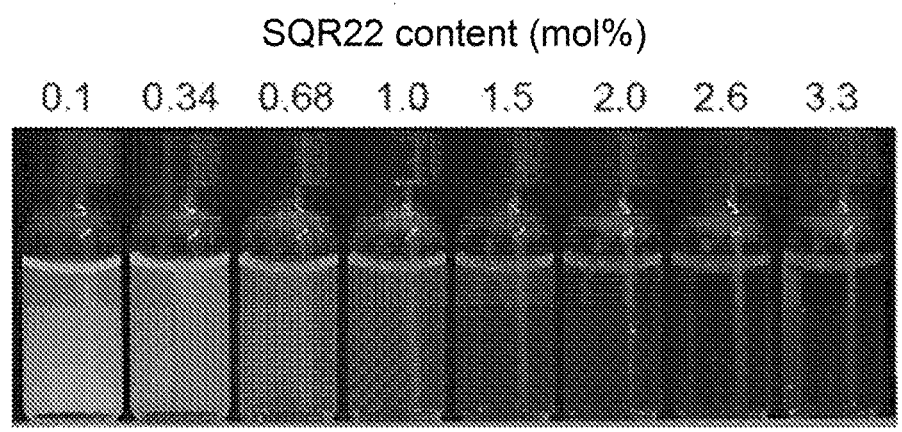

[Figure 6B]
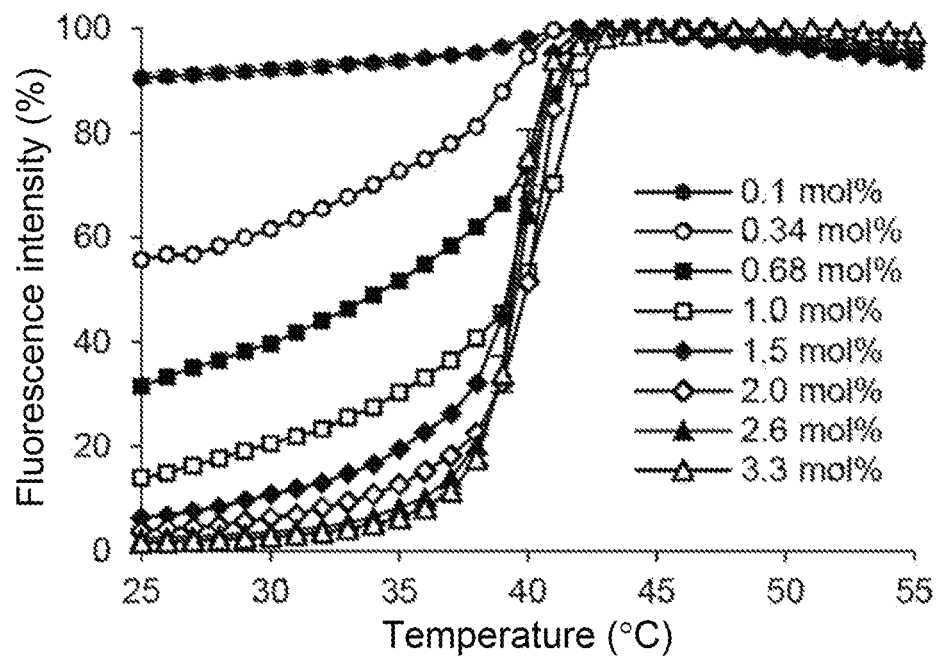
[Figure 6C]
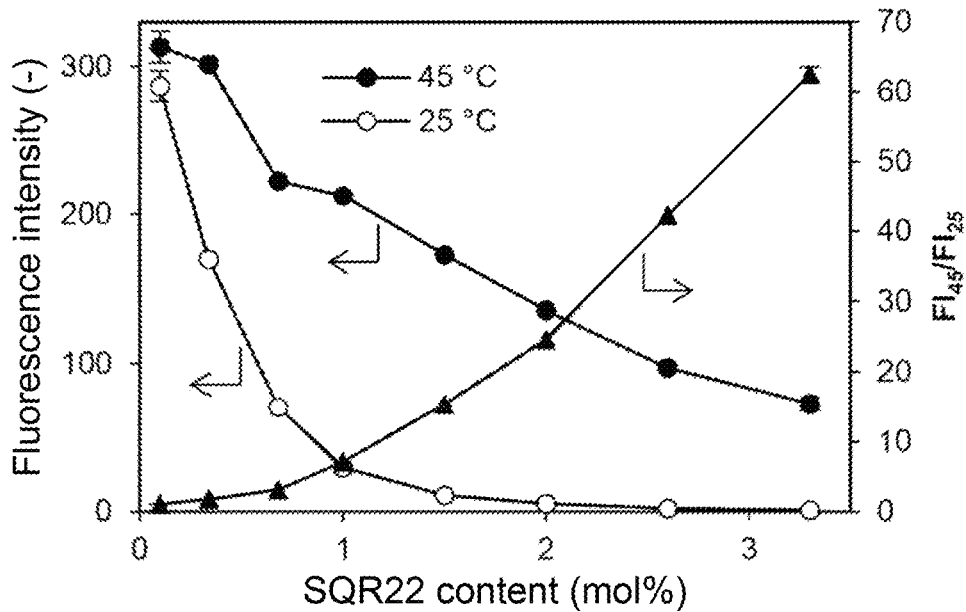

[Figure 6D1]
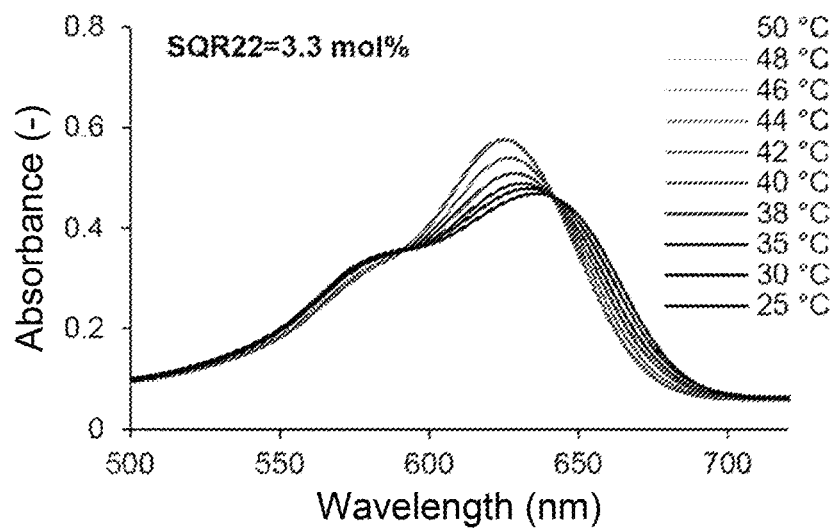
[Figure 6D2]
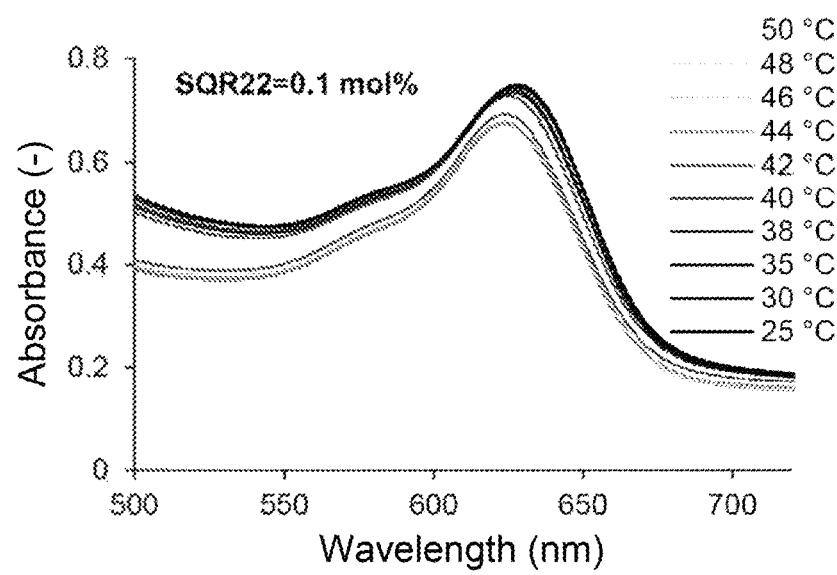

[Figure 6E]
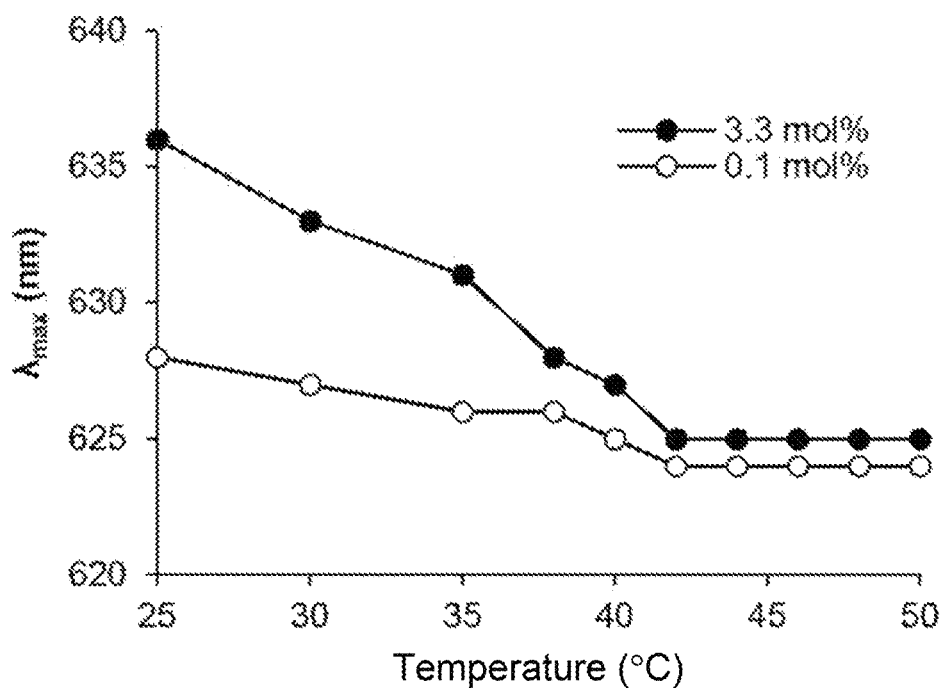

[Figure 7]
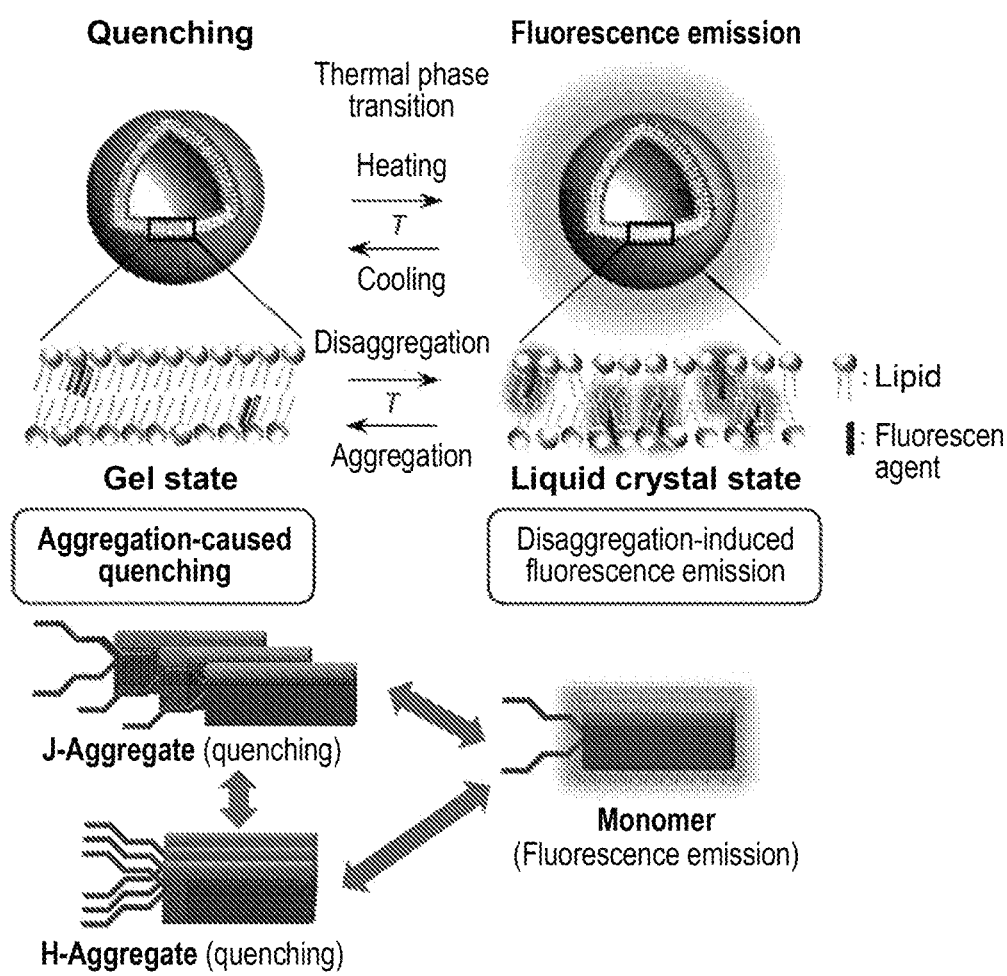

[Figure 8]
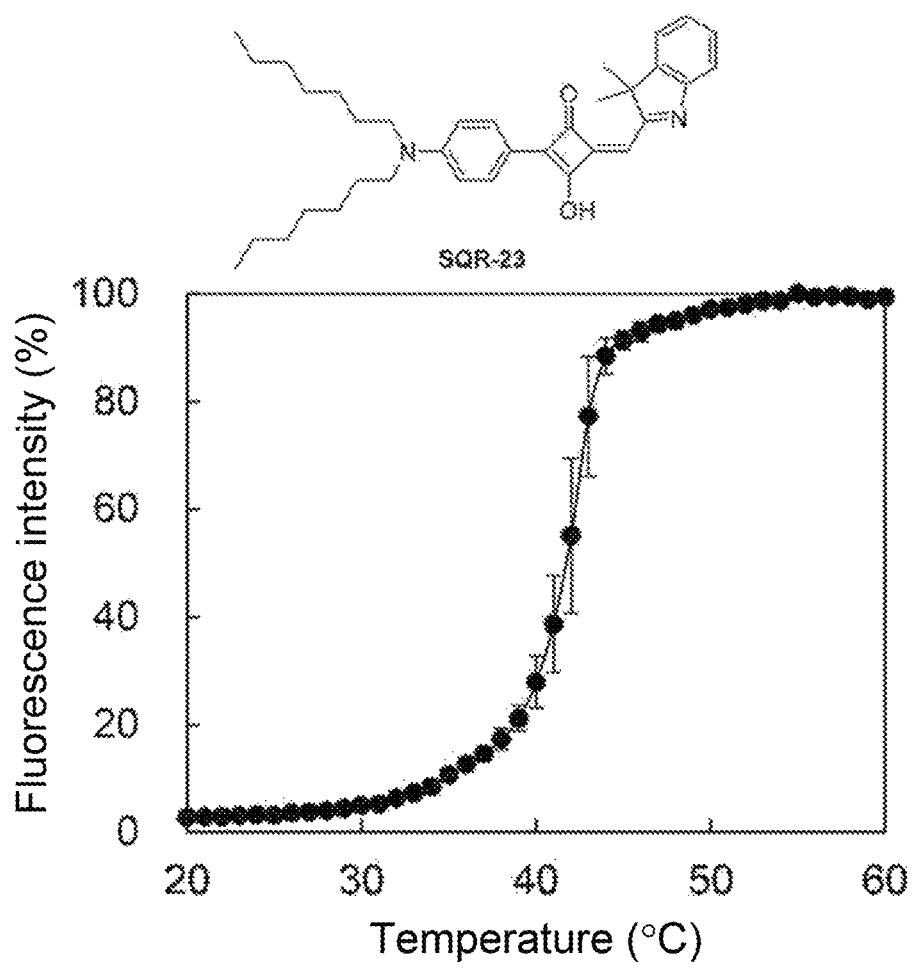

[Figure 9]
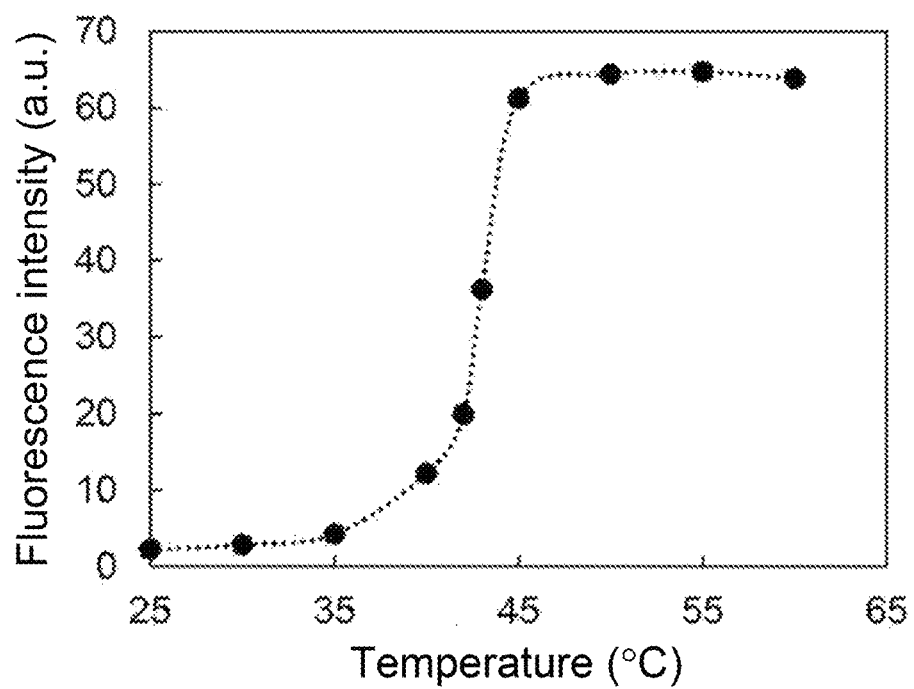

[Figure 10A]
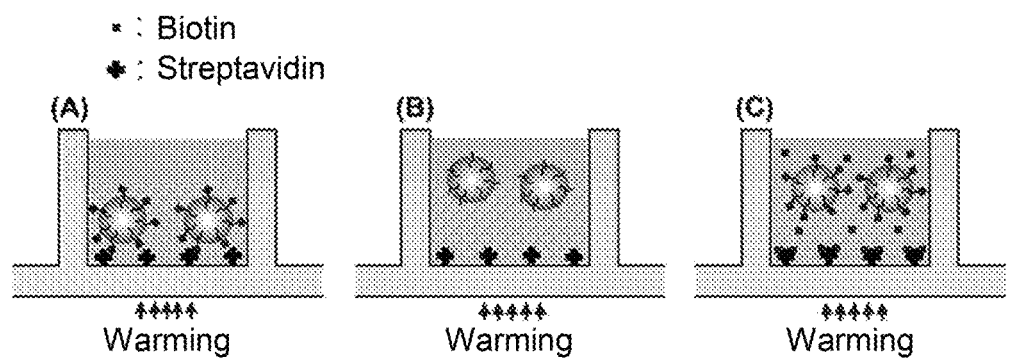
[Figure 10B]
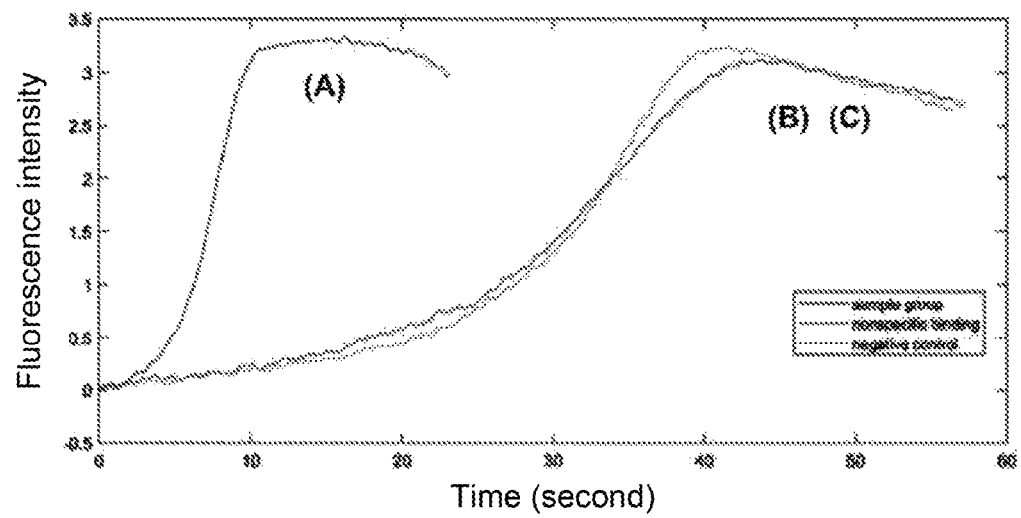

[Figure 11]
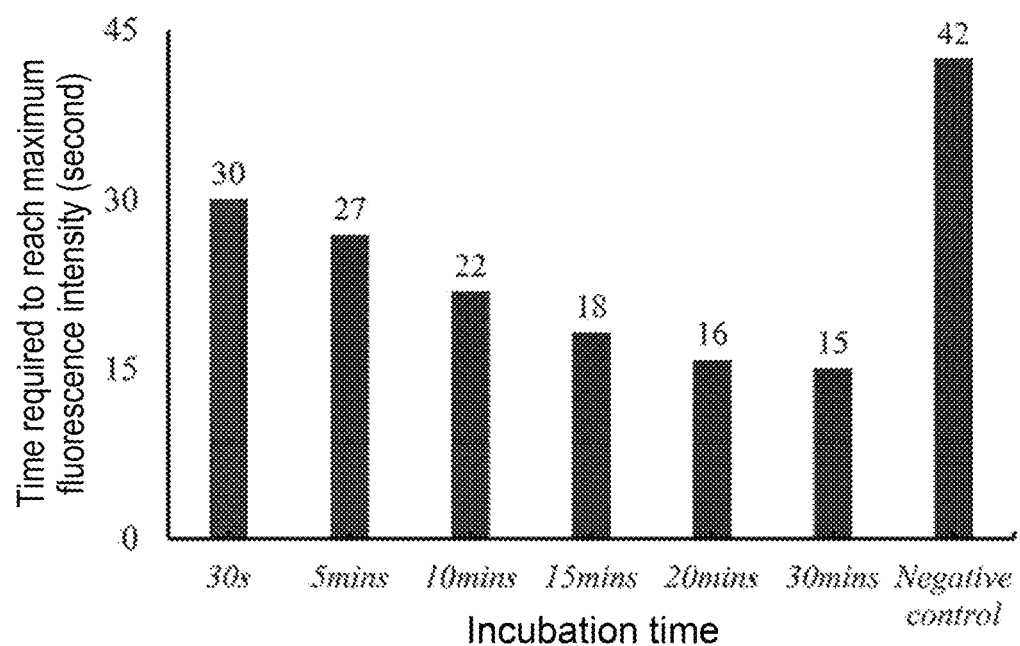

[Figure 12A]
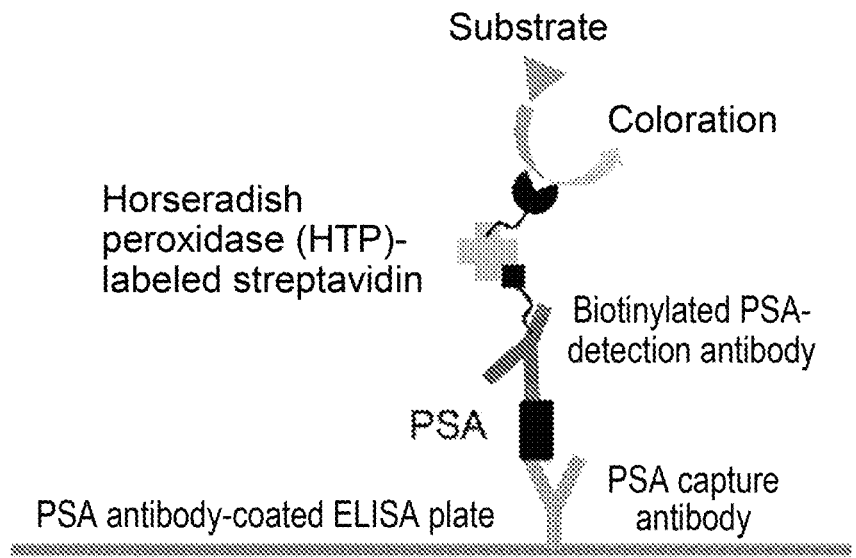
[Figure 12B]
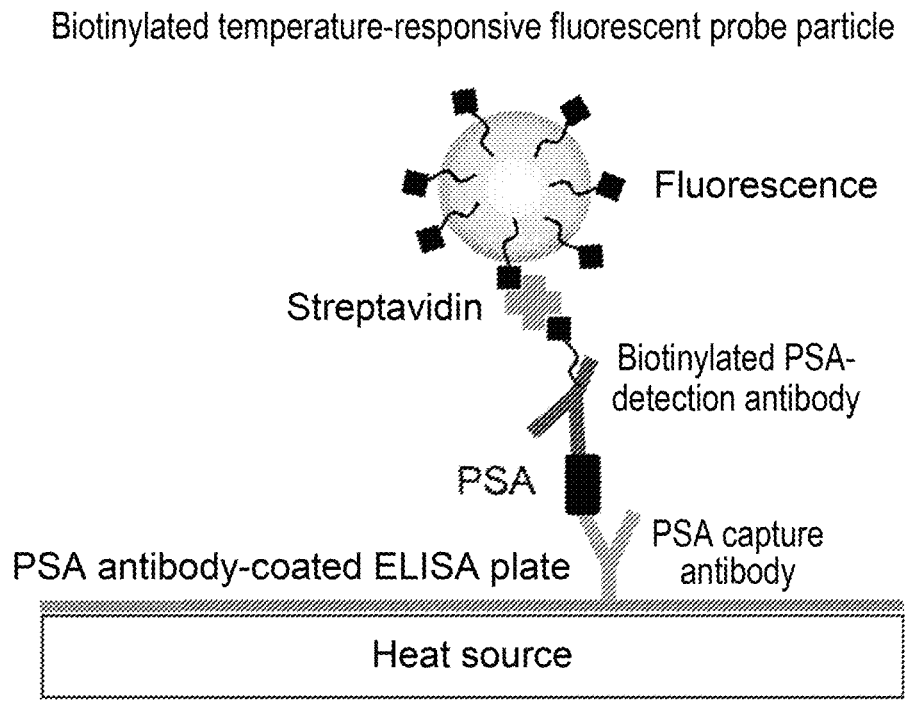

[Figure 12C]
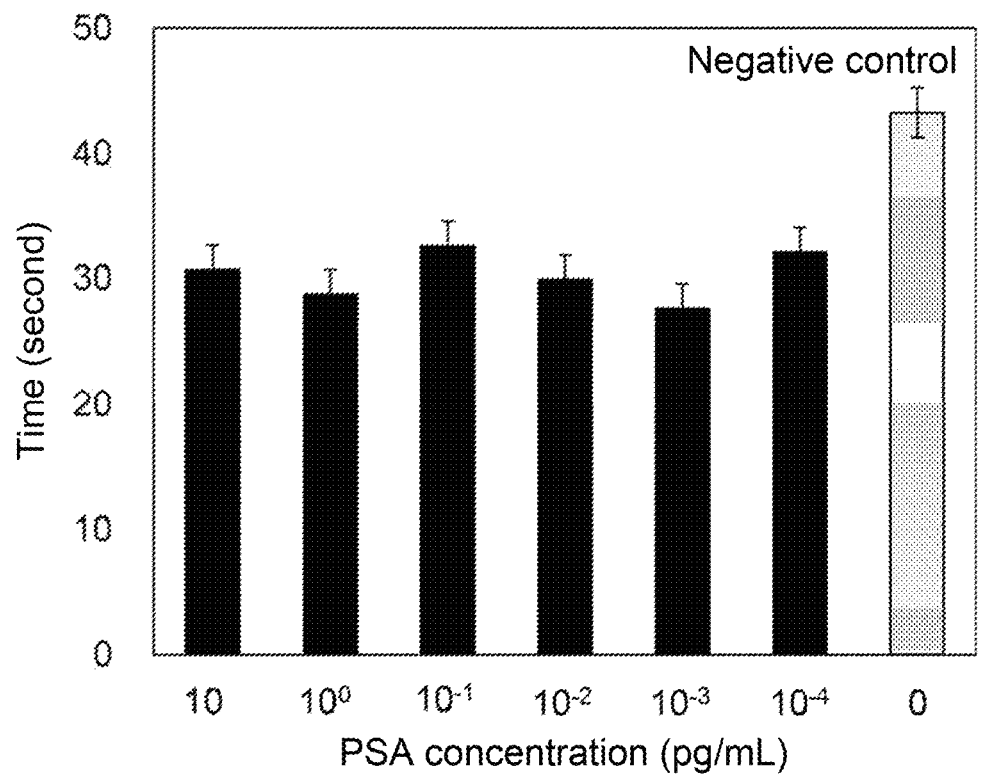

[Figure 13A]
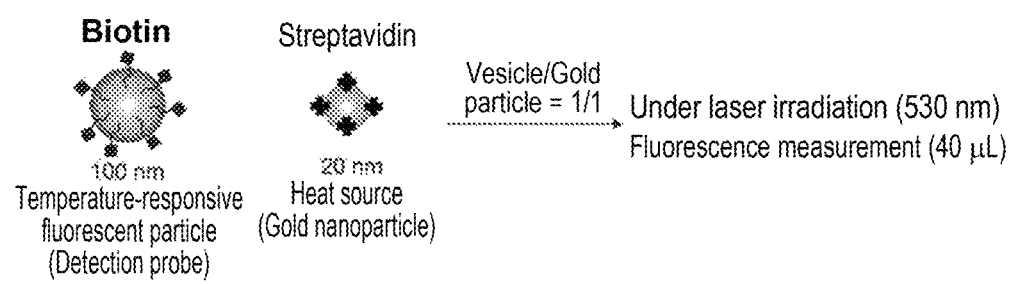
[Figure 13B]
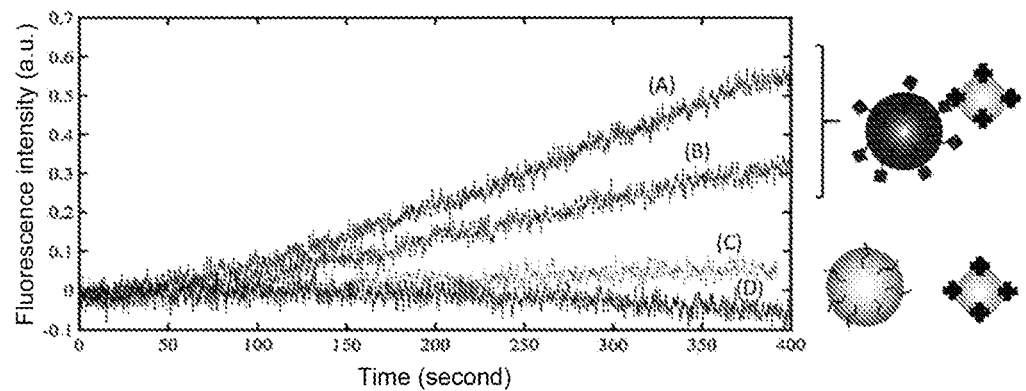

[Figure 14A]
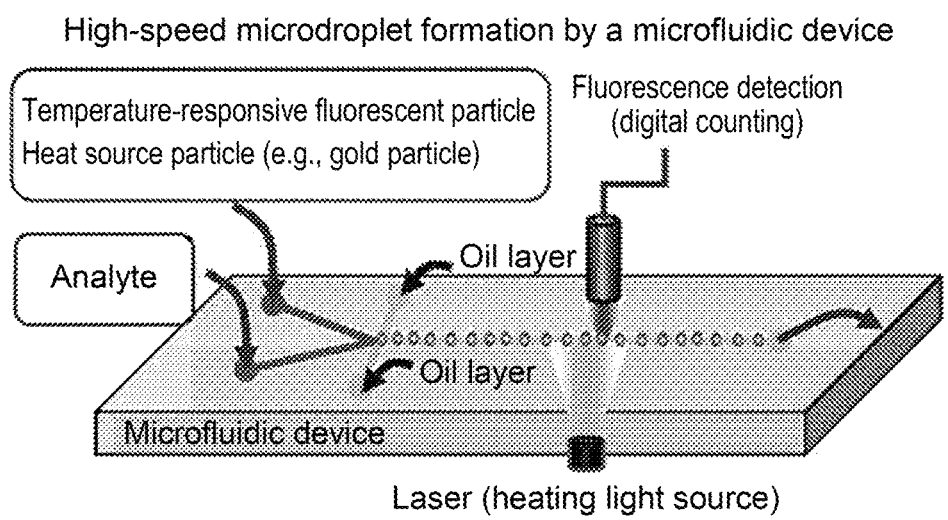
[Figure 14B]
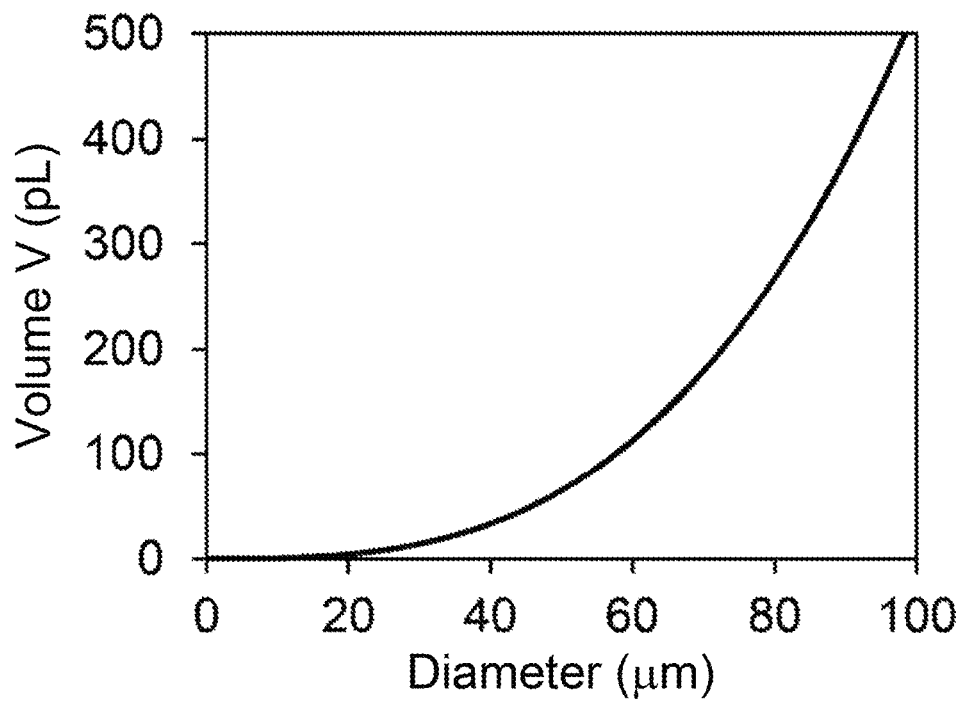

[Figure 14C]
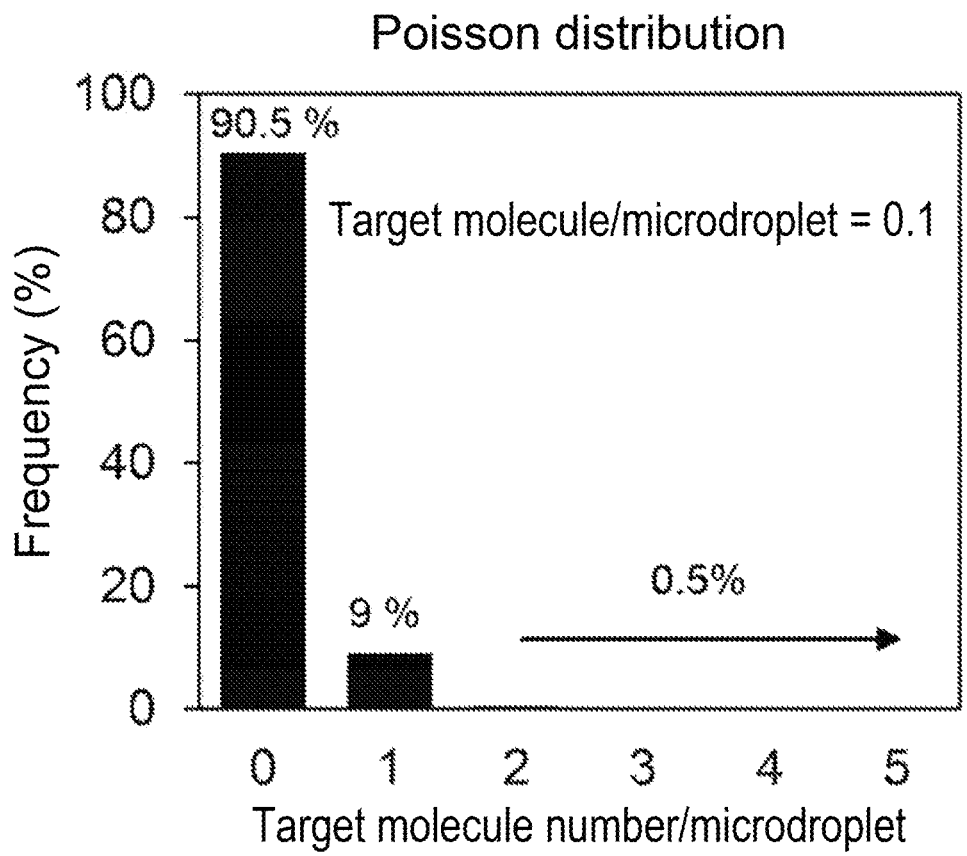
[Figure 14D]
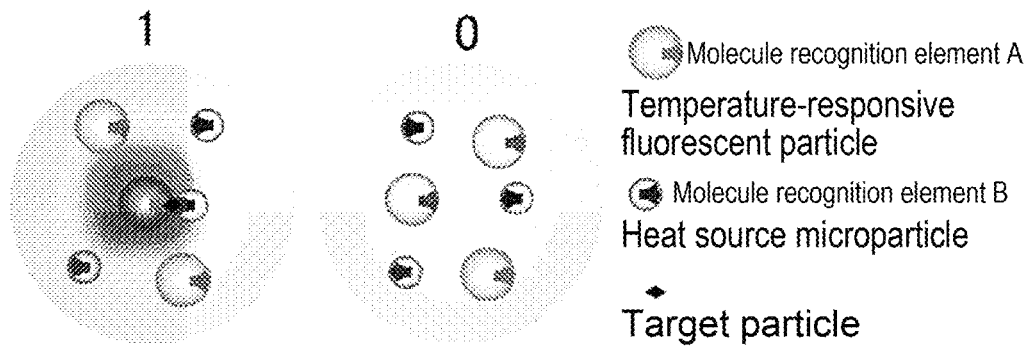
Molecular number concentration $\fallingdotseq N_F / V \times N$
$N_F$: Number of microdroplets that have emitted fluorescence
$N$: Total number of microdroplets
$V$: Volume of microdroplet

[Figure 15]
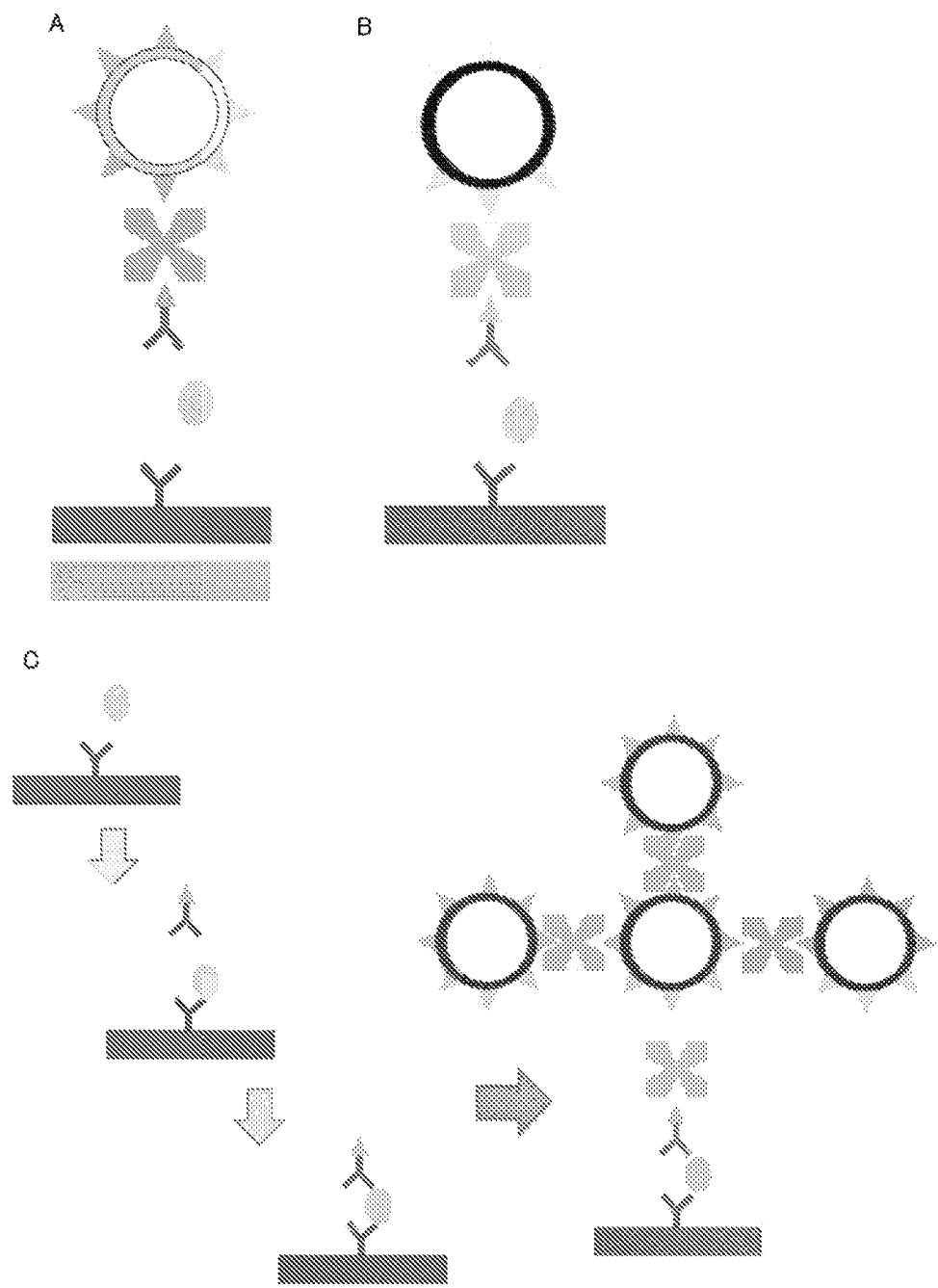

[Figure 16A]
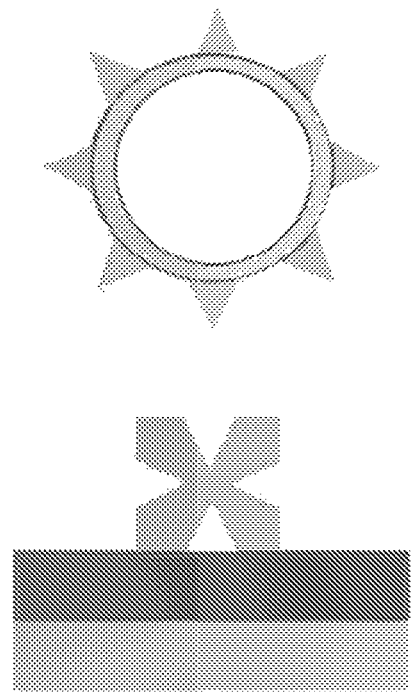
[Figure 16B]
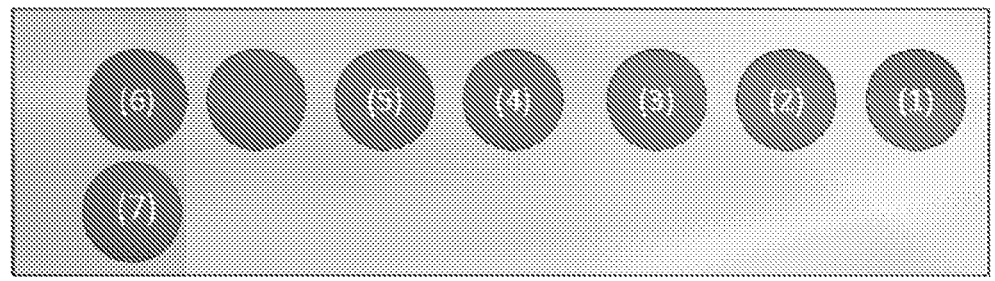

[Figure 16C]
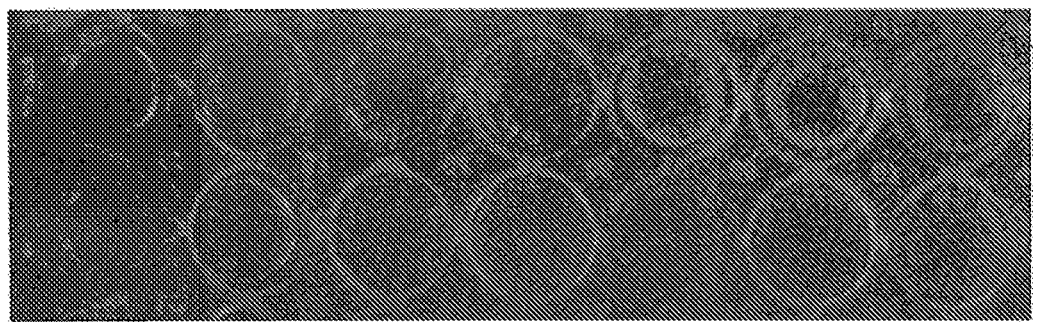
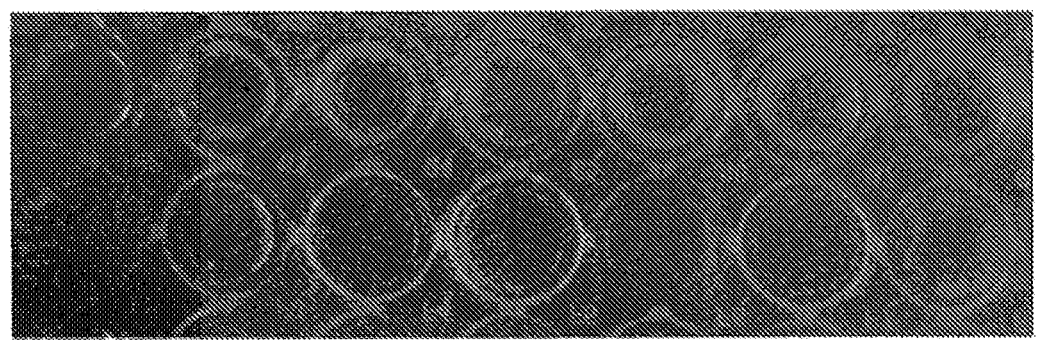

[Figure 16D]
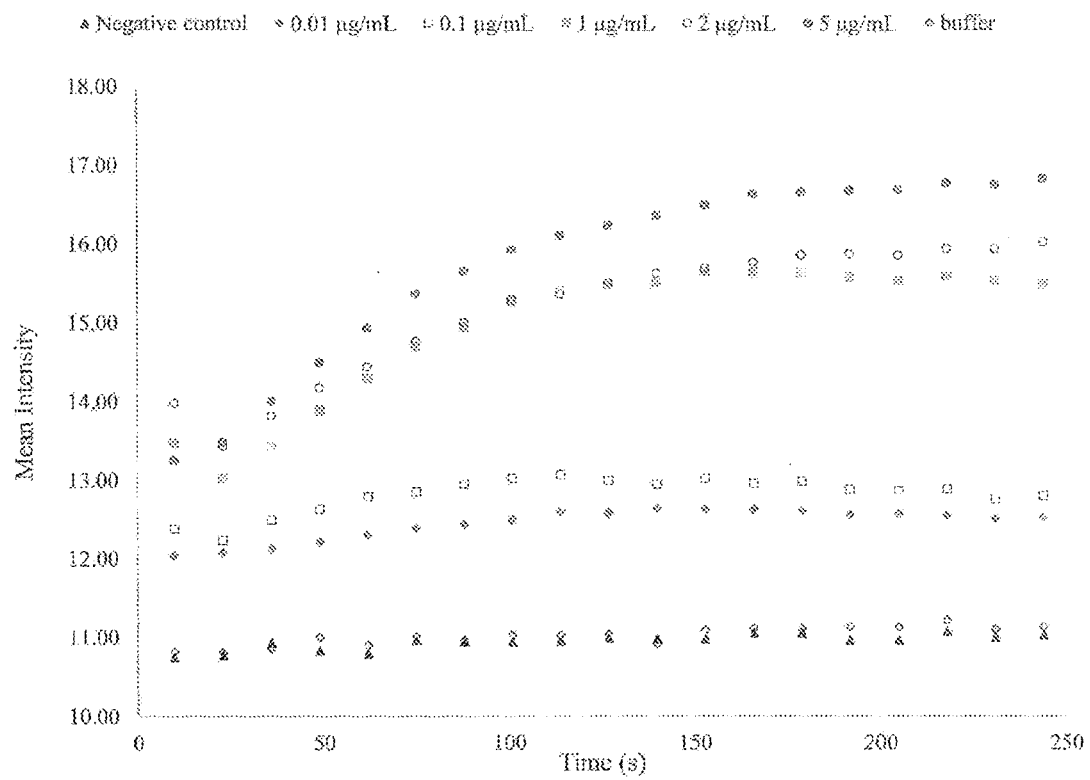
[Figure 17A]
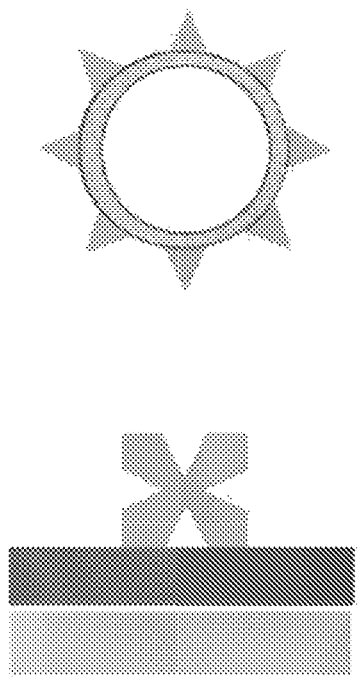

[Figure 17B]
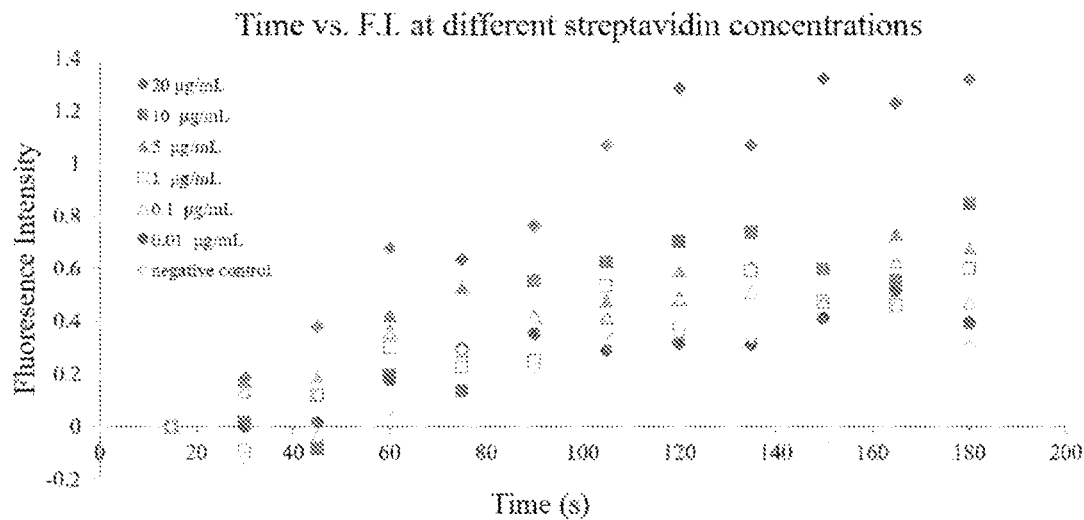
[Figure 17C]
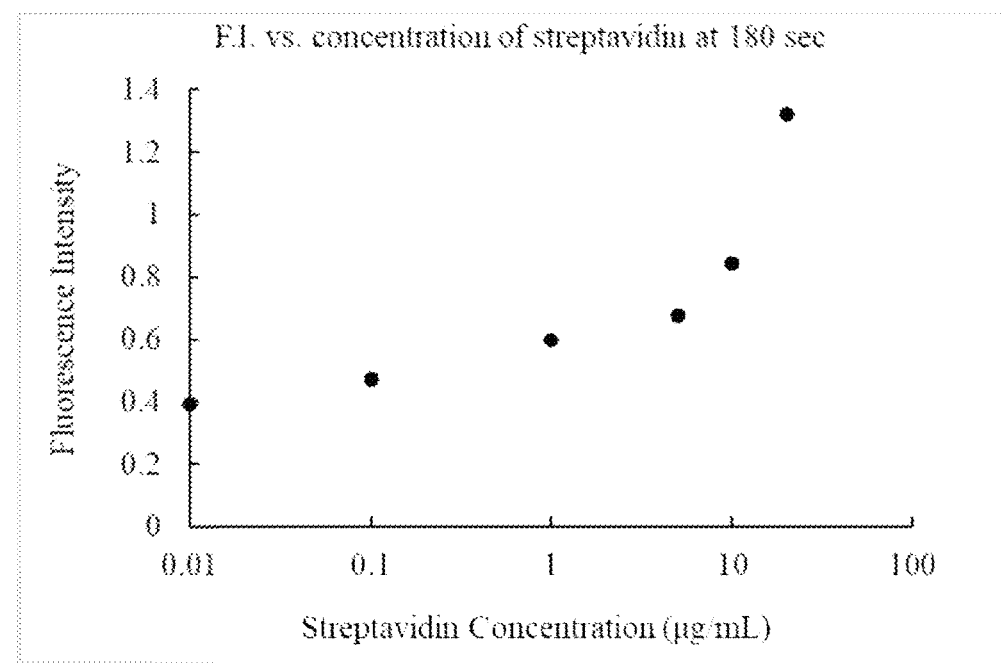

[Figure 18]
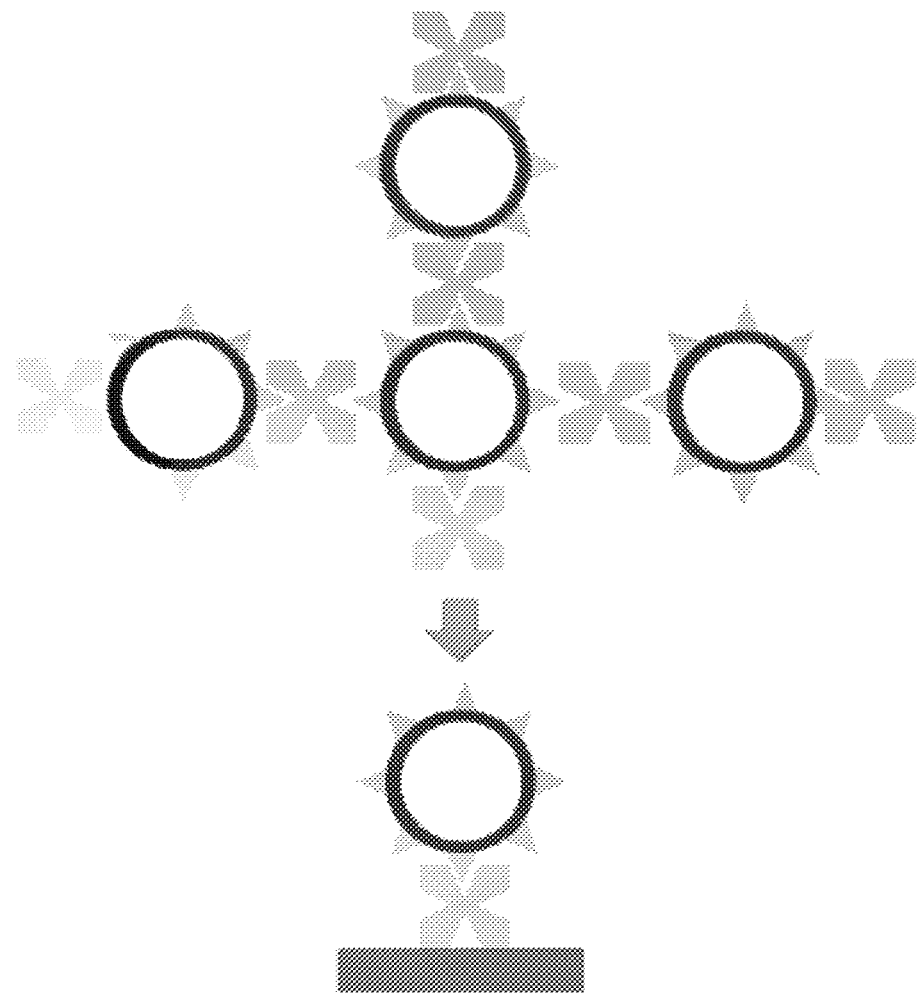

[Figure 19A]
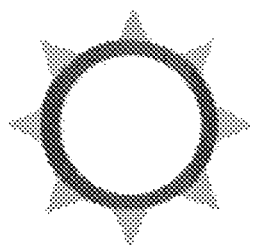
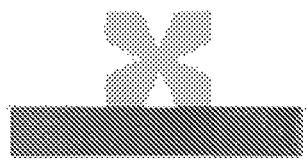
[Figure 19B]
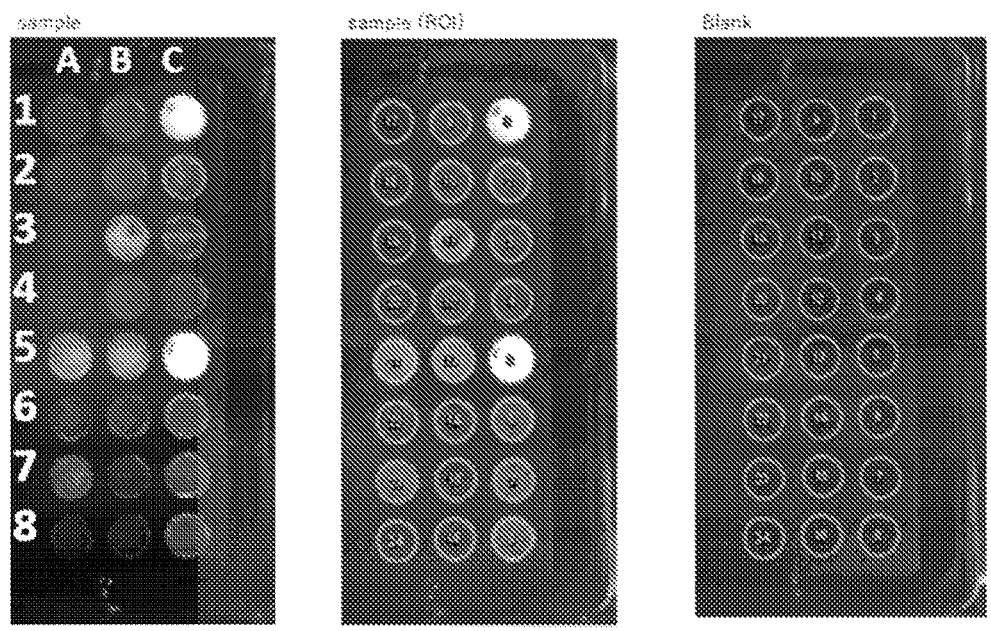

[Figure 19C]
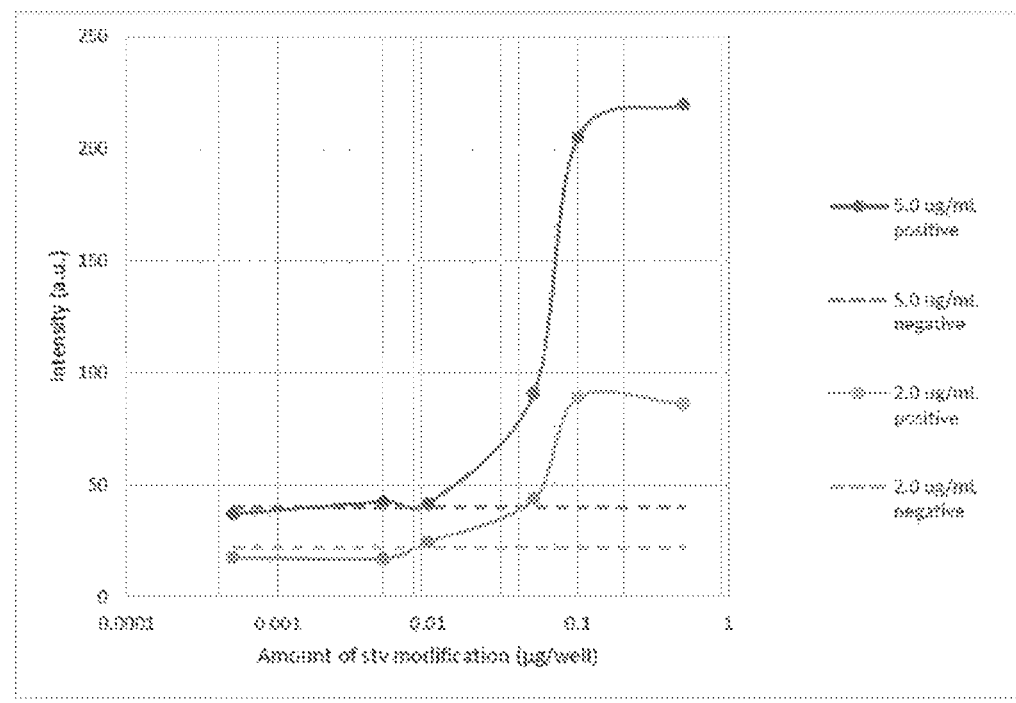

TEMPERATURE-RESPONSIVE FLUORESCENT PARTICLES FOR DETECTION OF BIOMOLECULES

TECHNICAL FIELD

The present invention relates to temperature-responsive fluorescent particles for detecting a biomolecule, temperature-responsive fluorescent probe particles with the temperature-responsive fluorescent particles, and methods for detecting and quantitatively determining a biomolecule with the particles.

BACKGROUND ART

In recent years, the ELISA method has been often used for detecting and quantitatively determining biomolecules (biomarkers). Since the ELISA method uses an antigen-antibody reaction, high specificity can be obtained, but operations such as reagent washing and an enzymatic reaction are complicated and time-consuming as well as the limit of the detection concentration of biomolecules is approximately 1 pM.

Methods for detecting biomolecules, which are further advanced types of the ELISA method, have also been developed. For example, a method referred to as a digital ELISA method has realized high sensitivity by devising a reaction device to carry out an enzymatic reaction in microdroplets (of femtoliter size) (Non Patent Literatures 1 and 2). However, these methods are the same in measurement principle as that of the ELISA method, and a problem is that the operations are more complicated and more time-consuming than the conventional ELISA method.

Single Molecule Counting (SMC™) Immunoassay Technology has been developed as a molecular detection technology (Non Patent Literature 3). This technology is also based on the ELISA method, but has been improved in detection sensitivity by devising the optical system of the detector so that the detection area is a microarea. However, it requires a dedicated and expensive detector, and it is time consuming in measurement because the microarea is repeatedly scanned and measured.

The immunochromatography method is also used (Non Patent Literature 4), but it is disadvantageous in that it cannot be used for early detection of diseases and infections due to its low sensitivity and it is high in false negative rate (20 to 30%) due to a difference in visual sensitivity between judges by visual judgment.

Since detection sensitivity of 1 pM or less is required for early diagnosis of epidemics and infections with biomarkers, a detection method that can be carried out with high sensitivity in a simple manner in a short time is expected to be developed.

CITATION LIST

Non Patent Literature

Non Patent Literature 1: Rissin D. M., et al, Nat Biotechnol. 2010:28(6): 595-9
Non Patent Literature 2: Kim S. H., et al, Lab Chip, 2012, 12, 4986-4991
Non Patent Literature 3: Hwang J., et al, Methods, 2019, 158, 69-79
Non Patent Literature 4: Hurt C. A., et al, J. Clin. Virol., 2007, 39, 132-135

SUMMARY OF INVENTION

Technical Problem

An object of the present invention is to provide a measurement method for a target biomolecule capable of detecting a low concentration of target biomolecule (biomarker) in a simple manner in a short time, and a temperature-responsive fluorescent particle and a temperature-responsive fluorescent probe for use in the measurement method.

Solution to Problem

The present inventors have synthetized a squaric acid derivative having fluorescent properties represented by the following formula I as a fluorescent molecule. The present inventors have found that when this compound is incorporated into a lipid vesicle exhibiting a gel-liquid crystal phase transition, the fluorescence emission is not observed at a temperature at which the lipid vesicle is in the gel phase, but a strong fluorescence emission appears by heating a dispersion of the lipid vesicle to convert its phase into a liquid crystal phase, and have completed a temperature-responsive fluorescent particle of the present invention. In addition, the present inventors have elucidated the mechanism of this phenomenon to clarify that the fluorescent molecule is quenched by aggregation when in the gel phase and it emits fluorescence by disaggregation when in the liquid crystal phase. Furthermore, based on the temperature-responsive fluorescent particle and the above mechanism, the present inventors have developed the temperature-responsive fluorescent particle into a temperature-responsive fluorescent probe particle comprising the temperature-responsive fluorescent particle the surface of which is modified with a biomolecule recognition element, and the present inventors have established a method for detecting a target biomolecule and a method for quantitatively determining the biomolecule.

[Formula 1]

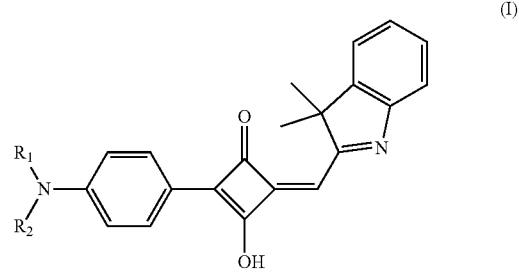

wherein $R_1$ and $R_2$ each independently represent hydrophobic groups that may be the same or different.

Specifically, the present invention provides a temperature-responsive fluorescent particle comprising at least one type of fluorescent molecule in a molecular assembly comprising and constituted by at least one type of amphiphilic molecule (hereinafter also referred to as "amphiphilic lipid molecule" when the molecule is a lipid molecule), wherein the fluorescent molecule emits fluorescence when the molecular assembly is in the liquid phase and it is quenched when the molecular assembly is in the solid phase, due to a temperature-responsive solid-liquid phase transition, so that fluorescence emission and quenching of the fluorescent molecule are reversibly switched in a temperature responsive manner. The above-described molecular assembly preferably has a monolayer membrane or a bilayer membrane.

The temperature-responsive fluorescent particle as described above, characterized in that the molecular assembly has the fluorescent molecule in an aggregated form when in the solid phase and it has the fluorescent molecule in a disaggregated form when in the liquid phase, and
that the fluorescent molecule is a compound represented by the following general formula A. When the molecular assembly is a molecular assembly having a lipid bilayer, the solid phase is a gel phase and the liquid phase is a liquid crystal phase.

[Formula 2]

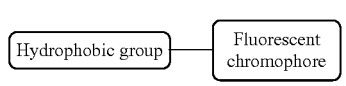

(A)

The temperature-responsive fluorescent particle of the present invention may emit fluorescence by disaggregation of the fluorescent molecule when the molecular assembly is in the liquid crystal phase and may be quenched by aggregation of the fluorescent molecule when the molecular assembly is in the gel phase, due to a phase transition of the molecular assembly.

In the temperature-responsive fluorescent particle of the present invention, the above-described fluorescent molecule may be a squaric acid derivative.

In the temperature-responsive fluorescent particle of the present invention, the above-described fluorescent molecule may be a compound represented by the following general formula I:

[Formula 3]

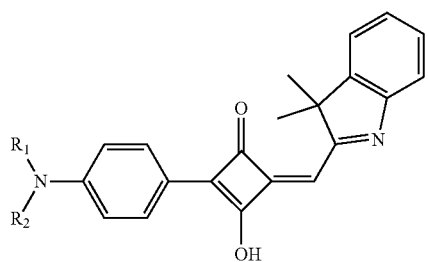

(I)

wherein $R_1$ and $R_2$ each independently represent hydrophobic groups that may be the same or different.

In the temperature-responsive fluorescent particle of the present invention, $R_1$ and $R_2$ each may be a linear saturated hydrocarbon.

In the temperature-responsive fluorescent particle of the present invention, $R_1$ and $R_2$ each may be selected form n-butyl group, n-pentyl group or n-hexyl group.

In the temperature-responsive fluorescent particle of the present invention, the above-described amphiphilic molecule may be a phospholipid.

In the temperature-responsive fluorescent particle of the present invention, the above-described molecular assembly may be a bilayer membrane vesicle such as a lipid vesicle.

In the temperature-responsive fluorescent particle of the present invention, the above-described bilayer membrane vesicle may contain 0.3 mol % or more of the compound represented by the above general formula I.

The present invention also provides a temperature-responsive fluorescent probe particle comprising the temperature-responsive fluorescent particle the surface of which is modified with a biomolecule recognition element.

In the temperature-responsive fluorescent probe particle of the present invention, the biomolecule recognition element may be an antibody or a variable region of the antibody or a fab fragment of the antibody.

The present invention also provides a method for detecting or quantitatively determining a biomolecule, characterized by comprising: a step of contacting the above-described temperature-responsive fluorescent probe particle and a biological sample with a biomolecule recognition element for capture immobilized on a substrate; a step of washing the substrate; and a step of measuring fluorescence emission.

The present invention further provides a method for detecting a biomolecule comprising detecting a target biomolecule by fluorescence emission, comprising:
a step of adhering the above-described temperature-responsive fluorescent probe particle to a heat source by specific molecular recognition via the target biomolecule; and
a step of detecting fluorescence emission, wherein heat conduction from the heat source to the temperature-responsive fluorescent probe particle increases the temperature of the temperature-responsive fluorescent particle, so that the phase transition from the gel phase to the liquid crystal phase of the temperature-responsive fluorescent probe particle occurs in a temperature responsive manner and the phase transition causes the fluorescence emission of a fluorescent molecule in the temperature-responsive fluorescent probe particle.

The present invention further provides a method for detecting a biomolecule, comprising:
a step of forming a complex constituted by the above-described temperature-responsive fluorescent probe particle, a target biomolecule, a biomolecule recognition element for capture and a heat source; and
a step of measuring fluorescence emission, wherein the formation of the complex promotes heat conduction from the heat source to the temperature-responsive fluorescent probe, so that the phase transition from the gel phase to the liquid crystal phase of the temperature-responsive fluorescent probe causes the fluorescence emission of the fluorescent molecule.

In addition, the present invention provides a method for detecting a biomolecule, comprising:
a step of forming a complex comprising and constituted by the above-described temperature-responsive fluorescent probe particle, a target biomolecule and a biomolecule recognition element for capture;
a step of removing the temperature-responsive fluorescent probe that has not formed a complex with the biomolecule recognition element for capture; and
a step of measuring fluorescence emission from the temperature-responsive fluorescent probe particle constituting the complex.

The present invention provides a method for quantitatively determining a biomolecule, wherein in the method for detecting a biomolecule as described above, the number of target biomolecules in a test sample is counted by counting the number of temperature-responsive (hereinafter also referred to as "temperature-sensitive") fluorescent probe particles that have emitted fluorescence.

In the method for quantitatively determining a biomolecule of the present invention, the number of temperature-sensitive fluorescent probe particles that have emitted fluorescence may be counted by detecting fluorescence emission generated by one molecule of the target biomolecule contained in microdroplets prepared from the test sample and counting the number of microdroplets that have emitted fluorescence. Alternatively, in the method for quantitatively determining a biomolecule of the present invention, a substrate (such as a microplate) may be used to take an image with a camera to acquire fluorescence emission data at once.

In the method for quantitatively determining a biomolecule of the present invention, the detection limit for the target biomolecule may be one target biomolecule per test sample.

That is, the present invention relates to the following.

[1] A temperature-responsive fluorescent particle comprising at least one type of fluorescent molecule in a molecular assembly comprising and constituted by at least one type of amphiphilic molecule,
wherein the fluorescent molecule is quenched when the molecular assembly is in the solid phase and it emits fluorescence when the molecular assembly is in the liquid phase, due to a temperature-responsive solid-liquid phase transition,
so that quenching and fluorescence emission of the fluorescent molecule are reversibly switched in a temperature responsive manner.

[2] The temperature-responsive fluorescent particle according to [1], wherein the molecular assembly has the fluorescent molecule in an aggregated form when in the solid phase and it has the fluorescent molecule in a disaggregated form when in the liquid phase, and the fluorescent molecule is a compound represented by the following general formula A:

[Formula 4]

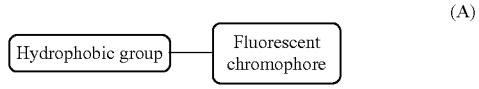

(A)

[3] The temperature-responsive fluorescent particle according to [2], wherein the fluorescent molecule is a compound represented by the following general formula I.

[Formula 5]

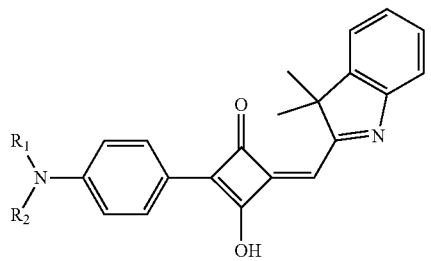

(I)

wherein $R_1$ and $R_2$ each independently represent hydrophobic groups that may be the same or different.

[4] The temperature-responsive fluorescent particle according to any one of [1] to [3], wherein the molecular assembly has a lipid bilayer, and the fluorescent molecule is quenched when the molecular assembly is in the gel phase and it emits fluorescence when the molecular assembly is in the liquid crystal phase, due to a temperature-responsive gel-liquid crystal phase transition,
so that quenching and fluorescence emission of the fluorescent molecule are reversibly switched in a temperature responsive manner.

[5] The temperature-responsive fluorescent particle according to any one of [1] to [4], wherein the amphiphilic molecule is a phospholipid.

[6] The temperature-responsive fluorescent particle according to [5], wherein the molecular assembly is a bilayer membrane vesicle.

[7] The temperature-responsive fluorescent particle according to [6], wherein the bilayer membrane vesicle is a lipid vesicle.

[8] The temperature-responsive fluorescent particle according to [6] or [7], wherein the bilayer membrane vesicle contains 0.3 mol % or more of the compound represented by the formula I.

[9] A temperature-responsive fluorescent probe particle, comprising the temperature-responsive fluorescent particle according to any one of [1] to [8] the surface of which is modified with a biomolecule recognition element.

[10] The temperature-responsive fluorescent probe particle according to [9], wherein the biomolecule recognition element is biotin, an antibody or a variable region of the antibody or a fab fragment of the antibody, or an aptamer.

[11] The temperature-responsive fluorescent probe particle according to any one of [1] to [10], wherein the solid-liquid phase transition temperature of the temperature-responsive fluorescent probe particle is 30° C. or less.

[12] A method for detecting or quantitatively determining a biomolecule contained in a biological sample, comprising:
(1) a step of contacting the temperature-responsive fluorescent probe particle according to [9] or [10] and the biological sample with a biomolecule recognition element for capture immobilized on a substrate;
(2) a step of heating the substrate; and
(3) a step of measuring fluorescence emission.

[13] A method for detecting or quantitatively determining a biomolecule, comprising:
(1) a step of contacting the temperature-responsive fluorescent probe particle according to [9] or [10] and a biological sample with a biomolecule recognition element for capture immobilized on a substrate;
(2) a step of washing the substrate; and
(3) a step of measuring fluorescence emission.

[14] The method according to [13], wherein the solid-liquid phase transition temperature of the temperature-responsive fluorescent probe particle is 30° C. or less.

[15] The method according to any one of [12] to [14], wherein the step (1) is a step of contacting the temperature-responsive fluorescent probe particle according to [9] or [10], an element recognizing a biomolecule recognition element, a biomolecule recognition element for detection and the biological sample with the biomolecule recognition element for capture immobilized on the substrate.

[16] The method according to [15], wherein the biomolecule recognition element is biotin, and the element recognizing a biomolecule recognition element is streptavidin, avidin or NeutrAvidin.

[17] A method for detecting a biomolecule, comprising:
a step of forming a complex comprising and constituted by the temperature-responsive fluorescent probe particle according to [9] or [10], a target biomolecule, a biomolecule recognition element for capture and a heat source; and
a step of measuring fluorescence emission, wherein the formation of the complex promotes heat conduction from the heat source to the temperature-responsive fluorescent probe particle, so that the phase transition from the solid phase (including the gel phase: the same applies hereinafter) to the liquid phase (including the liquid crystal phase: the same applies hereinafter) of the temperature-responsive fluorescent probe particle causes the fluorescence emission of the fluorescent molecule.

[18] A method for detecting a biomolecule, comprising:
a step of forming a complex comprising and constituted by the temperature-responsive fluorescent probe particle according to [9] or [10], a target biomolecule and a biomolecule recognition element for capture;
a step of removing the temperature-responsive fluorescent probe particle that has not formed a complex with the biomolecule recognition element for capture; and
a step of measuring fluorescence emission from the temperature-responsive fluorescent probe particle constituting the complex.

[19] A method for quantitatively determining a biomolecule, wherein in the method for detecting a biomolecule according to [17] or [18], the number of target biomolecules in a test sample is counted by counting the number of temperature-responsive fluorescent probe particles that have emitted fluorescence.

[20] A kit for detecting or measuring a biomolecule, comprising the temperature-responsive fluorescent probe particle according to [9] or [10].

[21] The kit according to [20], comprising a biomolecule recognition element for capture.

[22] The kit according to [21], wherein the biomolecule recognition element for capture is immobilized on a substrate.

[23] The kit according to [21] or [22], comprising a biomolecule recognition element for detection.

[24] The kit according to any one of [20] to [23], comprising an element recognizing a biomolecule recognition element.

[25] The kit according to any one of [20] to [24], wherein the biomolecule recognition element is biotin, and the element recognizing a biomolecule recognition element is streptavidin, avidin or NeutrAvidin.

[26] The kit according to any one of [20] to [25], comprising a washing liquid.

Advantageous Effects of Invention

According to the present invention, it is possible to provide a measurement method capable of detecting a low concentration of target biomolecules (biomarkers) in a simple manner in a short time, and a temperature-responsive fluorescent particle and a temperature-responsive fluorescent probe particle for use in the measurement method. More specifically, according to the present invention, it is possible to adjust the temperature of switching between the quenched state and the emitting state of the temperature-responsive fluorescent probe particle, unlike the conventional fluorescent probe particle. Therefore, it is possible to provide fluorescent probe particles that respond at a temperature suitable for each of various detection devices, detectors and measurement conditions, and the present invention can be carried out in a wide range of applications as simple, rapid and highly sensitive methods for detecting and quantitatively determining a biomolecule.

BRIEF DESCRIPTION OF DRAWINGS

FIG. 1A is photographs showing the visual appearance of an SQR22 solution under visible light (upper) and fluorescence emission under ultraviolet light (365 nm) (lower), as spectral characteristics of SQR22. The numbers in the photographs are as follows: 1: hexane; 2: cyclohexane; 3: toluene; 4: benzene; 5: dichloromethane; 6: tetrahydrofuran; 7: chloroform; 8: ethanol; 9: methanol; 10: acetone; 11: acetonitrile; 12: dimethylformamide; 13: dimethyl sulfoxide; and 14: water.

FIG. 1B is a graph showing the relationship between the fluorescence quantum yield and the maximum fluorescence emission wavelength, and the polarity of a solvent, as spectral characteristics of SQR22.

FIG. 2A is a diagram illustrating the chemical structure of SQR22 which is a fluorescent dye, and a lipid bilayer membrane particle (lipid vesicle) having SQR22 introduced thereinto (hereinafter abbreviated as "NVSQ").

FIG. 2B is a diagram showing the reversible temperature responsiveness, of SQR22 introduced into a lipid bilayer membrane particle, by heating and cooling. It shows the reversible temperature responsiveness of SQR22 in a lipid vesicle membrane by heating and cooling. The photographs show fluorescence of a $PC_{16}$-NVSQ dispersion (lipid/SQR22=50 w/w, SQR22 concentration=10 μM) at 25° C. (fluorescence OFF) and approximately 50° C. (fluorescence ON).

FIG. 2C is a graph showing changes in fluorescence intensity of $PC_{16}$-NVSQ over time when heated to 25° C. and 50° C. The arrow indicates the time when a sample (approximately 23° C.) was injected into a quartz cell incubated at a set temperature.

FIG. 2D is a graph showing the reproducibility of fluorescence switching of $PC_{16}$-NVSQ (SQR22 concentration=1 μM) when heating and cooling are repeated for 10 cycles. The fluorescence intensity was measured at 48° C. (heating) and 25° C. (cooling).

FIG. 3A shows a schematic diagram of an SQR22-containing molecular assembly (NVSQ) and a diagram showing the molecular structure of various phosphatidylcholines (PC).

FIG. 3B shows a diagram of the ultraviolet-visible-near-infrared absorption spectra and the visual appearance of SQR22-containing lipid bilayer membrane particle dispersions.

FIG. 4A is a photograph showing temperature-responsive fluorescence characteristics of PC-NVSQ. It shows the fluorescence of each of the PC-NVSQ dispersions at 25° C. (SQR22 concentration=10 μM). The numbers in the figure represent $PC_{14}$-NVSQ, $PC_{15}$-NVSQ, $PC_{16}$-NVSQ, $PC_{17}$-NVSQ and $PC_{18}$-NVSQ, from left to right.

FIG. 4B is a graph showing the fluorescence emission spectra (lipid/SQR22=50 w/w) of the PC-NVSQ dispersions. The fluorescence emission spectra ($\lambda_{ex}$=570 nm) were measured at 40, 45, 50, 55 and 60° C. for $PC_{14}$-NVSQ, $PC_{15}$-NVSQ, $PC_{16}$-NVSQ, $PC_{17}$-NVSQ and $PC_{18}$-NVSQ, respectively.

FIG. 4C is a graph showing a change in fluorescence intensity of each PC-NVSQ dispersion when increasing and decreasing the temperature (SQR22 concentration=1 μM).

The data is a mean±standard deviation of the results obtained from each of three separate experiments.

FIG. 5A is a schematic diagram showing reversible fluorescence switching of a $PC_{16}$ multilayer lipid vesicle containing 3.3 mol % of SQR22 when heated and cooled, in which heating is carried out with NIR laser irradiation at 980 nm and the fluorescence switching on the lipid vesicle containing SQR22 is carried out under microscopic observation.

FIG. 5B shows photographs of observed fluorescent images of lipid vesicles immobilized on an agarose gel. Photographs before heating (at 0 seconds), during heating (at 43 seconds) and after cooling (at 77 seconds) are shown.

FIG. 5C is a graph showing a change in fluorescence emission intensity of SQR22 observed over time on a $PC_{16}$ multilayer lipid vesicle containing 3.3 mol % of SQR22 when heated and cooled.

FIG. 5D is a diagram showing time-lapse images of a single lipid vesicle when heated and cooled.

FIG. 6A is a photograph showing the visual appearance of fluorescence of $PC_{16}$-lipid vesicles having different SQR22 contents (25° C.) (SQR22 concentration=10 μM), as a result of spectral analysis showing the mechanism of fluorescence switching.

FIG. 6B is a graph showing a change by temperature in fluorescence intensity of each of $PC_{16}$-lipid vesicle dispersions having different SQR22 contents. The data was acquired when decreasing the temperature.

FIG. 6C is a graph showing the correlation between the SQR22 content of $PC_{16}$-lipid vesicles and the fluorescence intensity at each temperature of 25° C. and 45° C., and the ratio between the fluorescence intensity at 25° C. ($FI_{25}$) and that at 45° C. ($FI_{45}$) (SQR22: 1 μM).

FIG. 6D1 is a graph showing a change by temperature in UV-vis-NIR spectrum of a $PC_{16}$-lipid vesicle containing 3.3 mol % of SQR22 (SQR22 concentration=10 μM).

FIG. 6D2 is a graph showing a change by temperature in UV-vis-NIR spectrum of a $PC_{16}$-lipid vesicle containing 0.1 mol % of SQR22 (SQR22 concentration=10 μM).

FIG. 6E is a graph showing a change by temperature in maximum absorption wavelength ($\lambda_{max}$) of UV-vis-NIR spectrum of each of $PC_{16}$-lipid vesicles containing 3.3 mol % and 0.1 mol % of SQR22 (SQR22 concentration=10 μM).

FIG. 7 is a schematic diagram showing a putative mechanism of fluorescence switching of SQR22 in a lipid bilayer membrane particle. The OFF/ON switching of fluorescence is caused by quenching by reversible aggregation of SQR22 and fluorescence emission by disaggregation of SQR22, at a transition temperature (T) from the gel phase to the liquid crystal phase of a lipid bilayer membrane particle.

FIG. 8 is a diagram showing the chemical structure of 3.3 mol % of SQR-23 and a change in fluorescence intensity of a $PC_{16}$ lipid vesicle dispersion containing SQR23 (SQR23 concentration=1 μM) when increasing the temperature. The data is a mean±standard deviation of the results obtained from each of three separate experiments.

FIG. 9 is a graph showing a change in fluorescence intensity (SQR22 concentration=1 μM) of a $PC_{16}$-lipid vesicle (containing 3.3 mol % of SQR22) the surface of which is modified with 0.5 mol % of biotin (temperature-responsive fluorescent probe particle model) when increasing the temperature.

FIG. 10 A is a diagram illustrating each of experimental groups in which a change in fluorescence emission due to binding of a biotinylated temperature-responsive fluorescent probe particle and a streptavidin-immobilized substrate (heat source) via molecular recognition was observed. (A) shows biotinylated temperature-responsive fluorescent probe particles caused to act on a streptavidin-immobilized substrate; (B) shows unmodified temperature-responsive fluorescent particles caused to act on a streptavidin-immobilized substrate; and (C) shows biotinylated temperature-responsive fluorescent probe particles caused to act on a streptavidin-immobilized substrate blocked with an excess of biotin.

FIG. 10B is a graph showing the results of the experiments illustrated in the above FIG. 10A. It shows a change in fluorescence intensity over time in each experimental group after the streptavidin-immobilized substrate was started warming (also referred to as heating: the same applies hereinafter).

FIG. 11 is a graph showing the relationship between the incubation time after adding a biotinylated temperature-responsive fluorescent probe particle to a streptavidin-immobilized substrate and the time from the start of warming until the fluorescence intensity reached the maximum.

FIG. 12A is a diagram (reference diagram) schematically showing the detection of PSA using a commercially available sandwich ELISA kit.

FIG. 12B is a diagram schematically showing the detection of PSA using a biotinylated temperature-responsive fluorescent probe particle.

FIG. 12C is a graph showing the relationship between a PSA concentration and the time from the start of warming until the fluorescence intensity reached the maximum in the detention of PSA using the biotinylated temperature-responsive fluorescent probe particle. Each of the data is a mean±standard deviation of three independent measurements.

FIG. 13A is a diagram illustrating an exemplary experimental system in which the fluorescence emitted by one temperature-responsive fluorescent probe is detected by binding of a biotinylated temperature-responsive fluorescent probe and a streptavidinated gold nanoparticle (heat source) via molecular recognition.

FIG. 13B is a diagram showing the experimental results in the experimental system illustrated in the above FIG. 12A. Each of (A) to (C) shows a change in fluorescence intensity over time in an experimental system in which a biotinylated temperature-responsive fluorescent probe and a streptavidinated gold nanoparticle are mixed, and (D) shows that in an experimental system, as a negative control, in which an unbiotinylated temperature-responsive fluorescent probe and a streptavidinated gold nanoparticle are mixed.

FIG. 14A is a diagram illustrating an exemplary digital counting method of the number of molecules using a microfluidic device. The configuration of microdroplet formation and fluorescence detection by a microfluidic device are shown.

FIG. 14B is a graph showing the relationship between the diameter and volume of a microdroplet.

FIG. 14C is a graph showing frequency of the number of target molecules included in one microdroplet under the conditions of the target molecule number/the microdroplet number=0.1 estimated from the Poisson distribution.

FIG. 14D is a diagram illustrating the calculation of the molecular number concentration by forming microdroplets and counting the number of microdroplets that have emitted fluorescence.

FIG. 15 is a diagram schematically showing the detection of a biomolecule using a temperature-responsive fluorescent probe particle and a biomolecule recognition element for detection to which the same biomolecule recognition element is added. A shows the detection with heating; B shows the detection without heating; and C shows that a tetrameric temperature-responsive fluorescent probe particle is bound to one biomolecule.

FIG. 16A is a diagram schematically showing Example 15.

FIG. 16B is a diagram showing the number assigned to each well used in Example 15.

FIG. 16C shows a photograph at 10 seconds (upper) and a photograph at 244 seconds (lower) of the wells in Example 15.

FIG. 16D is a graph showing the results of Example 15. The horizontal axis shows the elapsed time (in seconds), and the longitudinal axis shows the average fluorescence intensity.

FIG. 17A is a diagram schematically showing Example 16.

FIG. 17B is a graph showing the results of Example 16. The horizontal axis shows the elapsed time (in seconds), and the longitudinal axis shows the fluorescence intensity.

FIG. 17C is a graph showing the correlation between the fluorescence intensity (longitudinal axis) and the concentration of streptavidin (horizontal axis) at 180 seconds in Example 16.

FIG. 18 is a diagram schematically showing Example 17.

FIG. 19A is a diagram schematically showing Example 18.

FIG. 19B shows the results (photographs) of Example 18.

FIG. 19C is a graph generated from the measurement results of Example 18. The horizontal axis shows the amount of streptavidin added to the well, and the longitudinal axis shows the fluorescence intensity.

DESCRIPTION OF EMBODIMENTS

1. Temperature-Responsive Fluorescent Particle

One embodiment of the present invention is a temperature-responsive fluorescent particle.

The temperature-responsive fluorescent particle comprises at least one type of fluorescent molecule in a molecular assembly comprising and constituted by at least one type of amphiphilic lipid molecule. That is, the present invention utilizes the phenomenon that a quenching state due to aggregation of fluorescent molecules is switched to an emission state due to disaggregation thereof, with thermal transition (that is, a transition from a solid phase to a liquid phase, or a transition from a gel phase to a liquid crystal phase). Therefore, the temperature-responsive fluorescent particle used in the present invention can be used without particular limitation as long as the phase transition occurs from a solid phase state to a liquid phase state while maintaining the form of the molecular assembly. The molecular assembly preferably has a monolayer membrane or a bilayer membrane, and more preferably a lipid bilayer membrane (also referred to as a lipid bilayer). The present inventors have also confirmed that when a monolayer membrane emulsion supporting a fluorescent molecule was prepared, most of the fluorescent molecules (SQR22) were incorporated into the hydrophobic portion and fluorescence emission was observed (data not shown).

The amphiphilic molecule (such as a lipid molecule) is not limited to lipids derived from living organisms, but includes small molecules or derivatives thereof, such as phospholipids, produced by semisynthesis or synthesis, and amphiphilic molecules that can be synthetically produced using macromolecules, peptides, amino acids or carboxylic acids or the like as raw materials.

In the above-described temperature-responsive fluorescent particle, the fluorescent molecules are disaggregated and emit fluorescence when the molecular assembly is in the liquid phase, and the fluorescent molecules are aggregated and are quenched when the molecular assembly is in the solid phase, due to a temperature-responsive solid-liquid phase transition, so that fluorescence emission and quenching of the fluorescent molecules are reversibly switched in a temperature responsive manner.

That is, as described in detail in the following Examples, the molecular assembly exhibits a temperature-responsive solid-liquid phase transition, in which the molecular assembly has a fluorescent molecule in a disaggregated form which emits fluorescence when the molecular assembly is in the liquid phase, and the molecular assembly has a fluorescent molecule in an aggregated form which is quenched due to aggregation-caused quenching when the molecular assembly is in the solid phase. When the molecular assembly is a molecular assembly having a lipid bilayer, the solid phase is a gel phase and the liquid phase is a liquid crystal phase.

The above-described fluorescent molecule is suitably an amphiphilic or fat-soluble fluorescent molecule, because it is arranged in a hydrophobic region in which the fluorescent molecule is constructed in molecular assembling state in the aqueous phase, for example, in a region surrounded by a monolayer membrane or in a bilayer membrane such as a lipid bilayer membrane. Since the fluorescent molecule usually has the property of quenching by aggregation, any fluorescent molecule that exhibits aggregation and disaggregation in response to a solid-liquid phase transition (such as a gel-liquid crystal phase transition of a lipid bilayer membrane) can be switched between in a quenching state and an emission state.

Examples of the fluorescent molecule include a compound represented by the following general formula A:

[Formula 6]

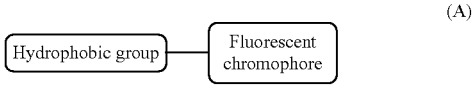

(A)

Some biomolecule such as nicotinamide adenine dinucleotide phosphate, flavins, proteins and amino acids absorb light having a wavelength of 600 nm or less and emit fluorescence (autofluorescence) having a wavelength of 600 nm or less. For this reason, if a fluorescent probe having a maximum absorption wavelength and a maximum fluorescence emission wavelength each of 600 nm or less is used for detecting a biomolecule, interference due to autofluorescence of contaminant molecules may present a problem in fluorescence measurement. Therefore, the compound represented by the general formula (A) of the present invention is desirably a fluorescent molecule having a maximum absorption wavelength and a maximum fluorescence emission wavelength each of 600 nm or more. It is more desirably a fluorescent molecule having a maximum absorption wavelength and a maximum fluorescence emission wavelength each of 600 to 900 nm, further considering that if water is irradiated with light having a wavelength of 980 nm or more, heat generated by absorption by water acts on a temperature-responsive particle.

More specific examples of the compound represented by the above formula (A) that is one of the above-described fluorescent molecules include a squaric acid derivative.

Examples of the squaric acid derivative include a compound represented by the following general formula I.

[Formula 7]

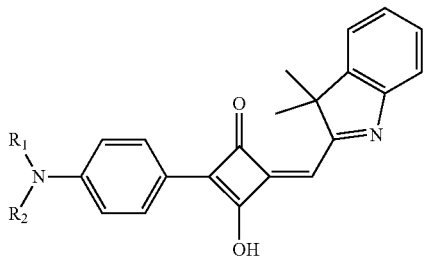

(I)

wherein, $R_1$ and $R_2$ each independently represent hydrophobic groups that may be the same or different.

The compound represented by the general formula A or the general formula I includes not only a free form thereof but also a salt thereof. Examples of such a salt, which varies depending on the type of compound, include a base addition salt such as an inorganic base salt such as an alkali metal salt (such as a sodium salt and a potassium salt), an alkaline earth metal salt (such as a calcium salt and a magnesium salt), an aluminum salt and an ammonium salt; and an organic base salt such as trimethylamine, triethylamine, pyridine, picoline, ethanolamine, diethanolamine, triethanolamine, dicyclohexylamine, N,N'-dibenzylethylenediamine; and an acid addition salt such as an inorganic acid salt such as a hydrochloride, a hydrobromide, a sulfate, a hydroiodide, a nitrate and a phosphate; and an organic acid salt such as a citrate, an oxalate, an acetate, a formate, a propionate, a benzoate, a trifluoroacetate, a maleate, a tartrate, a methanesulfonate, a benzenesulfonate and a p-toluenesulfonate.

In the above-described squaric acid derivative, $R_1$ and $R_2$ may be a linear hydrocarbon or a branched-chain hydrocarbon, and may be a saturated hydrocarbon or an unsaturated hydrocarbon. Preferred examples of the squaric acid derivative include a linear saturated hydrocarbon, but the squaric acid derivative is not limited thereto as long as the fluorescent molecule dissociates in the liquid crystal phase of the molecular assembly and aggregates in the gel phase thereof.

More specific examples of $R_1$ and $R_2$ include a hydrocarbon group having 2 to 10 carbon atoms, and more specifically, $R_1$ and $R_2$ can be selected from an n-butyl group, an n-pentyl group and an n-hexyl group, but is not limited thereto as long as dissociation occurs in the liquid crystal phase of the molecular assembly and aggregation occurs in the gel phase thereof.

Examples of the above-described amphiphilic molecule can include a phospholipid.

The type of phospholipid is not particularly limited, but glycerophospholipid (also referred to as diacyl-type phospholipid) is preferable, and in order to form a stable lipid bilayer membrane exhibiting a phase transition, a diacyl-type phospholipid having a phosphocholine group in the hydrophilic portion is particularly preferable. The lengths of acyl chains of diacyl-type phospholipid may be the same as or different from each other. The diacyl-type phospholipid having a phosphocholine group include saturated phospholipids and unsaturated phospholipids. In the present invention, both of them may be used and they may be used in combination. Examples of the saturated phosphocholine that can be used include synthetic, semisynthetic and natural based phospholipids and derivatives thereof such as hydrogenated egg-yolk lecithin and hydrogenated soybean lecithin with hydrogenation rate close to 100%; and dimyristoyl phosphocholine, dipentadecanoyl phosphocholine, dipalmitoyl phosphocholine, diheptadecanoyl phosphocholine and distearoyl phosphocholine.

Examples of the above-described molecular assembly can include an emulsion and a lipid nanoparticle having a hydrophobic core surrounded by a monolayer membrane (also referred to as a monolayer), and a vesicle having a closed membrane structure like a spherical shell. Examples of such a vesicle can include, but are not limited to, a lipid bilayer membrane vesicle (also referred to as a liposome). The particle that can be used as a temperature-responsive fluorescent particle of the present invention, that is, one that can be used as the above-described molecular assembly is not limited by whether it has a multilayer or monolayer, or its particle diameter or the like, as long as it is a molecular assembly that undergoes a solid-liquid phase transition or a gel-liquid crystal phase transition at a specific temperature.

In order to prevent aggregation and fusion of a molecular assembly such as a lipid vesicle, an amphiphilic molecule having a charged residue or a macromolecular chain in the hydrophilic portion can be included therein as a constituent. The molecular assembly thus obtained such as a lipid vesicle have a high dispersion stability due to electrostatic repulsion by its electric charge or a steric exclusion effect by its macromolecular chain.

Examples of the amphiphilic molecule having a charged residue, when it is a lipid molecule, include phosphatidylglycerol, phosphatidylserine and an anionic phospholipid having phosphatidic acid in the hydrophilic portion; a carboxylic acid-type lipid such as L-glutamic acid, N-(3-carboxy-1-oxopropyl)-, 1,5-dihexadecyl ester (SA); and an amino acid-type lipid having an amino acid in the hydrophilic group.

Examples of the amphiphilic molecule having a macromolecular chain, when it is a lipid molecule, include 1,2-distearoyl-sn-glycero-3-phosphoethanolamine-N-monomethoxy poly(ethylene glycol). Poly(ethylene glycol) is not limited in the molecular weight, but it preferably has a molecular weight of 1000 to 5000 to prevent aggregation of a lipid vesicle.

Further, the amphiphilic molecule that can be used, when it is a lipid molecule, is 1,2-dimyristoyl-sn-glycero-3-phosphocholine ($PC_{14}$), 1,2-dipentadecanoyl-sn-glycero-3-phosphocholine ($PC_{15}$) (manufactured by Avanti Polar Lipids, Inc.), 1,2-diheptadecanoyl-sn-glycero-3-phosphocholine ($PC_{17}$) (manufactured by Avanti Polar Lipids, Inc.), 1,2-distearoyl-sn-glycero-3-phosphocholine ($PC_{18}$), 1,2-dipalmitoyl-sn-glycero-3-phosphocholine ($PC_{16}$ (also referred to as DPPC)), 1,2-dioleoyl-sn-glycero-3-phosphocholine (DOPC), 1,5-dihexadecyl-N-succinyl-L-glutamate (DHSG), 1,2-distearoyl-sn-glycero-3-phosphoethanolamine (DSPE) or the like.

Aggregation-caused quenching of a fluorescent molecule in a molecular assembly such as a lipid vesicle depends on its concentration in the molecular assembly, and the aggregation-caused quenching also decreases with a decrease in the concentration of the fluorescent molecule. Accordingly, the temperature-responsive fluorescent particle of the present invention contains the compound represented by the general formula I in a concentration of 0.3 mol % or more, preferably 0.7 mol % or more and more preferably 1.0 mol % or more.

The production of such a temperature-responsive fluorescent particles can be obtained by causing the compound of the formula I to coexist during the production of the molecular assembly. As an example of the production of the molecular assembly, it can be produced according to a known method for producing a lipid vesicle (Sheng Dong et al, ACS Appl. Nano Mater. 2018, 1, 1009-1013).

The temperature-responsive fluorescent particle of the present invention can be used for producing the following temperature-responsive fluorescent probe particle.

2. Temperature-Responsive Fluorescent Probe Particle

Another embodiment of the present invention is a temperature-responsive fluorescent probe particle.

The temperature-responsive fluorescent probe particle can be obtained by modifying the surface of the temperature-responsive fluorescent particle with a biomolecule recognition element. As used herein, the term "element" means a molecule that exerts a specific function such as a biomolecule recognition function, and the terms "element" and "molecule" can be used interchangeably. As used herein, the term "recognition" means recognizing a target molecule and binding to the molecule. The "biomolecule recognition element" includes not only an element that in itself directly recognizes a biomolecule, but also an element that indirectly recognizes a biomolecule through binding to other molecules or molecular complexes (such as a complex of streptavidin and a biotinylated antibody that recognizes a biomolecule).

Examples of the biomolecule recognition element include an antibody or a variable region of the antibody or a fab fragment of the antibody (hereinafter referred to as "antibody or the like"). In the present specification, such an element, for example, an antibody or the like is referred to as a "biomolecule recognition element for detection" as described below, and when the element is an antibody or the like, it is also referred to as a "detection antibody".

On the other hand, for the purpose of adhering a target biomolecule to the bottom surface or the like of a measurement container, an element for another epitope of the target biomolecule, for example, an antibody or the like may be used. In the present specification, such an element is referred to as a "biomolecule recognition element for capture", and when the element is an antibody or the like, it is also referred to as a "capture antibody".

Each of the above-described biomolecule recognition elements can form a complex of a target biomolecule to be detected or measured and the temperature-responsive fluorescent particle by binding to the target biomolecule.

As used in the sandwich ELISA method that is a conventional technique, when an antibody is used as each of the above-described biomolecule recognition elements, two types of antibodies, a detection antibody and a capture antibody, which bind to different epitopes of the same antigen are used. The detection antibody binds an antigen to the temperature-responsive fluorescent particle via the antibody. The capture antibody is immobilized on the bottom surface or the like of a measurement container such as a well and thereby functions to capture the target biomolecule to be tested on the bottom surface or the like of the measurement container and to adhere the target biomolecule to it.

As in the case of the sandwich ELISA method, in the temperature-responsive fluorescent probe particle of the present invention, the detection antibody is used as an antibody for binding a target biomolecule to the temperature-responsive fluorescent particle, and the capture antibody is used as an antibody for adhering the target biomolecule to the bottom surface or the like of a measurement container such as a well.

That is, when the above-described biomolecule recognition element is an antibody, the temperature-responsive fluorescent probe particle is in a state of being adhered to the bottom surface of a measurement container, when (a) a temperature-responsive probe particle constituted by a temperature-responsive fluorescent particle and a detection antibody, (b) a target biomolecule which is an antigen for a detection antibody and a capture antibody and (c) the capture antibody immobilized on the bottom of the measurement container such as a well form a complex of the temperature-responsive fluorescent probe particle (a temperature-responsive fluorescent particle the surface of which is modified with the detection antibody)-the target biomolecule (antigen)-the capture antibody-the measurement container. When the temperature-responsive fluorescent probe particle is in such a state, the temperature of the complex rapidly increases due to heat conduction from the bottom surface of the measurement container as the bottom surface of the measurement container is warmed. Then, the temperature-responsive fluorescent probe particle in the complex undergoes a phase transition from the solid phase to the liquid phase, so that the fluorescent molecule in the temperature-responsive fluorescent particle that has aggregated and has been quenched in the solid phase disaggregates and emits fluorescence. On the other hand, when the target biomolecule, that is, the antigen is not present in a test sample, the complex is not formed. Accordingly, the temperature-responsive fluorescent probe particle cannot be adhered to the bottom surface of the measurement container, and even if the bottom surface of the measurement container is heated, the temperature increases only slowly due to heat transfer via a solvent, so that the solid state is maintained for a longer time and the quenched state is maintained.

As used herein, the term "heat source" means a device that generates heat (such as a thermoplate, a hot plate or a water bath), or a substance that indirectly generates heat by receiving the heat generated by the device (such as a substrate having a biomolecule recognition for capture immobilized thereon), and a mechanism for generating heat (such as warming). As a heat source for increasing the temperature of a temperature-responsive fluorescent probe particle, for example, a metal particle such as a gold nanoparticle or a magnetic bead or the like can be also used in addition to the above-described heating of the bottom surface of a well. For example, in the case of a gold nanoparticle, photothermal conversion is induced by laser irradiation to generate heat, and in the case of a magnetic bead, induction heating can be carried out by irradiation with an alternating magnetic field, so that they can be used as a heat source. When the temperature-responsive fluorescent probe particle is adhered to any of these heat sources by utilizing binding to a target biomolecule so that a complex of the temperature-responsive fluorescent probe particle-target biomolecule and the heat source is formed, and the heat source is heated by irradiation with laser or an alternating magnetic field, the temperature-responsive fluorescent particle then rapidly increases in temperature to form a liquid phase and emit fluorescence. Therefore, a microdroplet of a test sample that contains the metal particle or the magnetic bead can be used to detect the target biomolecule in the microdroplet.

According to the Poisson distribution, by setting each microdroplet to include an average of 5 temperature-responsive fluorescent probe particles and a heat source, 99% or more of microdroplets include at least one or more temperature-responsive fluorescent probe particles and a heat source. Depending on the size and shape, one temperature-responsive fluorescent probe particle contains thousands to tens of thousands of fluorescent molecules and can detect one target biomolecule by amplifying it with thousands to tens of thousands of fluorescent molecules contained in one temperature-responsive fluorescent probe particle, so that it can be used for a molecular detection method for detecting a target biomolecule with high sensitivity.

The temperature-responsive fluorescent probe particle of the present invention, that is, the temperature-responsive fluorescent particle the surface of which is modified with a biomolecule recognition element can be obtained by producing a lipid vesicle modified with a detection antibody according to a known method (International Publication No. WO2000/064413, Japanese Patent Laid-Open No. 2003-73258, Japanese Patent Laid-Open No. 58-134032, Manjappa S. A, et al, J. Controlled Release 2011, 150, 2-22, Li T., et al, and Nanomed.: Nanotechnol. Biol. Medicine, 2017, 13, 1219-1227).

The measurement operation of the ELISA method, which is a conventional technique, requires a process of separating an antibody-enzyme conjugate bound to a target biomolecule from an antibody-enzyme conjugate not bound to the target biomolecule, and/or a process of washing the antibody-enzyme conjugate not bound to the target biomolecule. In contrast, the present invention utilizes the difference in temperature change, that is, the difference between: a rapid increase in temperature due to heat conduction to a temperature-responsive fluorescent probe particle adhered near a heat source by utilizing an antigen-antibody reaction for an epitope of a target biomolecule; and a slow temperature change due to heat transfer through a solvent to the temperature-responsive fluorescent particle not bound to the target particle. Therefore, the target biomolecule can be detected with high sensitivity in a simple manner in a short time by measuring the fluorescence emission intensity without carrying out the separation process or washing process required in the ELISA method.

For the sandwich ELISA method, measurement kits for various biomolecules have already been commercially utilized. That is, each of the kits includes a measurement microwell plate in which a capture antibody is immobilized on the bottom surface or the like of each well as a measurement container, and a detection antibody. Hence, for example, such commercially available sandwich ELISA measurement kits can be utilized. The present invention can be carried out by: preparing a temperature-responsive fluorescent probe particle of the present invention; and obtaining a detection antibody, a microwell plate in which a capture antibody is immobilized on the bottom surface or the like of the well, and others, contained in such a kit.

For the sandwich ELISA method, a measurement kit for measuring an antigen by forming a complex of a capture antibody immobilized on the bottom surface of each well of the microwell plate, an antigen (target biomolecule), a biotinylated detection antibody and a horseradish peroxidase (HRP)-labeled streptavidin is commercially available (see FIG. 12A). Therefore, an antigen (target biomolecule) in a test sample can be measured by: producing a temperature-responsive fluorescent particle the surface of which is labeled with biotin, as a temperature-responsive fluorescent probe particle of the present invention; mixing the capture antibody immobilized on the bottom surface of each well of a microplate, the antibody (biomolecule), the biotinylated detection antibody, the streptavidin and the produced temperature-responsive fluorescent particle the surface of which is labeled with biotin, to form a complex thereof; and heating the bottom surface of the well of the microplate with a heat source to cause the temperature-responsive fluorescent particle to rapidly undergo phase transition and thereby emit fluorescence (see FIG. 12B). That is, it can be said that the biological recognition element in this case is not a detection antibody alone, but a complex of a biotin modifying the surface of a temperature-responsive fluorescent particle-streptavidin-biotinylated detection antibody. Alternatively, it can be also said that a complex prepared by: modifying the surface of a lipid vesicle with a maleimide group by introducing a maleimide-terminated polyethylene glycol-type lipid; and reacting it with the thiol group of Fab', which is a fragmented antibody obtained by pepsin treatment followed by reduction, is a complex of a temperature-responsive fluorescent lipid vesicle-fragmented detection antibody. Thus, a temperature-responsive fluorescent prove particle of the present invention can be produced and used by using, as the biological recognition element, various molecules that are not limited to an antibody alone and not limited to biotin-streptavidin, either, and that form a complex having a strong binding by molecular recognition or the like.

Examples of the type of molecule that can be used for the complex formation by molecular recognition include, but are not limited to, a combination of a sugar chain and a lectin, a complementary base sequence of a nucleic acid, a combination of a receptor and a ligand molecule, a nucleic acid aptamer and a peptide aptamer.

3. Method for Detecting or Quantitatively Determining Biomolecule

Another embodiment of the present invention is a method for detecting or quantitatively determining a target biomolecule. Such a method for detecting or quantitatively determining a biomolecule is completely different from conventional detection methods such as a method in which fluorescent probe particles and fluorescent molecules contained in the particles are transported into cell membranes by endocytosis or membrane fusion to detect cells; and a method in which fluorescence generated by the release of fluorescent molecules from fluorescent probe particles is detected; and the like.

As described above, when the temperature-responsive fluorescent probe particle and the temperature-responsive fluorescent particle are used, a target biomolecule can be detected or measured with high sensitivity in a simple manner in a short time by measuring the fluorescence emission without carrying out the separation process or washing process. Alternatively, a biomolecule can be also detected or quantitatively determined by a washing process rather than heating. They can be also used for a molecular detection method for a target biological sample by forming the test sample into microdroplets.

Therefore, the present invention provides a method for detecting or quantitatively determining a biomolecule contained in a biological sample, comprising: (1) a step of contacting the temperature-responsive fluorescent probe particle described in the above 2. and the biological sample with a biomolecule recognition element for capture immobilized on a substrate; (2) a step of heating the substrate; and (3) a step of measuring fluorescence emission.

In addition, when the present invention is carried out by using a particle having a phase transition temperature equal to or lower than room temperature as the solid-liquid phase transition temperature (when the probe particles are in the form of a molecular assembly having a lipid bilayer, it is also referred to as "gel-liquid crystal phase transition temperature") of the temperature-responsive fluorescent probe particle used in step (1), a biomolecule can be also detected or measured by simply washing the substrate to remove the temperature-responsive fluorescent probe particle not bound to the biomolecule recognition element for capture, without carrying out step (2) above. Therefore, in another embodiment, the present invention provides a method for detecting or quantitatively determining a biomolecule, comprising: (1') a step of contacting the temperature-responsive fluorescent probe particle described in the above 2. and a biological sample with a biomolecule recognition element for capture immobilized on a substrate; (2') a step of washing the substrate; and (3) a step of measuring fluorescence emission. The solid-liquid phase transition temperature of the temperature-responsive fluorescent probe particle used in such a method is preferably 30° C. or lower, more preferably 25° C. or lower, further more preferably 20° C. or lower and still further more preferably 15° C. or lower (such as 10° C., 5° C., 0° C., −5° C., −10° C., −15° C., −20° C., −22° C. or lower), from the viewpoint of ease of handling. As shown in Examples below, the temperature-responsive fluorescent probe particle having a desirable solid-liquid phase transition temperature can be prepared by appropriately adjusting the length of the hydrophobic group, the degree of unsaturation, the type and the combination of an amphiphilic molecule.

In addition, a step of setting the solid-liquid phase transition temperature of the temperature-responsive fluorescent probe particle at a desired temperature and/or a step of producing a temperature-responsive fluorescent probe particle having the desired solid-liquid phase transition temperature may be carried out before the above step (1). The solid-liquid phase transition temperature can be appropriately set so that it is equal to or lower than room temperature based on the room temperature at the time of carried out an experiment.

The concentration of the temperature-responsive fluorescent probe particle used in a method for detecting or quantitatively determining a biomolecule of the present invention is not particularly limited, but the probe particle is preferably contained in a solution at the concentration of 1.0 µg/ml or more, more preferably 2.0 µg/ml or more and further more preferably 5.0 µg/ml or more at the time of contact with a biomolecule recognition element for capture.

Examples of the substrate to be used in the present invention can include, but are not particularly limited to, insoluble substrates such as polymers such as polystyrene, glass beads, magnetic particles, microplates, filter papers for immunochromatography, and glass filters. The substrate is preferably a microplate from the viewpoint of ease of handling.

Examples of the biological sample to be used in the above-described method for detecting or quantitatively determining a biomolecule of the present invention include samples collected from animals or cells. The sample may be a sample known to contain a target biomolecule, or may be a sample which is not known to contain or not to contain the target biomolecule. Examples of the animal or cell include mammals such as a mouse, a rat, a hamster, a guinea pig, a dog, a monkey, an orangutan, a chimpanzee and a human, and cells derived from such animals. Examples of the sample derived from an animal include blood, serum, plasma, saliva, urine, tears, sweat, milk, nasal drip, semen, breast water, gastrointestinal secretion, cerebrospinal fluid, interstitial fluid and lymph fluid, and blood, serum and plasma are preferred. These samples can be obtained by a method known per se. For example, a serum or plasma sample can be prepared by collecting blood from a test animal according to a conventional method and separating a fluid component. Cerebrospinal fluid can be collected by a known means such as spinal puncture.

In the above step (1) or (1'), the process of contacting the temperature-responsive fluorescent probe particle described in the above 2. and a biological sample with a biomolecule recognition element for capture immobilized on a substrate is not particularly limited. For example, this process can be carried out, but is not limited to, by adding a solution containing the biological sample; and the temperature-responsive fluorescent probe particle in this order on the substrate. Alternatively, a solution prepared in advance by mixing the biological sample and the temperature-responsive fluorescent probe may be added on the substrate (that is, the biological sample and the temperature-responsive fluorescent probe may be contacted with the substrate at the same time). The conditions for the above-described contacting are not particularly limited, but the contacting is usually carried out at a temperature of 0 to 45° C., preferably at a temperature of 0 to 40° C., more preferably at a temperature of 4 to 37° C. and further more preferably at a temperature of 25° C. to 37° C. The contact time is also not particularly limited, but it is typically 6 hours or less, preferably 2 hours or less and more preferably 1 hour or less. The lower limit of the contact time is also not particularly limited, but it is typically 10 seconds or more, preferably 1 minute or more and more preferably 10 minutes or more.

Alternatively, the same biomolecule recognition element (such as biotin) as that which the temperature-responsive fluorescent probe particle in the above 2. has may be added to a biomolecule recognition element for detection to cause the temperature-responsive fluorescent probe particle to bind to the biomolecule recognition element for detection, via an element recognizing the biomolecule recognition element (such as streptavidin). Therefore, in one aspect, the above step (1) or (1') may be a step of contacting the temperature-responsive fluorescent probe particle described in the above 2., an element recognizing a biomolecule recognition element, a biomolecule recognition element for detection and a biological sample with a biomolecule recognition element for capture immobilized on a substrate. The contacting process can be carried out in the same manner as the process described above. For example, the contacting process can be carried out by adding a solution containing a biological sample and a solution containing a biomolecule recognition element for detection, an element recognizing a biomolecule recognition element and a temperature-responsive fluorescent probe particle to a substrate in this order, to which the order is not limited. Alternatively, a biomolecule recognition element for detection, an element recognizing a biomolecule recognition element and a temperature-responsive fluorescent probe particle may be contacted with a biomolecule recognition element for capture separately from each other. Alternatively, a solution prepared in advance by mixing a biological sample, a biomolecule recognition element for detection, an element recognizing a biomolecule recognition element and a temperature-responsive fluorescent probe may be added on the substrate (that is, a biological sample, an element recognizing a temperature-responsive fluorescent probe biomolecule recognition element and a biomolecule recognition element for detection may be contacted with a substrate at the same time). Schematic diagrams of this process are shown as FIGS. 15A to 15C. According to such a process, as shown in FIG. 15C, a plurality of temperature-responsive fluorescent probe particles are bound to one biomolecule, and the detection sensitivity can be improved. In a preferred aspect, the biomolecule recognition element is biotin, and the element recognizing a biomolecule recognition element is streptavidin, avidin or NeutrAvidin.

In the above step (2), a process of heating a substrate can be also carried out, but not limited to, by allowing a substrate to stand on a thermoplate or hot plate or in a water bath set at a desired temperature, or as described above, by causing a gold nanoparticle to bind to a temperature-responsive fluorescent probe particle or a biomolecule recognition element for capture and irradiating the gold nanoparticle with a laser.

For example, the above step (2) can be carried out, but not limited to, by replacing a solution containing a temperature-responsive fluorescent probe particle and a biological sample with a washing liquid and if necessary, replacing the washing liquid with another washing liquid at least once. As the washing liquid, a buffer can be used. Examples of the buffer include an acetate buffer, a phosphate buffer, a citrate buffer, a citrate-phosphate buffer, a borate buffer, a tartrate buffer, a Tris buffer, phosphate-buffered saline (PBS), McIlvaine buffer, and a solution containing the buffer and a nonionic surfactant (such as Tween 20) (such as PBS-T).

Further, the method for detecting a biomolecule of the present invention can be carried out by a process comprising:
a step of adhering the above-described temperature-responsive fluorescent probe particle to a heat source by specific molecular recognition via a target biomolecule; and
a step of detecting fluorescence emission, wherein heat conduction from the heat source to the temperature-responsive fluorescent particle increases the temperature of the temperature-responsive fluorescent particle, so that the phase transition from the solid phase to the liquid phase of the temperature-responsive fluorescent probe particle occurs in a temperature responsive manner and the phase transition causes the fluorescence emission of a fluorescent molecule in the temperature-responsive fluorescent probe particle.

In the other words, the method for detecting a biomolecule of the present invention is a method for detecting a biomolecule comprising:
a step of forming a complex constituted by the above-described temperature-responsive fluorescent probe particle, a target biomolecule, a biomolecule recognition element for capture and a heat source; and
a step of measuring fluorescence emission, wherein the formation of the complex promotes heat conduction from the heat source to the temperature-responsive fluorescent probe particle, so that the phase transition from the solid phase to the liquid phase of the temperature-responsive fluorescent probe particle causes the fluorescence emission of the fluorescent molecule.

Alternatively, the method for detecting a biomolecule of the present invention may be a method for detecting a biomolecule comprising:
a step of forming a complex comprising and constituted by the above-described temperature-responsive fluorescent probe particle, a target biomolecule and a biomolecule recognition element for capture;
a step of removing the temperature-responsive fluorescent probe that has not formed a complex with the biomolecule recognition element for capture; and
a step of measuring fluorescence emission from the temperature-responsive fluorescent probe particle constituting the complex.

Then, examples of the temperature-responsive fluorescent probe particle that can be used include not only the temperature-responsive fluorescent particle the surface of which is directly modified with a biomolecule recognition element, but also a complex of a biotinylated temperature-responsive fluorescent particle-streptavidin-detection antibody formed due to strong binding of biotin-streptavidin by using a temperature-responsive fluorescent particle the surface of which is biotinylated. Alternative examples of the temperature-responsive fluorescent probe particle that can be used include a temperature-responsive fluorescent lipid vesicle-fragmented detection antibody formed by modifying the surface of a lipid vesicle with a maleimide group by introducing a maleimide-terminated polyethylene glycol-type lipid; and reacting it with the thiol group of Fab', which is a fragmented antibody obtained by pepsin treatment of a detection antibody followed by reduction.

The method for detecting or measuring fluorescence emission is not particularly limited, but fluorescence emission can be detected or measured by using a general optical fiber-type fluorescence detector, a microplate reader, a fluorescence microscope and a detector equipped with a camera (such as a CCD camera) (such as Celvin). Further, as in the process in the ELISA method, the concentration of the biomolecule in a biological sample can be quantitatively determined by using a calibration curve generated using a sample having a known concentration of the target biomolecule (reference standard). It can be also quantitatively determined by the method for quantitatively determining a biomolecule described below. That is, the method for detecting a biomolecule of the present invention can be applied as a method for quantitatively determining a biomolecule.

4. Method for Quantitatively Determining Biomolecule

Another embodiment of the present invention is a method for quantitatively determining a biomolecule.

It is carried out as a method for quantitatively determining a biomolecule (absolute quantitative determination method) wherein in the above-described method for detecting a biomolecule, the number of target biomolecules in a test sample is counted by counting the number of temperature-sensitive fluorescent probe particles that have emitted fluorescence.

The detection can be carried out by a usual highly sensitive detector, because one temperature-sensitive fluorescent probe particle contains thousands to tens of thousands of fluorescent molecules and the fluorescence of one particle has the emission intensity of thousands to tens of thousands of fluorescent molecules.

Under the concentration conditions in which one target biomolecule forms a complex with one temperature-sensitive fluorescent probe particle and a heat source, the number of temperature-sensitive fluorescent probe particles that emit fluorescence corresponds to the number of target biomolecules.

For this counting, for example, a temperature-sensitive fluorescent probe particle, a heat source and a target biomolecule can be encapsulated in a microdroplet prepared by using a microfluidic device, to count the number of microdroplets that emit fluorescence. Then, the concentration conditions are such that one or no target biomolecule exist in each microdroplet.

Similarly, the number of target biomolecules can be counted by injecting temperature-sensitive fluorescent probe particles, heat sources and target biomolecules into microarrays and counting the number of arrays in which fluorescence emission is detected under the concentration conditions in which one or no target biomolecule exist in each array.

The method for detecting fluorescence is not particularly limited, but fluorescence can be detected by using a general optical fiber-type fluorescence detector, a microplate reader, a fluorescence microscope, a highly sensitive camera, or the like.

That is, in the method for quantitatively determining a biomolecule of the present invention, the detection limit for the target biomolecule may be one target biomolecule per test sample.

The concentration of the target biomolecule contained in a test sample can be determined (relative quantitative determination) by: measuring the fluorescence intensity for a standard liquid having a known concentration of the target biomolecule by the method described in the above "Method for detecting a biomolecule" to thereby generate a calibration curve; and applying, to the calibration curve, the fluorescence intensity for the test sample obtained by the same process.

Since the quantitative determination method of the present invention uses a temperature-responsive fluorescent probe particle, it can be carried out as a simple, rapid and highly sensitive method for quantitatively determining a target biomolecule without the need to carry out a separation process or a washing process required in the ELISA method.

5. Kit Comprising Temperature-Responsive Fluorescent Probe Particles

In another aspect, the present invention provides a kit for detecting or measuring a biomolecule, comprising the temperature-responsive fluorescent probe particles of the present invention. The kit of the present invention may contain other reagents and the like in addition to the temperature-responsive fluorescent probe particles of the present invention, and these reagents and the like may be previously combined with the temperature-responsive fluorescent probe particles or it may be stored in separate containers. Examples of the reagent or the like include a biomolecule recognition element for capture, a substrate having the biomolecule recognition element for capture immobilized thereon, a biomolecule recognition element for detection, an element recognizing a biomolecule recognition element, a washing liquid, a reference standard having a known concentration of biomolecules, a positive control, a negative control and instructions describing protocols. These reagents and the like can be mixed in advance if necessary. Specific examples of the biomolecule recognition element for capture, the substrate having the element immobilized thereon, the biomolecule recognition element for detection, the element recognizing a biomolecule recognition element, the washing liquid and the reference standard having a known concentration of biomolecules are as described in the above 1. to 2. In one preferred aspect, the biomolecule recognition element is biotin, and the element recognizing a biomolecule recognition element is streptavidin, avidin or NeutrAvidin.

The biomolecule recognition element for capture contained in the above kit is preferably immobilized on a substrate in advance. Specific examples of such a substrate are as described in the above 3.

All literatures referred to herein are incorporated herein by reference in their entirety. Examples described herein illustrate embodiments of the present invention and should not be construed as limiting the scope of the present invention.

EXAMPLES (Example 1) Synthesis of Fluorescent Dye (SQR22)

A method for synthesizing a squaric fluorescent dye (SQR22).

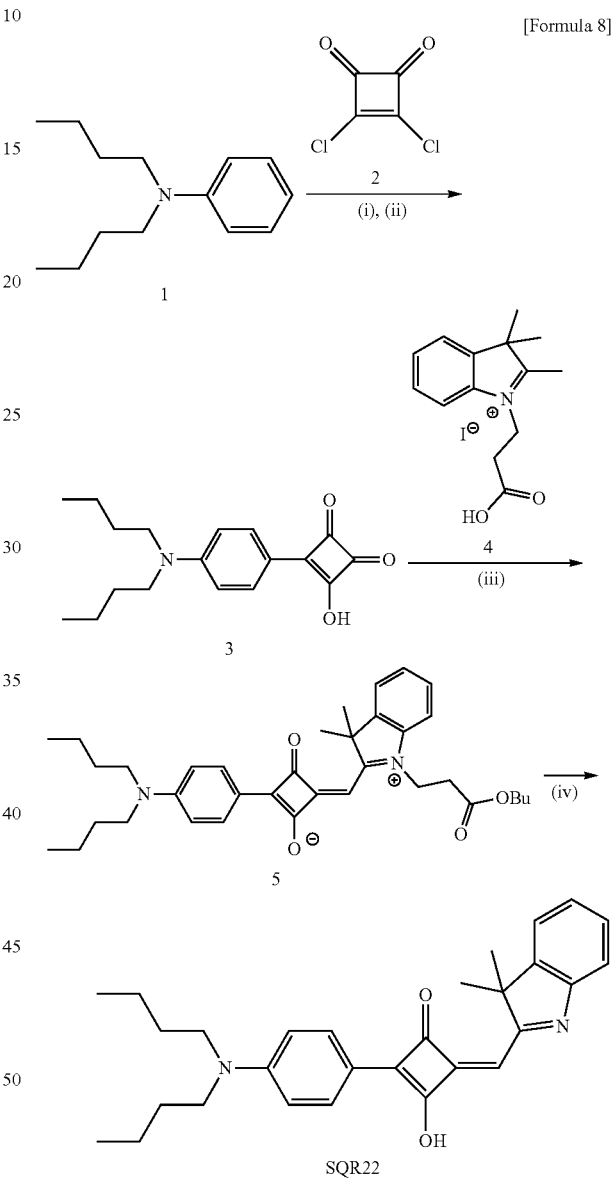

(i) Toluene, reflux, 6 hours;
(ii) 5N Hydrochloric acid, acetic acid/water (1:1), reflux, 2 hours;
(iii) n-BuOH/toluene (4:1), reflux, 3 hours;
(iv) NatOBu, THF, room temperature, 3 hours First, precursors N,N-dibutylaniline 1 and squaryl chloride 2 were synthesized as previously reported (Li F., et al. Chem. Eur. J. 20, 9991-9997 (2014); Easwaran A., et al. J. Am. Chem. Soc. 2004, 126, 6590-6598). The compounds 1 and 2 were reacted with each other under reflux of toluene for 6 hours to obtain a chloride intermediate. This chloride intermediate was hydrolyzed in a mixed solvent of 5N hydrochloric acid and acetic acid/water (1/1) to obtain a compound 3. An indolium salt 4 was synthesized as previously reported (Liu D., et al. Angew. Chem. Int. Ed. 2011, 50, 4103-4107). The compounds 3 and 4 were reacted with each other under reflux of n-butanol/toluene (1:1 mixed solution) to obtain a compound 5. The compound 5 was hydrolyzed with Na$^t$OBu in THF at room temperature to obtain SQR22. The structure of SQR22 was identified by NMR and mass spectrometry.

$^1$H NMR (CDCl$_3$, 400 MHz, δ ppm): 0.89 (t, J=7.3 Hz, 6H, —CH$_3$); 1.25-1.35 (m, 4H, —CH$_2$—); 1.41 (s, 6H, —CH$_3$); 1.50-1.57 (m, 4H, —CH$_2$—); 3.27-3.31 (m, 4H, —CH$_2$—); 5.75 (s, 1H, =CH—); 6.60 (d, J=9.2 Hz, 2H, ArH), 7.04-7.36 (m, 4H, ArH); 8.03 (d, J=9.1 Hz, 2H, ArH). $^{13}$C NMR (CDCl$_3$, 400 μMHz, δ ppm): 14.12, 20.47, 25.64, 29.61, 50.12, 51.07, 89.87, 111.95, 113.27, 118.85, 122.74, 125.18, 128.82, 130.95, 140.06, 141.59, 151.19, 169.22, 181.33, 181.80, 185.51, 187.28. MS (ESI) m/z (M$^+$) 443.

(Example 2) Spectroscopic Characteristics of SQR22

SQR22 was dissolved in an organic solvent, and fluorescence emission was observed on a UV lamp (365 nm). Then, an ultraviolet-visible spectrophotometer (V-670 type, JASCO Corporation) and a fluorescence spectrophotometer (Agilent Cary Eclipse, Agilent Technologies Japan, Ltd.) were used to measure an ultraviolet-visible absorption spectrum (/QR22 concentration=10 μM) and a fluorescence emission spectrum (SQR22 concentration: 1 μM). SQR22 was dissolved in various solvents and exhibited the spectral characteristics depending on the polarity of each solvent (FIGS. 1A and 1B, Table 1).

The UV-vis-NIR spectrum of the SQR22 solution shows maximum absorption near 630 nm in a polar solvent (Table 1). As the polarity of the solvent increased, the absorption near 630 nm decreased, and another absorption peak appeared near 470 nm. A broad absorption between 500 and 700 nm was observed in water. For the fluorescence emission spectrum, as the polarity of the solvent increases, the wavelength of maximum fluorescence emission gradually shifts to 640 to 663 nm in the far-infrared region (FIG. 1B and Table 1). In this far-red region, the quantum yield was in the range of 0.13 to 0.44 (FIG. 1B and Table 1). The maximum fluorescence emission wavelengths were 552 and 565 nm in dimethylformamide and dimethyl sulfoxide, respectively, and the quantum yield was greatly reduced to 0.02. The absorption spectrum reflects the association state of dye molecules, and when it shows a long wavelength shift (J band) or a short wavelength shift (H band) with respect to the absorption of the monomer, the formation of J aggregates or H aggregates is suggested (Eisfeld, A. et al., Chemical Physics, 2006, 324, 376-384). The short wavelength shift of the absorption spectrum and a lower quantum yield in each of dimethylformamide and dimethyl sulfoxide suggest the formation of H aggregates. No fluorescence emission of SQR22 was observed in water, and the broad absorption peak suggests quenching due to the formation of a mixture of H and J aggregates.

The spectroscopic data showed that SQR22 emitted a strong fluorescence in the far-red region (640 to 700 nm) with an excitation wavelength in the range of 550 to 640 nm in non-polar environments. This excitation wavelength matches a standard commercially available red laser (approximately 630 nm), and is thereby suitable for various uses such as fluorescence imaging. SQR22 is suitable for labeling low polar environments due to its high quantum yield in low polar solvents. Therefore, SQR22 was considered to be a promising fluorescent probe for labeling hydrophobic non-polar regions of lipid bilayer membranes.

TABLE 1

Spectral characteristics of SQR22 solution

| No | Solvent | Polarity index | Dielectric constant | Maximum absorption wavelength (nm) | Maximum fluorescence emission wavelength (nm) | Quantum yield |
|---|---|---|---|---|---|---|
| 1 | Hexane | 0.1 | 1.89 | 629 | 640 | 0.44 |
| 2 | Cyclohexane | 0.2 | 2.02 | 633 | 642 | 0.4 |
| 3 | Toluene | 2.4 | 2.38 | 636 | 655 | 0.36 |
| 4 | Benzene | 2.7 | 2.28 | 637 | 656 | 0.36 |
| 5 | Dichloromethane | 3.1 | 9.08 | 633 | 659 | 0.38 |
| 6 | Tetrahydrofuran | 4 | 7.6 | 633 | 660 | 0.42 |
| 7 | Chloroform | 4.1 | 4.81 | 635 | 656 | 0.4 |
| 8 | Ethanol | 4.3 | 24.6 | 631 | 662 | 0.32 |
| 9 | Methanol | 5.1 | 32.6 | 628 | 662 | 0.13 |
| 10 | Acetone | 5.1 | 20.7 | 629 | 663 | 0.23 |
| 11 | Acetonitrile | 5.8 | 37.5 | 626 | 663 | 0.22 |
| 12 | Dimethylformamide | 6.4 | 36.7 | 474 | 552 | 0.02 |
| 13 | Dimethyl sulfoxide | 7.2 | 47 | 477 | 565 | 0.02 |
| 14 | Water | 10.2 | 78.5 | 595 (broad) | non | 0 |

(Example 3) Preparation of Molecular Assembly Containing SQR22

First, three types of amphiphilic molecules: 1,2-dipalmitoyl-sn-glycero-3-phosphocholine (PC$_{16}$) (manufactured by Nippon Fine Chemical Co., Ltd.), L-glutamic acid, N-(3-carboxy-1-)oxopropyl)-, 1,5-dihexadecyl ester (SA) (manufactured by Nippon Fine Chemical Co., Ltd.) and 1,2-distearoyl-sn-glycero-3-phosphoethanolamine-N-monomethoxy poly(ethylene glycol) (5000) (PEG-DSPE) (manufactured by NOF CORPORATION) were dissolved in t-butanol at a molar ratio of PC$_{16}$/SA/PEG-DSPE=9/1/0.06 and lyophilized to obtain a mixed lipid powder. To the obtained mixed lipid powder was added a stock solution of SQR22 (in ethanol) (at a weight ratio of the mixed lipid/SQR22=50/1), the resultant was dissolved in t-butanol and lyophilized to obtain an SQR22-containing mixed lipid powder. The SQR22-containing mixed lipid powder was dispersed in phosphate-buffered saline (PBS) (5 mg/mL), and hydrated and dispersed with a vortex mixer. This dispersion was added to EXTRUDER (trade name; manufactured by Northern Lipids Inc.), and caused to successively permeate through polycarbonate membrane filters (manufactured by Merck Millipore) having pore sizes of 0.45 μm, 0.20 μm and 0.05 μm at 60° C. under pressure to obtain an SQR22-containing molecular assembly (lipid vesicle) dispersion (FIG. 2A).

The fluorescence emission of SQR22 incorporated into the lipid vesicle was not observed under UV light (wavelength=365 nm) at approximately 25° C. (FIG. 2B). Interestingly, however, it was found that as the lipid vesicle dispersion was heated, strong fluorescence emission appeared (FIG. 2B). When the temperature decreased back to room temperature, the fluorescence emission disappeared again. As shown in FIG. 2C, the fluorescence intensity rapidly responded to temperature change, and the rate constant of fluorescence intensity increase at 50° C. was 7.0%/sec. The actual response rate is considered to be faster than the observed data, since the measurement values reflect the process until the target temperature is reached. Fluorescence switching in heating and cooling cycles could be stably repeated for at least 10 cycles (FIG. 2D). With respect to the interesting fluorescence emission characteristics in a temperature responsive manner, the present inventors hypothesized that the fluorescence emission characteristics of SQR22 introduced into the lipid vesicle would be switched by the phase transition of the lipid bilayer membrane. In order to demonstrate this hypothesis, five types of 1,2-diacyl-sn-glycero-3-phosphocholine (PC) with different acyl chain lengths (carbon numbers: 14 to 18), including $PC_{16}$ were then used to prepare lipid vesicles containing SQR22 with different phase transition temperatures.

(Example 4) Preparation of Lipid Vesicles Containing SQR22 with Different Phase Transition Temperatures Similarly, three types of amphiphilic molecules: phosphatidylcholine (PC), SA and PEG-DSPE were dissolved in t-butanol at a molar ratio of PC/SA/PEG-DSPE=9/1/0.06 and lyophilized to obtain a mixed lipid powder. The following four types of PCs having different acyl chain lengths were used: 1,2-dimyristoyl-sn-glycero-3-phosphocholine ($PC_{14}$) (manufactured by Avanti Polar Lipids, Inc.), 1,2-dipentadecanoyl-sn-glycero-3-phosphocholine ($PC_{15}$) (manufactured by Avanti Polar Lipids, Inc.), 1,2-diheptadecanoyl-sn-glycero-3-phosphocholine ($PC_{17}$) (manufactured by Avanti Polar Lipids, Inc.), 1,2-distearoyl-sn-glycero-3-phosphocholine ($PC_{18}$) (manufactured by Avanti Polar Lipids, Inc.) (FIG. 3A). A stock solution of SQR22 (in ethanol) was added to the obtained mixed lipid powder (at a weight ratio of the mixed lipid/SQR22=50/1), dissolved in t-butanol and lyophilized to obtain an SQR22-containing mixed lipid powder.

The SQR22-containing mixed lipid powder was dispersed in phosphate-buffered saline (PBS) (5 mg/mL), and hydrated and dispersed with a vortex mixer. This dispersion was added to EXTRUDER (trade name; manufactured by Northern Lipids Inc.), and caused to successively permeate through polycarbonate membrane filters (manufactured by Merck Millipore) having pore sizes of 0.45 μm, 0.20 μm and 0.05 μm at 60° C. under pressure to obtain an SQR22-containing molecular assembly (lipid vesicle) dispersion. The size of each of the obtained lipid vesicles was measured by dynamic light scattering (Zeta-Sizer Nano ZS, Malvern Panalytical Ltd). The concentration of SQR22 in the dispersion was determined from the absorbance of SQR22 in ethanol (631 nm). The size of the lipid vesicle was approximately 100 nm even if which one of the five types of PCs was used (Table 2). Each molecular assembly dispersion was blue in color, and maximum absorption was observed at 625 to 637 nm in the visible absorption spectrum (FIG. 3B, Table 2).

TABLE 2

Physical properties of SQR22-containing molecular assembly (lipid vesicle)

| Sample | Lipid composition (molar ratio) | Lipids/SQR22 (weight/weight) | SQR22 (mol %) | Particle size (nm) | Maximum absorption wavelength [a] (nm) | Maximum fluorescence emission wavelength [b] (nm) | Phase transition temperature [c] (° C.) |
|---|---|---|---|---|---|---|---|
| $PC_{14}$-NVSQ | $PC_{14}$/SA/PEG-DSPE (9/1/0.06) | 50 | 3.1 | 104 ± 25 | 625 | 664 | 24 |
| $PC_{15}$-NVSQ | $PC_{15}$/SA/PEG-DSPE (9/1/0.06) | 50 | 3.2 | 106 ± 29 | 631 | 664 | 35 |
| $PC_{16}$-NVSQ | $PC_{16}$/SA/PEG-DSPE (9/1/0.06) | 50 | 3.3 | 105 ± 25 | 635 | 664 | 40 |
| $PC_{17}$-NVSQ | $PC_{17}$/SA/PEG-DSPE (9/1/0.06) | 50 | 3.4 | 106 ± 26 | 637 | 664 | 49 |
| $PC_{18}$-NVSQ | $PC_{18}$/SA/PEG-DSPE (9/1/0.06) | 50 | 3.5 | 111 ± 27 | 636 | 662 | 54 |

[a] Measurement value at 25° C.
[b] Fluorescence emission spectra of $PC_{14}$-, $PC_{15}$-, $PC_{16}$-, $PC_{17}$- and $PC_{18}$-NVSQ were measured at 40, 45, 50, 55, and 60° C., respectively.
[c] The phase transition temperatures were each cited from the following literatures. $PC_{14}$ and $PC_{18}$ (Koynova, R. & Caffrey, M. Biochim. Biophys. Acta- Rev. Biomembr. 1376, 91-145 (1998)), $PC_{16}$ (Arai, S. et al. RSC Adv. 5, 93530-93538 (2015)), $PC_{15}$ and $PC_{17}$ (Sou, K et al. ACS Sensors 1, 650-655 (2016)).

(Example 5) Temperature-Responsive Fluorescence Characteristics of SQR22-Containing Lipid Vesicle The fluorescence characteristics of the five types of PC-NVSQ were examined. Fluorescence emission of the prepared PC-NVSQs were not observed under UV light ($\lambda$=365 nm) at approximately 25° C. except for PC14-NVSQ (FIG. 4A). When heated, all PC-NVSQ dispersions emitted a strong fluorescence, and the fluorescence emission spectra were the same as each other regardless of the lipid types (FIG. 4B). The maximum fluorescence emission wavelengths under heating conditions were 664 nm for $PC_{14}$-, $PC_{15}$-, $PC_{16}$- and $PC_{17}$-NVSQs, and 662 nm for $PC_{18}$-NVSQ. Based on the correlation between the maximum emission wavelength and the polarity index of SQR22 (FIG. 1B), the polarity around SQR22 is estimated to be comparable to ethanol, methanol, acetone, acetonitrile or the like which have a polarity index of 4.3 to 5.8, supporting that SQR22 is located in the non-polar region of the lipid bilayer membrane.

The correlation curve between the fluorescence intensity of PC-NVSQ and the temperature clearly showed that the fluorescence intensity of SQR22 changed in different temperature ranges depending on the lipid types constituting the bilayer membrane (FIG. 4C). In order to analyze the correlation between the fluorescence intensity of SQR22 and the phase transition temperature of the lipid bilayer membrane, changes in fluorescence intensity of all PC-NVSQs with different acyl chain lengths were measured when decreasing the temperature (transition from the liquid crystal state to the gel state). In each case, a typical sigmoid curve was shown, and the fluorescence intensity of SQR22 decreased as the temperature decreased. The temperature at which the fluorescence intensity began to sharply decrease was 29±1, 36±1, 41±1, 47±1 and 55±1° C. for $PC_{14}$-, $PC_{15}$-, $PC_{16}$-, $PC_{17}$- and $PC_{18}$-NVSQs, respectively. Since the gel-liquid crystal phase transition temperatures of the lipid bilayer membrane comprising $PC_{14}$, $PC_{15}$, $PC_{16}$, $PC_{17}$ and $PC_{18}$ are 24, 35, 40, 49 and 55° C., respectively, in each case, the critical temperature which decreased the fluorescence intensity when decreasing the temperature was almost the same as the phase transition temperature of the lipid bilayer membrane. For $PC_{14}$-NVSQ, the cooperativity of the sigmoid curve was low, but rather the inflection point (26±0.2° C.) of the curve was close to the phase transition temperature. Furthermore, a change in fluorescence intensity of $PC_{16}$-NVSQ was tested when increasing the temperature (transition from the gel state to the liquid crystal state). The temperature at which the fluorescence intensity began to increase when increasing the temperature was approximately 40±1° C., which is almost the same as the phase transition temperature (40° C.) of the lipid bilayer membrane comprising $PC_{16}$. Therefore, it can be said that the critical temperature at which the increase/decrease in fluorescence intensity is caused when increasing/decreasing the temperature corresponds to the phase transition temperature specific to the lipid bilayer membrane. Fluorescence switching in heating and cooling cycles could be stably repeated for at least 10 cycles in any PC-NVSQ (not shown).

Therefore, these results clearly showed that the molecular assembly containing SQR22 and exhibiting a phase transition behavior at a specific temperature functions as a temperature-responsive fluorescent particle. The transition temperature between fluorescence quenching and fluorescence emission corresponds to the phase transition temperature of the lipid bilayer membrane, and the transition temperature can be adjusted by selecting the lipid component. Therefore, various applications in temperature sensing can be expected.

(Example 6) Observation of Temperature-Responsive Fluorescence by Fluorescence Imaging In order to demonstrate the application to temperature imaging with a fluorescence microscope, fluorescence imaging observation of a temperature-responsive fluorescent particle was attempted. In this test, a large multilayer lipid vesicle with the same composition as $PC_{16}$-NVSQ (fluorescence switching temperature; 40° C.) was used. Fluorescence emission when water was locally heated by irradiating with a near-infrared laser (wavelength: 980 nm) and quenching when cooled after intercepting the laser irradiation were observed under a fluorescence microscope (FIGS. 5A to 5D). As shown in FIGS. 5B to 5D, a change in fluorescence intensity before the laser irradiation (33° C.) was very small. When the laser irradiation was started, the fluorescence intensity increased rapidly (approximately 40%/sec), and the fluorescence intensity increased 15 times larger than that before the irradiation. When the laser irradiation was intercepted resulting in a decrease in temperature, the fluorescence intensity decreased. This result indicates that this temperature-responsive fluorescent particle is a promising tool for temperature imaging.

(Example 7) Analysis of Behavior Mechanism of Temperature-Responsive Fluorescent Particle Examples in which fluorescence emission wavelength and anisotropy changed with the phase transition of a lipid bilayer membrane such as 6-dodecanoyl-2-dimethylaminonaphthalene (laurdan) or 1,6-diphenyl-1,3,5-hexatriene (DPH) had been heretofore reported, but no reported example was found in which quenching and emission of fluorescent molecules were switched according to the phase transition behavior of the molecular assembly as in the present invention. Therefore, an attempt was made to analyze the mechanism of switching between fluorescence emission and quenching.

When the spectroscopic data shown in FIG. 3B is analyzed in detail, the absorption peak of SQR22 in the lipid bilayer membrane is shifted to a slightly longer wavelength than that of the monomer in the solvent, and a shoulder peak is observed at the short wavelength of 580 nm. This suggested the formation of self-aggregate of SQR22 in the lipid bilayer membrane of the gel phase, which was considered to cause aggregation-caused quenching. In this case, since an equilibrium state exists between the dye present as a monomer and the dye present as an aggregate, decreasing the content of SQR22 in the lipid membrane decreases the proportion of aggregates and thereby eliminates quenching. To verify this hypothesis, $PC_{16}$-lipid vesicles containing various amounts of SQR22 were prepared and their fluorescence characteristics were examined. As shown in FIG. 6A, as the content of SQR22 was decreased, they began to emit fluorescence even in the gel phase at room temperature. The degree of change in fluorescence intensity with temperature was decreased by decreasing the SQR22 content, and decreasing the SQR22 content to 0.1 mol % almost eliminated the temperature-dependent change in fluorescence intensity (FIG. 6B).

This result supports that the aggregation of fluorescent molecules in the lipid bilayer membrane in the gel phase induces quenching, and as the content of the fluorescent molecules is decreased, the equilibrium shifts from the aggregate to the monomer and quenching is eliminated. The plots of fluorescence intensities at 25° C. and 45° C. show that the fluorescence intensity decreases with an increase in SQR22 content in both cases where the lipid bilayer membrane is in the gel phase at 25° C. and in the liquid crystal state at 45° C. (FIG. 6C). This is considered to be because even when the lipid bilayer membrane is in the liquid crystal state, an increase in the content of SQR22 leads to partial quenching. However, due to a stronger quenching in the gel phase (25° C.), a larger intensity ratio between the fluorescence intensities at 25° C. and 45° C. was achieved with an increase in the SQR22 content, and the ratio of the fluorescence intensity at 45° C. ($FI_{45}$) to the fluorescence intensity at 25° C. ($FI_{25}$) was 1.1±0.01 and 62.5±1.03 for 0.1 and 3.3 mol % of SQR22, respectively.

Comparison of UV-vis spectra of $PC_{16}$-lipid vesicles containing 3.3 mol % and 0.1 mol % of SQR22 supports aggregation of SQR22 in the lipid bilayer membrane in the gel phase (FIGS. 6D1 and 6D2). The absorption peak of SQR22 in the $PC_{16}$-lipid vesicle containing 3.3 mol % of SQR22 was 636 nm at 25° C. The absorption peak shifts to a shorter wavelength with an increase in temperature. It reached 625 nm at a temperature of 42° C. near the phase transition temperature (40° C.) of the lipid vesicle. The shift to a long wavelength at a lower temperature suggests the formation of a J aggregate in the gel phase. When the temperature exceeded 40° C., the short wavelength-shifted shoulder peak (estimated to correspond to an H aggregate) near 580 nm also decreased. In contrast, the degree of change in absorption peak of the lipid vesicle containing 0.1 mol % of SQR22 was much smaller than that of the lipid vesicle containing 3.3 mol % of SQR22 (FIG. 6E). The shoulder peak near 580 nm for 0.1 mol % of SQR22 may suggest the presence of trace amounts of H aggregates, but a change in absorption with temperature was negligible.

Based on these experimental evidences, the mechanism by which the fluorescence characteristics of SQR22 in the lipid bilayer molecular membrane are switched is shown in FIG. 7. The lipid vesicle containing 3.3 mol % of SQR22 is quenched by SQR22 aggregation (H- and J-aggregates) in the gel phase at a temperature of the phase transition temperature or less (aggregation-caused quenching). When the transition to the liquid crystal state occurs at a temperature of the phase transition temperature or more of the lipid bilayer membrane, the self-aggregate of SQR22 disaggregates and emits fluorescence (disaggregation-caused fluorescence emission). This fluorescence switching mechanism based on the control of molecular assembling is important for the development of a temperature sensor with a high sensitivity to temperature.

(Example 8) Temperature-Responsive Fluorescent Particle Containing SQR22 Analog

In order to investigate whether this fluorescence switching mechanism could be generalized to SQR22 analogs, the temperature responsiveness of a lipid vesicle containing an analog SQR23 with a different hydrophobic group was measured. SQR23 was synthesized as previously reported (Dong, S. ACS Appl. Nano Mater. 2018, 1, 1009-1013). The lipid vesicle was prepared according to the method described in Example 3. The lipid vesicle consisting of $PC_{16}$/SA/PEG-DSPE=9/1/0.06 (molar ratio) containing 3.3 mol % of SQR23 was prepared.

As shown in FIG. 8, the lipid vesicle having 3.3 mol % of SQR23 introduced thereinto also showed an increase in fluorescence at a temperature near the phase transition temperature (40° C.) of the lipid vesicle, and it was clearly shown to function as a temperature-responsive fluorescent particle. In previous studies, no quenching was observed for a lipid vesicle having 0.1 mol % of SQR23 introduced thereinto (Dong, S. ACS Appl. Nano Mater. 2018, 1 (3), 1009-1013), which is in agreement with the result for SQR22 described in Example 7. It is therefore considered that the quenching and emission of fluorescence are switched due to aggregation and disaggregation also in the case of SQR23, similarly to in the case of SQR22.

(Comparative Example 1) Molecular Assembly not Exhibiting Phase Transition Behavior The requirement for the molecular assembly used in the present invention is to exhibit a phase transition at a specific temperature. It will be now illustratively described that in the case of the molecular assembly not satisfying this requirement, temperature-responsive switching between quenching and emission of fluorescence do not occur. PEG-DSPE and SQR22 (at a weight ratio of 50/1) were dissolved in t-butyl alcohol and then lyophilized to obtain a lyophilized powder. The obtained lyophilized powder was dispersed in phosphate-buffered saline (PBS) to obtain a blue transparent dispersion. The obtained dispersion emitted a strong fluorescence at room temperature under UV light irradiation (365 nm), and no change in fluorescence intensity was observed even when the temperature was increased. This is because a micelle in the disordered phase formed by PEG-DSPE do not exhibit a phase transition and as a result, switching between the quenching and emission of fluorescence due to aggregation and disaggregation of SQR22 according to the phase transition does not occur. Such a molecular assembly that does not exhibit a phase transition behavior cannot achieve the intended object of the present invention.

[Comparative Example 2] Vesicle Having High Cholesterol Content

A mixed lipid consisting of $PC_{16}$/cholesterol/SA/PEG-DSPE (molar ratio: 5/5/1/0.06) and SQR22 (weight ratio: mixed lipid:SQR22=50/1) were dissolved in t-butyl alcohol, and then lyophilized to obtain a lyophilized lipid powder. The obtained lyophilized powder was dispersed in phosphate-buffered saline (PBS). This dispersion was added to EXTRUDER (trade name; manufactured by Northern Lipids Inc.), and caused to successively permeate through polycarbonate membrane filters (manufactured by Millipore) having pore sizes of 0.45 μm, 0.20 μm and 0.05 μm at 60° C. under pressure. Most of SQR22 was filtered off by the polycarbonate membrane filters, and the obtained lipid vesicle dispersion contained only a small amount of SQR22, and no fluorescence quenching at room temperature was observed. This lipid vesicle is an example of a molecular assembly that does not exhibit a phase transition behavior because it contains 45 mol % of cholesterol as well as that cannot stably support a fluorescent molecule, and such a molecular assembly cannot provide the desired temperature-responsive fluorescence characteristics.

(Example 9) Preparation of Temperature-Responsive Fluorescent Probe Comprising Temperature-Responsive Fluorescent Particle Having Biomolecule Recognition Element Modified on the Surface Thereof $PC_{16}$, SA, biotinylated 1,2-distearoyl-sn-glycero-3-phosphoethanolamine-N-monomethoxy poly(ethylene glycol)

(2000) (biotinylated PEG-DSPE) (manufactured by Avanti Polar Lipids, Inc.) were dissolved in t-butanol at a molar ratio of $PC_{16}$/SA/biotinylated PEG-DSPE=9/1/0.05 and lyophilized to obtain a mixed lipid powder. A stock solution of SQR22 (in ethanol) was added to the obtained mixed lipid powder (3.3 mol % of SQR22 relative to a lipid), dissolved in t-butanol and lyophilized to obtain an SQR22-containing mixed lipid powder.

The SQR22-containing mixed lipid powder was dispersed in phosphate-buffered saline (PBS) (5 mg/mL), and hydrated and dispersed with a vortex mixer. This dispersion was added to EXTRUDER (trade name; manufactured by Northern Lipids Inc.), and caused to successively permeate through polycarbonate membrane filters (manufactured by Merck Millipore) having pore sizes of 0.45 µm, 0.20 µm and 0.05 µm at 60° C. under pressure to obtain a dispersion of an SQR22-containing lipid vesicle modified with biotin on the surface thereof. The size of the obtained molecular assembly was 93.0±46.2 nm as measured by dynamic light scattering (Zeta-Sizer Nano ZS, Malvern Panalytical Ltd). As a result of examining a change in fluorescence intensity with temperature, an increase in temperature-responsive fluorescence intensity was observed corresponding to the phase transition temperature (40° C.) of the lipid vesicle (FIG. 9). From this result, it was expected to function as a temperature-responsive fluorescent probe particle having a molecular recognition site supported on the surface thereof.

(Example 10) Detection of Biomolecule with Temperature-Responsive Fluorescent Probe Particle (Example Using Microplate as Heat Source)

In this Example, an example of using a microplate as a heat source will be shown. A demonstration test for biomolecule detection was carried out using the biotinylated temperature-responsive fluorescent probe particle prepared in Example 9. A dispersion of the biotinylated temperature-responsive fluorescent probe particle (SQR22 concentration=5 µg/mL, 40 µL) was added to a streptavidin-coated 96-well plate (manufactured by Thermo Fisher Scientific K.K.), incubated for 2 hours, and then placed on a hot plate (RSH-1DR, manufactured by AS ONE CORPORATION) heated to 80° C. to measure a change in fluorescence intensity over time. An optical fiber-type fluorescence detector (FLE1100 type, manufactured by Nippon Sheet Glass Co., Ltd.) was used to detect the fluorescence intensity. In addition to the biotinylated temperature-responsive fluorescent probe particle (standard sample) ((A) in FIG. 10A), a lipid vesicle prepared using PEG-DSPE instead of biotinylated PEG-DSPE was used as a control sample ((B) in FIG. 10A) to investigate the effect of non-specific binding between the lipid vesicle and streptavidin. In addition, the wells coated with streptavidin were treated with a biotin solution (50 µg/mL, 150 µL) to investigate the effect of non-specific binding between biotin and a substrate ((C) in FIG. 10A). In all tests, the SQR22 concentration was fixed at 5 µg/mL, and the time from the addition of the sample to the wells to the start of heating was fixed at 2 hours. As shown in FIG. 10B, for the standard sample, the fluorescence intensity increased within 10 seconds after the start of heating, whereas for the control sample, it took 40 seconds for the fluorescence to increase. This is because for the standard sample, the temperature-responsive fluorescent probe is bound to the substrate (a heat source) due to the specific molecular recognition of biotin and streptavidin, so that heat is rapidly transferred from the heat source to the temperature-responsive fluorescent probe and the phase transition occurs to increase the fluorescence intensity, whereas for the control sample, the temperature-responsive fluorescent probe is suspended in the solution and it takes time for the temperature of the entire solution to reach the transition temperature. Therefore, this method can distinguish between the temperature-responsive fluorescent probe that is bound to the heat source via the specific molecular recognition and the temperature-responsive fluorescent probe that is not bound to the heat source, by the fluorescence response, and it can be thereby used to detect biomolecules involved in specific molecular recognition between the temperature-responsive fluorescent probe and the heat source.

Next, in order to verify the rapidity of this method, the incubation time after adding the sample to the wells was examined. Each of the biotinylated temperature-responsive fluorescent probe particle dispersions (SQR22 concentration=5 µg/mL, 40 µL) was added to a streptavidin-coated 96-well plate, allowed to stand at room temperature for 30 seconds, 5 minutes, 10 minutes, 15 minutes, 20 minutes or 30 minutes, and placed on a hot plate (RSH-1DR type, manufactured by AS ONE CORPORATION) heated to 80° C. to measure a change in fluorescence intensity over time. A lipid vesicle prepared using PEG-DSPE instead of biotinylated PEG-DSPE was added to a streptavidin-coated 96-well plate, incubated for 2 hours and used as a negative control. For the negative control without molecular recognition binding, it takes 42.5 seconds from the start of heating to the maximum fluorescence intensity. In contrast, for the biotinylated temperature-responsive fluorescent probe particle, the time from the start of heating to the maximum fluorescence intensity is reduced to 30 seconds in the case that the incubation time is 30 seconds and further reduced as the incubation time is prolonged but it reaches a nearly constant level at the incubation time of 20 minutes or more (FIG. 11). Therefore, in the method of the present Example, binding by specific molecular recognition can be detected by incubation for 30 seconds and heating for 30 seconds (a total of 1 minute).

Example 11

This Example will show an example of examining the detection sensitivity for a prostate-specific antigen (PSA) which is clinically tested as a tumor marker useful for screening for prostate cancer, determining the therapeutic effect and early detection of recurrence, using the temperature-responsive fluorescent probe particle prepared in Example 9. A commercially available human PSA-total ELISA kit (product number: RAB0331, manufactured by Sigma-Aldrich Co. LLC) was purchased. This kit contains a PSA capture antibody-coated ELISA plate, a human PSA standard, a biotinylated human PSA detection antibody, a horseradish peroxidase (HRP)-labeled streptavidin, various buffers, an ELISA stop solution and an HRP substrate. The human PSA standard (or an analyte), the biotinylated human PSA detection antibody and the horseradish peroxidase (HRP)-labeled streptavidin are successively added and washed on the PSA capture antibody-coated ELISA plate, and a substrate (3,3',5,5-tetramethylbenzidine) is lastly added thereto to detect the coloration of a product due to the enzymatic reaction (FIG. 12A). According to the manufacturer's protocol, the detection limit concentration of PSA is 10 pg/mL.

The detection sensitivity when this detection was carried out by instead using a biotinylated temperature-responsive fluorescent probe was examined. That is, the human PSA standard, the biotinylated human PSA detection antibody and streptavidin were successively added and washed on the PSA capture antibody-coated ELISA plate and thereafter, the biotinylated temperature-responsive fluorescent probe was lastly added thereto, and the ELISA plate was placed on a hot plate (80° C.) to measure a change in fluorescence intensity over time (FIG. 12B). An optical fiber-type fluorescence detector (FLE1100 type, manufactured by Nippon Sheet Glass Co., Ltd.) was used to measure the fluorescence intensity. The results are shown in FIG. 12C. For a negative control (without PSA), the time from the start of heating to the maximum fluorescence intensity was 43.3 seconds (an average value of three measurements), whereas it was reduced to 30.7 seconds in the presence of PSA of 10 pg/mL which is the detection limit concentration of ELISA. This is because for the negative control, the biotinylated temperature-responsive fluorescent probe was suspended due to the absence of the target molecule PSA, whereas in the presence of PSA, the biotinylated temperature-responsive fluorescent probe was adhered to the plate due to the sandwich-type molecular recognition by the antibody and heat was thereby transferred quickly. Even when PSA was further diluted to $10^{-4}$ pg/mL, which was 100,000 times lower than the detection limit of ELISA, the time from the start of heating to the maximum fluorescence intensity was 32.1 seconds and the difference from the negative control was able to be detected.

Therefore, when the temperature-responsive fluorescent probe of the present invention was used, it was clearly shown that the detection limit concentration of PSA was 100,000 times or more lower than the detection limit of the ELISA kit, and it was confirmed that the sensitivity could be greatly improved.

(Example 12) Detection of Biomolecule with Temperature-Responsive Fluorescent Probe Particle (Example Using Gold Nanoparticle as Heat Source)

This Example will show an example of using a gold nanoparticle as a heat source. The biotinylated temperature-responsive fluorescent probe particle described in Example 9 was used as a temperature-responsive fluorescent probe particle. A commercially available streptavidin-bound gold nanoparticle (20 nm, manufactured by Cytodiagnostics Inc.) was used as a gold nanoparticle. First, each of a dispersion containing 70 biotinylated temperature-responsive fluorescent probe particles/1.5 mL and a dispersion containing 70 streptavidin-bound gold nanoparticles/1.3 mL was prepared. The particle concentration of the biotinylated temperature-responsive fluorescent probe particles was estimated roughly from the average size of a lipid vesicle as a single membrane lipid vesicle, the lipid concentration, and the area occupied by a molecule of the lipid. The particle concentration of the streptavidin-bound gold nanoparticles was complied with the distributor's specifications. These dispersions were mixed and further 2-fold diluted to 70 particles/5.6 mL, then allowed to stand at room temperature for 12 hours to form a complex of the biotinylated temperature-responsive fluorescent probe particle and the streptavidin-bound gold nanoparticle. Each of 40 μL aliquots was collected from this dispersion and transferred to a 96-well plate (manufactured by AS ONE CORPORATION). The 96-well plate was set on a fluorescence microscope (BZ-X710 type, KEYENCE CORPORATION), and it was irradiated with a green laser (wavelength: 545±25 nm) to generate heat from the gold nanoparticles by photothermal conversion, while fluorescence emission was measured from the temperature-responsive fluorescent probe particles with an optical fiber-type fluorescence detector (FLE1100 type, Nippon Sheet Glass Co., Ltd.). In addition, fluorescence emission was measured under the same conditions as the above except for using temperature-responsive fluorescent probe particles containing non-biotinylated PEG-DSPE as a control sample (FIG. 13A).

When the biotinylated temperature-responsive fluorescent probe particles were used, wells in which no increase in fluorescence was observed ((C) in FIG. 13B) and wells in which an increase in fluorescence intensity was observed ((A) and (B) in FIG. 13B) were confirmed. On the other hand, when the non-biotinylated temperature-responsive fluorescent probe particles were used, no well in which an increase in fluorescence intensity was observed was confirmed ((D) in FIG. 13B). From this result, it is considered that the fluorescence emission of the temperature-responsive fluorescent probe particle was observed by the heat of the gold nanoparticle only when the temperature-responsive fluorescent probe particle and the gold nanoparticle were bound by the molecular recognition of biotin and streptavidin. Under these experimental conditions which are set such that an average of 0.5 complex of the temperature-responsive fluorescent probe particle and gold nanoparticle are present in 40 μL, the number of the complexes included in each of 40 μL aliquots is 0 (61%), 1 (30%) and 2 or more (9%), as estimated from a Poisson distribution. The positive result in detection (A) shown in FIG. 13A was an example that exhibited the highest fluorescence intensity of the fluorescence observed, and the others exhibited the fluorescence intensity equivalent to the positive result in detection (B). This indicates that the positive result in detection (B) is likely to be the fluorescence intensity typical of one lipid vesicle. Detection of one biomolecule with one temperature-responsive fluorescent probe particle in 40 μL of the sample solution corresponds to the detection sensitivity of $4.2 \times 10^{-17}$ M.

(Example 13) Digital Counting of Biomolecules with Temperature-Responsive Fluorescent Probe Particles (Example Using Microfluidic Device)

This Example will illustrate a digital counting method of biomolecules with temperature-responsive fluorescent probe particles (FIG. 14A). Microdroplets including temperature-responsive fluorescent probe particles, a heat source and an analyte can be prepared by using a microfluidic device, and the number of target molecules contained in the analyte can be counted by counting the number of microdroplets emitting fluorescence from the temperature-responsive fluorescent probe particles (FIG. 14A).

As shown in FIG. 14B, the volume of the microdroplet can be calculated from the diameter of the droplet. For example, for a microdroplet with a diameter of 50 μm, the volume is calculated to be 65 pL. The diameter of the microdroplet can be controlled by the flow path and flow velocity of the device.

In this method, at least one or more temperature-responsive fluorescent probe particles and a heat source are included in each microdroplet. By setting an average of 5 temperature-responsive fluorescent probe particles and a heat source to be included in each microdroplet, 99% or more of the microdroplets can include at least one or more temperature-responsive fluorescent probe particles and a heat source, according to the Poisson distribution. Digital counting requires the conditions that the target molecule to be detected is 1 to 0 molecules in each microdroplet, and such conditions can be estimated from the Poisson distribution (FIG. 14C).

As shown in FIG. 14D, since only the microdroplets including the target molecule to be detected emits fluorescence, the number of the microdroplets emitting fluorescence ($N_F$) corresponds to the number of the target molecules. Further, since the volume (V) of the microdroplet can be calculated from the diameter, the total number of the microdroplets (N) can be counted to also convert it to the concentration.

(Example 14) Preparation and Characterization of SQR-Containing Biotinylated DPPC Vesicle <I. Preparation and Characterization of SQR-Containing Biotinylated DPPC Vesicle>

1,2-Dipalmitoyl-sn-glycero-3-phosphocholine (DPPC), 1,5-dihexadecyl-N-succinyl-L-glutamic acid (DHSG) and 1,2-distearoyl-sn-glycero-3-phosphoethanolamine-N-[biotinyl(polyethylene glycol)-2000] (biotinylated PEG2000-DSPE) were dissolved in tert-butyl alcohol to prepare a stock solution. An SQR22 DPPC liposome is composed of DPPC, DHSG, biotinylated PEG2000-DSPE and SQR22 at a molar ratio of 86.6:9.6:0.5:3. The required amount of the stock solution was added to a round bottom flask, and the mixed solution was then lyophilized overnight in a lyophilizer. The lyophilized mixed lipids were hydrated by the addition of Dulbecco's phosphate-buffered saline (DPBS) to obtain lipid vesicle dispersions having concentrations of 3 to 5 mg/mL. In order to decompose the small pellets, each of the lipid vesicle dispersions was vortexed for 10 to 15 minutes while keeping the temperature at 60° C. or each of the lipid vesicle dispersions was stirred at room temperature for 2 hours. EXTRUDER was set up and was connected to a water pump with temperature control function. The EXTRUDER was heated to 60° C. After vortexing, the lipid vesicle dispersion was added to the EXTRUDER and nitrogen gas pressure was applied thereto to extrude the dispersion through polycarbonate membranes (0.2 μm×1, 0.1 μm×1, 0.05 μm×3). The particle shape and ζ potential of the lipid vesicles were identified with Zetasizer. The concentration of lipid was determined with the Phospholipid C kit according to the manufacturer's instructions. A standard curve for SQR22 was generated from the absorbances of SQR22 at different concentrations in ethanol. The concentration of SQR22 in the SQR-containing biotinylated DPPC vesicle dispersion was calculated from the absorbance at 631 nm. The preparation and characterization of a dispersion of an SQR-containing biotinylated DOPC (1,2-dioleoyl-sn-glycero-3-phosphocholine) vesicle were also carried out in the same manner.

(Example 15) Verification with 96-Well Plate and Device Using Camera (Heating)

Next, verification was carried out with a 96-well plate and a device using a camera, instead of a fluorescence detector. A schematic diagram for the present Example is shown as FIG. 16A.

Procedure

<i. Provision of Wells Coated with Streptavidin>

A streptavidin sample was dissolved in DPBS and diluted to prepare a 20 μg/mL stock solution. Each streptavidin sample was added in the amount of 100 μL to each of the wells needed to be coated. The solution was allowed to stand and dry at room temperature overnight. The remaining solution was removed and 100 μL of 0.1% bovine serum albumin (BSA) was added. The plate was allowed to stand for 1 hour to block non-specific binding sites. The supernatant was removed and each well was washed twice with 100 μL of DPBS.

<ii. Preparation of Sample>

SQR-containing biotinylated DPPC vesicle (SQR-DPPC) dispersions were diluted with DPBS to adjust the SQR22 concentrations to 5, 2, 1, 0.1 and 0.01 μg/ml. A sample of each concentration was added in the amount of 80 μL to the streptavidin-coated well. As a negative control, 80 μL of the sample was additionally added to the streptavidin-uncoated well. Incubation was carried out at room temperature for 1 hour (while gently shaking for 30 minutes). Each sample well was washed twice with 100 μL of DPBS. All wells were filled again with 80 μL of DPBS.

<iii. Observation of Fluorescence Intensity with Celvin (Gel Analyzer)>

The SnapAndGo software was opened, the serial mode was selected, the chamber was closed for placing samples, and then allowing the calibration to be completed. A thermoplate was turned on and preheated to 50° C. After the calibration was completed, the area next to the image capture settings menu was clicked. Using the settings menu, the exposure time and the delay time were adjusted to 3 seconds and 7 seconds, respectively, and pictures were taken every 20 seconds and processed. An excitation wavelength of 470 nm (blue light) and an intensity of 50 were selected. The filter was selected as 680 nm. The sample plate was placed on the thermoplate, the chamber was closed and imaging was started. A contrast value for each image was selected for a suitable analysis. All images were saved for ImageJ analysis.

<iv. Image Analysis>

The ImageJ software was opened. "Analyze" was clicked and the ROI Manager function was selected in "Tools". The images were opened in the ImageJ. The area of the well to be analyzed was selected using a circle. "Add" in the ROI Manager was clicked to add the area surrounded by the circle for analysis. This procedure was repeated for all samples.

The "measure" button in the ROI Manager menu was clicked, data was copied and pasted into an Excel file. Here, the average value was used as an index of the change in fluorescence intensity. This procedure was repeated for all images. All data were collected and analyzed.

The concentration of each well and photographs of the wells are shown in FIGS. 16B and 16C, respectively. The results of the image analysis are shown in Table 3, and the graph generated from Table 3 is shown in FIG. 16D. Each of the SQR-DPPC samples having concentrations of 1, 2 and 5 μg/mL ((3), (2) and (1) in FIG. 16B) showed a clear sigmoid curve, whereas each of the samples having concentrations of 0.01 and 0.1 μg/mL ((5) and (4) in FIG. 16B) did not show a clear sigmoid curve but was an almost flat curve. Little difference was observed between the negative control group and a buffer group. This means that all vesicles in the negative control group were washed away in the absence of streptavidin. Furthermore, the sample of (5) in FIG. 16B, having a SQR22 concentration of only 0.01 μg/mL, was 10% higher in its average intensity than those of the negative control and the buffer group, indicating the presence of SQR-DPPC. The sensitivity of the above tests was approximately 0.01 μg/mL for SQR22.

TABLE 3

| | \multicolumn{10}{c}{Time (s)} | | | | | | | | | |
|---|---|---|---|---|---|---|---|---|---|---|
| | 10 | 23 | 36 | 49 | 62 | 75 | 88 | 101 | 114 | 127 |
| Negative control | 10.75 | 10.78 | 10.93 | 10.83 | 10.80 | 10.96 | 10.95 | 10.94 | 10.96 | 10.99 |
| 0.01 μg/mL | 12.04 | 12.07 | 12.12 | 12.21 | 12.31 | 12.40 | 12.44 | 12.50 | 12.61 | 12.58 |
| 0.1 μg/mL | 12.38 | 12.23 | 12.50 | 12.64 | 12.79 | 12.85 | 12.95 | 13.02 | 13.07 | 13.00 |
| 1 μg/mL | 13.47 | 13.03 | 13.44 | 13.89 | 14.29 | 14.70 | 14.94 | 15.25 | 15.40 | 15.47 |
| 2 μg/mL | 13.98 | 13.44 | 13.82 | 14.17 | 14.44 | 14.76 | 15.00 | 15.28 | 15.36 | 15.50 |
| 5 μg/mL | 13.26 | 13.49 | 14.00 | 14.50 | 14.93 | 15.36 | 15.65 | 15.93 | 16.11 | 16.23 |
| buffer | 10.82 | 10.81 | 10.87 | 11.00 | 10.90 | 11.01 | 10.96 | 11.03 | 11.03 | 11.04 |

| | \multicolumn{9}{c}{Time (s)} | | | | | | | | |
|---|---|---|---|---|---|---|---|---|---|
| | 140 | 153 | 166 | 179 | 192 | 205 | 218 | 231 | 244 |
| Negative control | 10.98 | 10.98 | 11.05 | 11.06 | 10.96 | 10.96 | 11.08 | 11.01 | 11.03 |
| 0.01 μg/mL | 12.65 | 12.63 | 12.63 | 12.61 | 12.57 | 12.57 | 12.56 | 12.52 | 12.53 |
| 0.1 μg/mL | 12.95 | 13.03 | 12.96 | 12.99 | 12.88 | 12.86 | 12.89 | 12.76 | 12.81 |
| 1 μg/mL | 15.51 | 15.64 | 15.64 | 15.63 | 15.57 | 15.52 | 15.59 | 15.53 | 15.48 |
| 2 μg/mL | 15.62 | 15.68 | 15.76 | 15.86 | 15.87 | 15.86 | 15.94 | 15.94 | 16.03 |
| 5 μg/mL | 16.36 | 16.49 | 16.63 | 16.66 | 16.68 | 16.69 | 16.77 | 16.76 | 16.83 |
| buffer | 10.92 | 11.09 | 11.11 | 11.11 | 11.14 | 11.13 | 11.22 | 11.10 | 11.14 |

(Example 16) Detection of Different Amounts of Streptavidin with SQR-Containing Biotinylated DPPC Vesicle Dispersion (Heating)

A schematic diagram for the present Example is shown as FIG. 17A. In this Example, in order to confirm the recognition capacity of biotinylated lipid vesicles for streptavidin coated on microplate wells, using a complex of biotin and streptavidin, the surface of each well was coated with streptavidin at different concentrations, and it was examined whether the difference in concentration of streptavidin could be detected by an SQR-containing biotinylated DPPC vesicle dispersion. Since the gel-liquid crystal phase transition temperature of the DPPC vesicle used in this Example is 40° C., the SQR-containing biotinylated DPPC vesicle emits a strong red fluorescence when heated to 50° C. Each well was washed twice to remove unbound SQR-containing biotinylated DPPC vesicles. In this Example, a gel analyzer (Celvin) and ImageJ were used for detecting the fluorescence intensity.

Procedure

<i. Provision of Wells Coated with Streptavidin>

Streptavidin was dissolved in DPBS and diluted to prepare a 20 μg/mL stock solution. Streptavidin was diluted with DPBS to adjust its concentration to 20, 10, 5, 1, 0.1, 0.01 and 0.001 μg/mL. Each streptavidin sample was added in the amount of 100 μL to the wells. The solution was allowed to stand and dry at room temperature overnight. The remaining solution was removed and 100 μL of 0.1% BSA was added. The plate was allowed to stand for 1 hour to block non-specific binding sites. The supernatant was removed and each well was washed twice with 100 μL of DPBS.

<ii. Preparation of Sample>

An SQR-containing biotinylated DPPC vesicle dispersion was diluted with DPBS to adjust the SQR22 concentration to 5 μg/mL (SQR-DPPC). The SQR-DPPC dispersion was added in the amount of 100 μL to the well coated with each amount of streptavidin. The SQR-DPPC dispersion was added in the amount of 100 μL also to a negative control having no streptavidin coated. Incubation was carried out at room temperature for 1 hour. Each sample well was washed twice with 100 μL of DPBS. All wells were filled again with 100 μL of DPBS.

<iii. Observation of Fluorescence Intensity Using Celvin>

Image data was acquired in the same manner as in Example 15.

<iv. Image Analysis>

Image analysis was carried out in the same manner as in Example 15.

Results

Streptavidin solutions containing different concentrations of streptavidin were added to the wells of the microplate and the bottoms of the wells were coated with different amounts of streptavidin. The fluorescence intensity of each well was measured by the method described in the above Procedure. The results in which the fluorescence intensity at 15 seconds was normalized to zero are shown in Table 4 and FIGS. 17B and 17C. These data clearly showed that the SQR22-containing biotinylated DPPC vesicles bound to streptavidin-coated wells and emitted fluorescence from SQR22 during heating at 50° C. The fluorescence intensities corresponded to the concentrations of the streptavidin solution for coating, and when the concentration was 1 μg/mL or more, detection could be carried out by Celvin.

TABLE 4

| | \multicolumn{8}{c}{Time (second)} | | | | | | | |
|---|---|---|---|---|---|---|---|---|
| | 15 | 30 | 45 | 60 | 90 | 120 | 150 | 180 |
| 20 μg/mL | 0 | 0.18 | 0.38 | 0.68 | 0.76 | 1.29 | 1.32 | 1.32 |
| 10 μg/mL | 0 | 0.02 | −0.08 | 0.20 | 0.55 | 0.70 | 0.60 | 0.85 |
| 5 μg/mL | 0 | 0.18 | 0.19 | 0.12 | 0.56 | 0.59 | 0.60 | 0.68 |
| 1 μg/mL | 0 | −0.09 | 0.12 | 0.30 | 0.25 | 0.38 | 0.47 | 0.60 |
| 0.1 μg/mL | 0 | 0.1.4 | −0.04 | 0.36 | 0.42 | 0.48 | 0.47 | 0.47 |
| 0.01 μg/mL | 0 | 0.00 | 0.01 | 0.18 | 0.35 | 0.32 | 0.41 | 0.39 |
| Negative control | 0 | −0.12 | 0.12 | 0.07 | 0.22 | 0.36 | −0.06 | 0.30 |

(Example 17) Detection of Streptavidin by Complex of SQR22-Containing Biotinylated DPPC Vesicle and Streptavidin (Heating)

A schematic diagram for the present Example is shown as FIG. 18. In this Example, in order to enhance the recognition capacity of an SQR22-containing biotinylated DPPC vesicle for streptavidin coated on a microplate well, a complex of a biotinylated vesicle and streptavidin was used to examine whether mixing ratio was effective. In this Example, a DPPC vesicle having a gel-liquid crystal phase transition temperature of 41° C. was used and the microplate was heated at 50° C. for 90 seconds. In this Example, a gel analyzer (Celvin) and ImageJ were used for detecting the fluorescence intensity.

Procedure

<i. Provision of Wells Coated with Streptavidin>

Streptavidin was dissolved in DPBS and diluted to prepare a 20 μg/mL stock solution. Each streptavidin sample was added in the amount of 100 μL to the wells. The solution was allowed to stand and dry at room temperature overnight. The remaining solution was removed and 100 μL of 0.1% BSA was added. The plate was allowed to stand for 1 hour to block non-specific binding sites. The supernatant was removed and each well was washed twice with 100 μL of DPBS.

<ii. Preparation of Vesicle-Streptavidin Complex>

The streptavidin stock was diluted to prepare streptavidin samples having concentrations of 10, 5, 2.5, 1.25 and 0.625 μg/mL. Five empty 1.5 mL tubes were provided and 40 μL of each streptavidin sample prepared was added to the tube. Then, 40 μL of an SQR-containing biotinylated DPPC vesicle (SQR-DPPC) dispersion having a lipid concentration of 2.5 mg/mL was added to all tubes, and complexes having a molar ratio of vesicle-streptavidin of 4:1, 2:1, 1:1, 1:2 and 1:4 were prepared. Each mixture was stirred with a vortex mixer to promote complex formation and the mixture was incubated at room temperature for 1 hour. The weight of B-SQR-DPPC-L of 100 nm is approximately 59200 kDa, which is 1000 times the molecular weight of streptavidin (55 kDa). Therefore, the number of SQR-DPPC in 2.5 mg/mL (lipid concentration) SQR-DPPC dispersion is approximately the same as the number of streptavidin molecule in 2.5 μg/mL streptavidin sample.

Each mixture was added in the amount of 100 μL to the streptavidin-coated well. As a positive control, 100 μL of SQR-DPPC having an SQR concentration of 5 μg/mL was added to the streptavidin-coated well. As a negative control, another 100 μL of B-SQR-DPPC-L was added to a streptavidin-uncoated well. As a buffer only, only a buffer for treatment was added to the streptavidin-uncoated well. The plate was incubated for 1 hour at room temperature and all wells were washed twice with 100 μL of DPBS. Then, 100 μL of DPBS was added to the well.

<iii. Observation of Fluorescence Intensity Using Celvin>

The SnapAndGo software was opened, the serial mode was selected, the chamber was closed for placing samples, and then allowing the calibration to be completed. A thermoplate was turned on and preheated to 50° C. After the calibration was completed, the area next to the image capture settings menu was clicked. Using the settings menu, the exposure time and the delay time were adjusted to 3 seconds and 7 seconds, respectively, and pictures were taken every 20 seconds and processed. An excitation wavelength of 470 nm (blue light) and an intensity of 50 were selected. The filter was selected as 680 nm. The sample plate was placed on the thermoplate, the chamber was closed and imaging was started. A contrast value for each image was selected for a suitable analysis. All images were saved for ImageJ analysis.

<iv. Image Analysis>

Image analysis was carried out in the same manner as in Example 15.

Results

The analysis results are shown in Table 5. The fluorescence intensity at 90 seconds was adopted and the fluorescence intensity at 15 seconds was normalized to zero. The fluorescence intensity was enhanced at a mixed molar ratio of liposomes to streptavidin of 1:2. It is considered that this was caused by the involvement of more SQR22 liposomes in the detection due to the formation of the complex of the liposome and streptavidin.

TABLE 5

| Liposome:streptavidin (mol:mol) | Fluorescence Intensity (—) |
| --- | --- |
| 4:1 | 1.5 |
| 2:1 | 1.4 |
| 1:1 | 1.2 |
| 1:2 | 1.8 |
| 1:4 | 1.5 |
| Positive control | 1.6 |
| Negative control | 0.7 |
| Buffer only | 0.6 |

(Example 18) Measurement Experiment of Fluorescence Intensity with Different Amounts of Streptavidin by Different Concentrations of SQR-Containing Biotinylated DOPC Vesicle Dispersion (Unheating)

A schematic diagram for the present Example is shown as FIG. 19A. In this Example, in order to confirm the recognition capacity of biotinylated DOPC vesicles for streptavidin coated on microplate wells, using a complex of biotin and streptavidin, the surface of each well was coated with streptavidin at different concentrations, and it was examined whether the difference in concentration of streptavidin could be detected by SQR22-containing biotinylated DPPC vesicle dispersions having two different SQR concentrations. Since the gel-liquid crystal phase transition temperature of the DPPC vesicle dispersion used in this Example is −22° C., the SQR22-containing biotinylated DOPC vesicle dispersion emits a strong red fluorescence even at room temperature. The wells are not required to be heated, but the wells are required to be washed twice to remove unbound SQR22-containing biotinylated DOPC vesicles. In this Example, a gel analyzer (Celvin) and ImageJ were used for detecting the fluorescence intensity.

Procedure

<i. Provision of Wells Coated with Streptavidin>

Streptavidin was dissolved in DPBS and diluted to prepare a 20 μg/mL stock solution. To a 96-well microplate (from Greiner Bio-One GmbH) were added each of the streptavidin solutions, which were diluted to various concentrations (0.0125, 0.125, 0.25, 1.25, 2.5 and 12.5 μg/mL), in the amount of 40 μL per well. After the addition, it was dried in a dryer for 45 minutes (internal temperature of 30 to 40° C.), and streptavidin was immobilized on the bottom surface of the well. To this streptavidin-modified microplate was added 1% BSA in the amount of 100 μL per well followed by blocking for 10 minutes. After blocking, washing was carried out three times with a 0.05% Tween-PBS washing liquid (PBS-T, manufactured by Takara Bio Inc.).

<ii. Preparation of Sample>

SQR-containing biotinylated DOPC vesicle dispersions were diluted with DPBS to adjust the SQR22 concentrations to 2.0 and 5.0 μg/mL (SQR-DOPC). Each of the SQR-DOPC dispersion was added in the amount of 100 μL to the well coated with each amount of streptavidin and was allowed to stand for 10 minutes. Lastly, each well was washed three times with PBS-T to remove unbound SQR-containing biotinylated DPPC vesicles. For a negative control, BSA blocking, washing, addition of the SQR-containing biotinylated DOPC vesicle dispersion containing each concentration of SQR, washing, and measurement with Celvin were carried out under the same conditions, except that DPBS was used and the process for immobilizing streptavidin was carried out, and the negative control being located next to each sample well.

<iii. Observation of Fluorescence Intensity Using Celvin>

The SnapAndGo software was opened, the serial mode was selected, the chamber was closed for placing samples, and then allowing the calibration to be completed. After the calibration was completed, the area next to the image capture settings menu was clicked. Using the settings menu, the exposure time was adjusted to 30 seconds, and pictures were taken and processed. An excitation wavelength of 625 nm (red light) and an intensity of 50 were selected. The filter was selected as 780 nm. A contrast value for each image was selected for a suitable analysis. All images were saved for ImageJ analysis. The data was the value of the fluorescence intensity of each well sample minus the fluorescence intensity of the blank.

Results

The arrangement (address) of each well and the fluorescence intensity after correction for each well are shown in FIG. 19B and Table 6, respectively. In addition, the graph generated from Table 6 is shown in FIG. 19C. In the column "ROI No" of Table 7, bold letters correspond to sty (streptavidin) (+) BSA (+) DOPC (+), and the others correspond to sty (−) BSA (+) DOPC (+).

TABLE 6

| Streptavidin µg/well | DOPC µg/mL | ROI No. | Address | Sample | Blank | Fluorescence intensity after correction |
|---|---|---|---|---|---|---|
| 0.0005 | 5 | 9 | B1 | 67.478 | 30.3 | 37.178 |
|  | 5 | 10 | B2 | 70.481 | 32.252 | 38.229 |
| 0.005 | 5 | 3 | C3 | 73.321 | 30.846 | 42.475 |
|  | 5 | 4 | C4 | 65.42 | 30.373 | 35.047 |
| 0.01 | 5 | 7 | C7 | 75.736 | 34.131 | 41.605 |
|  | 5 | 8 | C8 | 75.478 | 33.373 | 42.105 |
| 0.05 | 5 | 11 | B3 | 122.522 | 31.686 | 90.836 |
|  | 5 | 12 | B4 | 72.946 | 33.062 | 39.884 |
| 0.1 | 5 | 1 | C1 | 238.264 | 33.171 | 205.093 |
|  | 5 | 2 | C2 | 78.935 | 33.566 | 45.369 |
| 0.5 | 5 | 5 | C5 | 250.312 | 30.152 | 220.16 |
|  | 5 | 6 | C6 | 72.543 | 31.349 | 41.194 |
| 0.0005 | 2 | 19 | A3 | 52.397 | 35.003 | 17.394 |
|  | 2 | 20 | A4 | 57.908 | 38.91 | 18.998 |
| 0.005 | 2 | 17 | A1 | 46.751 | 29.702 | 17.049 |
|  | 2 | 18 | A2 | 55.381 | 32.648 | 22.733 |
| 0.01 | 2 | 15 | B7 | 56.926 | 32.441 | 24.485 |
|  | 2 | 16 | B8 | 54.473 | 31.852 | 22.621 |
| 0.05 | 2 | 23 | A7 | 78.59 | 34.694 | 43.896 |
|  | 2 | 24 | A8 | 53.929 | 31.483 | 22.446 |
| 0.1 | 2 | 13 | B5 | 122.515 | 33.41 | 89.105 |
|  | 2 | 14 | B6 | 57.637 | 33.101 | 24.536 |
| 0.5 | 2 | 21 | C5 | 125.675 | 39.466 | 86.209 |
|  | 2 | 22 | C6 | 58.245 | 36.923 | 21.322 |

For both the 5.0 µg/mL SQR-containing biotinylated DOPC vesicle dispersion and the 2.0 µg/mL SQR-containing biotinylated DOPC vesicle dispersion, the fluorescence intensity as measured by Celvin increased from the amount of streptavidin bound (assuming that 100% of the streptavidin added to the well was bound) of 0.01 µg/well and reached an almost constant value of 0.1 µg/well. The constant value was higher in the 5.0 µg/mL SQR-containing biotinylated DOPC vesicle dispersion. On the other hand, for the negative controls, the values by subtracting those of the blank showed no significant difference depending on the location of the wells, and they were thereby averaged and shown by dotted lines in the graph (FIG. 19C).

These dotted lines show that the fluorescence intensity of the negative control for the 5.0 µg/mL SQR-containing biotinylated DOPC vesicle dispersion was higher than that of the negative control for the 2.0 µg/mL SQR-containing biotinylated DOPC vesicle dispersion, and the amount of streptavidin bound in each dispersion was almost the same as the value at 0.01 µg/well or less. Therefore, it was found that there was non-specific adsorption of an SQR-containing vesicle, which depended on the concentration of SQR-containing vesicle. However, both the SQR-containing vesicle dispersions showed a significant difference from the negative controls at the amount of streptavidin bound of 0.05 µg/well.

From the above, it was shown that the present invention enables more sensitive and simpler detection and measurement of biomolecules than the general ELISA method. Table 7 shows the results of performance comparison between the method of the present invention (TLip-LISA) and the ELISA method.

TABLE 7

| Item | TLip-LISA | Digital ELISA*[1] | Current ELISA *[2] |
|---|---|---|---|
| Sensitivity | $10^7$ times that of the ELISA method *[3] (1 ag/ml) | $10^4$ times that of the ELISA method (1 fg/ml) | 8 pg/mL |
| Detection method | $10^3$-$10^4$ fluorescent molecules were supported for one TLip and fluorescence was emitted at once. | Fluorescence method, enzymatic method (time dependent) | Ultraviolet-visible absorption method, enzymatic method (time dependent) |
| Reaction time | <1 minute | 5 to 6 hours | ~30 minutes |
| Specificity | Sandwich method | Sandwich method | Sandwich method |

*[1]Rissin, D M., et al., Single-molecule enzyme-linked immunosorbent assay detects serum proteins at subfemtomolar concentrations. *Nature Biotechnology*, 28, 595-599 (2010).
*[2]hpps://www.sigmaaldrich.com/catalog/product/sigma/rab0331?lang=en&region=US
*[3]Sensitometry using a fluorescence detector (FLE1100)

INDUSTRIAL APPLICABILITY

The temperature-responsive fluorescent particles of the present invention can be used for preparing temperature-responsive fluorescent probe particles. In turn, the temperature-responsive fluorescent probe particles can be used to quantitatively determine biomarkers related to diseases and infections or detect those at the level of one molecule by digital counting. Therefore, the temperature-responsive fluorescent probe particles of the present invention and a detection method and a quantitative determination method using these can be used as a diagnostic agent and a diagnostic method for diseases and infections.

The present application is based on Japanese Patent Application No. 2019-100929 (Filing date: May 29, 2019), the contents of which are incorporated herein by reference in its entirety.

The invention claimed is:

1. A temperature-responsive fluorescent particle comprising a fluorescent molecule in a molecular assembly comprising and constituted by an amphiphilic lipid molecule, wherein the fluorescent molecule is of general formula I:

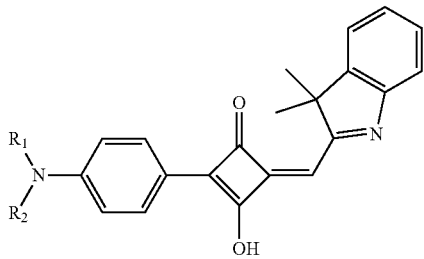

wherein $R_1$ represents a hydrophobic group; $R_2$ represents a hydrophobic group; and $R_1$ and $R_2$ may be the same or different, wherein the fluorescent molecule is quenched when the molecular assembly is in a solid phase and the fluorescent molecule emits fluorescence when the molecular assembly is in a liquid phase, due to a temperature-responsive solid-liquid phase transition, so that quenching and fluorescence emission of the fluorescent molecule are reversibly switched in a temperature responsive manner.

2. The temperature-responsive fluorescent particle according to claim 1, wherein the molecular assembly has the fluorescent molecule in an aggregated form when in the solid phase and the molecular assembly has the fluorescent molecule in a disaggregated form when in the liquid phase.

3. The temperature-responsive fluorescent particle according to claim 1, wherein the molecular assembly has a lipid bilayer, and the fluorescent molecule is quenched when the molecular assembly is in a gel phase and the fluorescent molecule emits fluorescence when the molecular assembly is in a liquid crystal phase, due to a temperature-responsive gel-liquid crystal phase transition, so that quenching and fluorescence emission of the fluorescent molecule are reversibly switched in a temperature responsive manner.

4. The temperature-responsive fluorescent particle according to claim 1, wherein the amphiphilic lipid molecule is a phospholipid.

5. The temperature-responsive fluorescent particle according to claim 4, wherein the molecular assembly is a bilayer membrane vesicle.

6. The temperature-responsive fluorescent particle according to claim 5, wherein the bilayer membrane vesicle contains 0.3 mol % or more of the fluorescent molecule that is of general formula I.

7. A temperature-responsive fluorescent probe particle, comprising the temperature-responsive fluorescent particle according to claim 1, a surface of which is modified with a biomolecule recognition element.

8. The temperature-responsive fluorescent probe particle according to claim 7, wherein the biomolecule recognition element is biotin, an antibody or a variable region of the antibody or a fab (fragment antigen-binding) fragment of the antibody, or an aptamer.

9. A kit for detecting or measuring a biomolecule, comprising the temperature-responsive fluorescent probe particle according to claim 7.

10. A method for detecting or quantitatively determining a biomolecule contained in a biological sample, comprising:
contacting the temperature-responsive fluorescent probe particle according to claim 7 and the biological sample with a biomolecule recognition element for capture that is immobilized on a substrate;
heating the substrate; and
measuring fluorescence emission.

11. A method for detecting or quantitatively determining a biomolecule, comprising:
contacting the temperature-responsive fluorescent probe particle according to claim 7 and a biological sample with a biomolecule recognition element for capture that is immobilized on a substrate;
washing the substrate; and
measuring fluorescence emission.

12. A method for detecting a biomolecule, comprising:
forming a complex comprising and constituted by the temperature-responsive fluorescent probe particle according to claim 7, a target biomolecule, a biomolecule recognition element for capture and a heat source; and
measuring fluorescence emission, wherein the forming the complex promotes heat conduction from the heat source to the temperature-responsive fluorescent probe particle,
so that a phase transition from a solid phase to a liquid phase of the temperature-responsive fluorescent probe particle causes the fluorescence emission.

13. A method for quantitatively determining a biomolecule, comprising performing the method for detecting a biomolecule according to claim 12, wherein the number of target biomolecules in a test sample is detected by counting the number of temperature-responsive fluorescent probe particles in the test sample that have emitted fluorescence.

14. A method for detecting or quantitatively determining a biomolecule contained in a biological sample, comprising:
contacting the biological sample with a biomolecule recognition element for capture that is immobilized on a substrate;
adding a biomolecule recognition element for detection;
adding an element recognizing the biomolecule recognition element for detection;
adding the temperature-responsive fluorescent probe particle according to claim 8;
heating the substrate; and
measuring fluorescence emission.

15. The method according to claim 14, wherein the biomolecule recognition element for detection is biotinylated, and wherein the element recognizing the biomolecule recognition element is streptavidin, avidin or a deglycosylated form of avidin.

16. The method according to claim 14, wherein the biomolecule recognition element of the temperature-responsive fluorescent probe particle according to claim 7 is biotin, an antibody or a variable region of the antibody or a fab (fragment antigen-binding) fragment of the antibody, or an aptamer.

* * * * *